United States Patent [19]

Taniguchi et al.

[11] Patent Number: 4,797,702
[45] Date of Patent: Jan. 10, 1989

[54] FLASH PHOTOGRAPHING SYSTEM

[75] Inventors: Nobuyuki Taniguchi, Tondabayashi; Hiroshi Hosomizu, Nara; Kenji Tsuji, Kashiwara; Takanobu Omaki, Sennan; Masaaki Nakai, Nara, all of Japan

[73] Assignee: Minolta Camera Kabushiki Kaisha, Osaka, Japan

[21] Appl. No.: 16,004

[22] Filed: Feb. 18, 1987

Related U.S. Application Data

[62] Division of Ser. No. 819,015, Jan. 15, 1986, which is a division of Ser. No. 614,031, May 25, 1984, Pat. No. 4,573,786.

[30] Foreign Application Priority Data

| | | | |
|---|---|---|---|
| May 27, 1983 | [JP] | Japan | 58-94605 |
| Jun. 1, 1983 | [JP] | Japan | 58-98227 |
| Jun. 4, 1983 | [JP] | Japan | 58-100050 |
| Jun. 7, 1983 | [JP] | Japan | 58-102407 |
| Jun. 10, 1983 | [JP] | Japan | 58-104650 |
| Jun. 13, 1983 | [JP] | Japan | 58-106424 |
| Jun. 15, 1983 | [JP] | Japan | 58-108484 |
| Jun. 17, 1983 | [JP] | Japan | 58-109921 |
| Jun. 18, 1983 | [JP] | Japan | 58-109854 |
| Jun. 21, 1983 | [JP] | Japan | 58-112326 |
| Jun. 23, 1983 | [JP] | Japan | 58-113920 |
| Jun. 23, 1983 | [JP] | Japan | 58-113921 |
| Mar. 13, 1984 | [JP] | Japan | 59-48435 |

[51] Int. Cl.$^4$ .......................................... G03B 15/05
[52] U.S. Cl. .................................. 354/413; 354/416; 354/145.1; 354/132
[58] Field of Search ............ 354/416, 417, 403, 145.1, 354/132, 286, 410, 413

[56] References Cited

U.S. PATENT DOCUMENTS

| | | | |
|---|---|---|---|
| 4,536,072 | 8/1985 | Taniguchi et al. | 354/403 |
| 4,558,939 | 12/1985 | Taniguchi et al. | 354/416 |
| 4,573,786 | 3/1986 | Taniguchi et al. | 354/416 |

Primary Examiner—Russell E. Adams
Attorney, Agent, or Firm—Watson, Cole

[57] ABSTRACT

A flash photography system with a camera body and an electronic flash device incorporates first to third terminals in the camera body which are connectable to fourth through sixth terminals in the flash device. A signal is produced to distinguish between first and second modes wherein data is transmitted to the electronic flash device and data from the electronic flash device is transmitted to the camera body, respectively, and connected to the first terminal. Clock pulses control the data transmission and data is read from the electronic flash device and transmitted to the electronic flash device through the second terminal in response to the clock pulses. An initiating signal to cause production of artificial illuminating light from the electronic flash device is provided at the third terminal. In response to the distinguishing signal, selection is made between the first and second modes via the fourth terminal. The electronic flash device provides via the fifth terminal serial data to the camera body in response to the clock pulses through the fourth terminal. Data is read to the electronic flash device through the fifth terminal in response to pulses from the fourth terminal. The electronic flash device provides artificial illuminating light in response to the initiating signal through the sixth terminal.

6 Claims, 24 Drawing Sheets

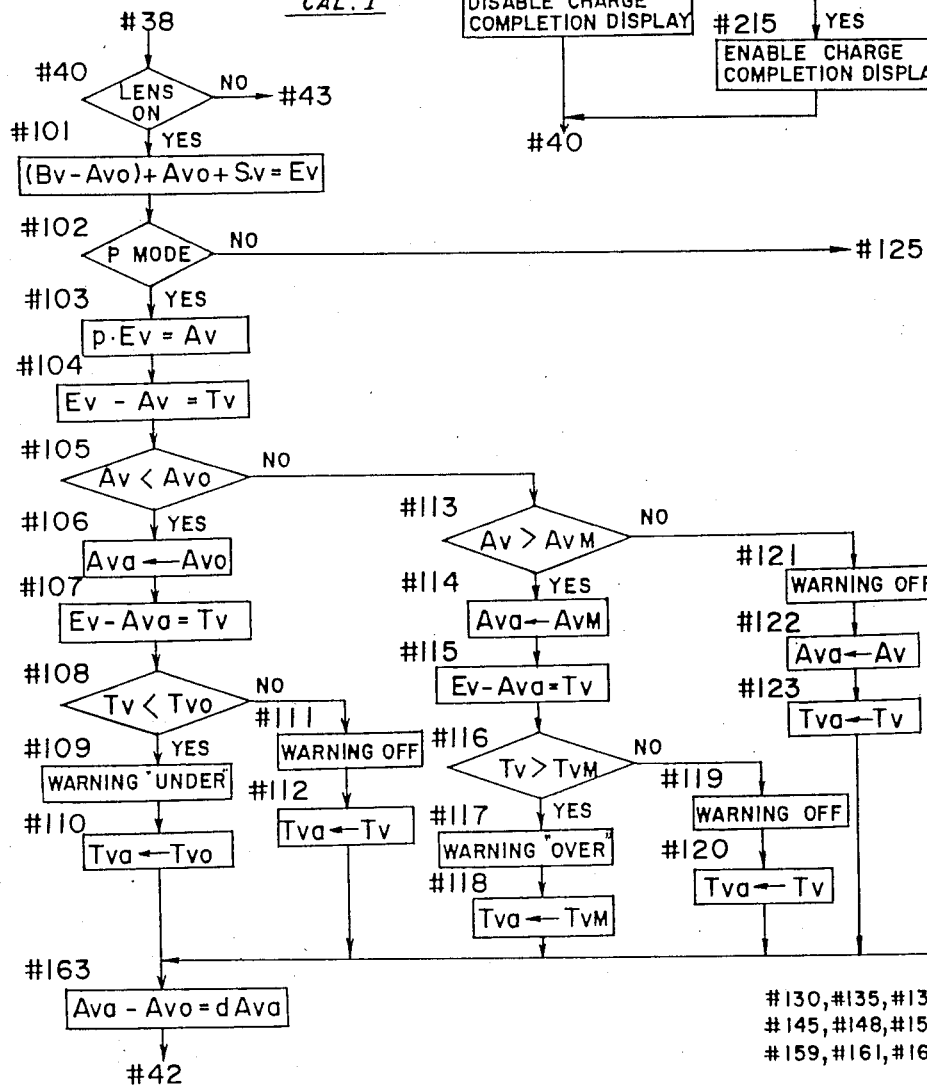

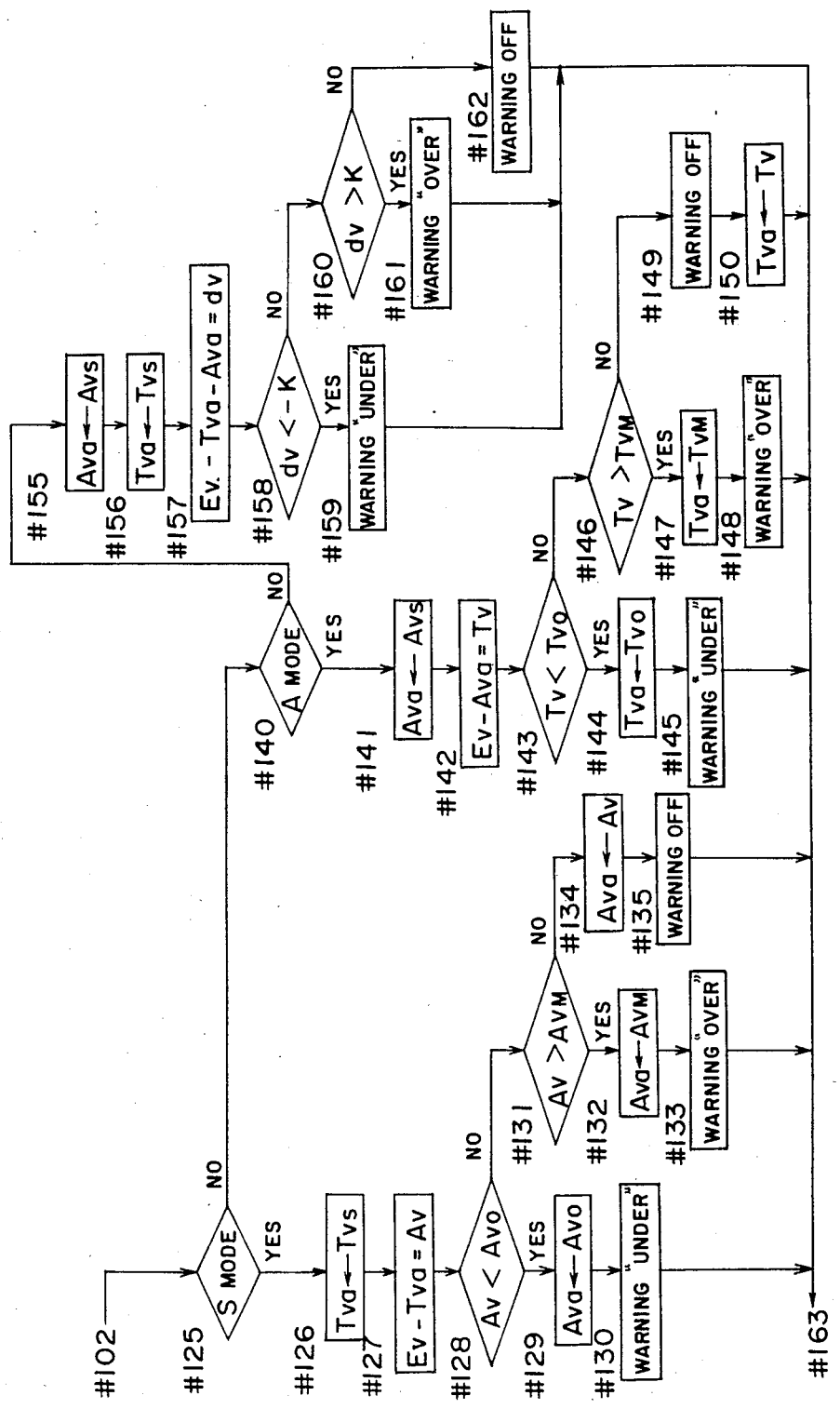

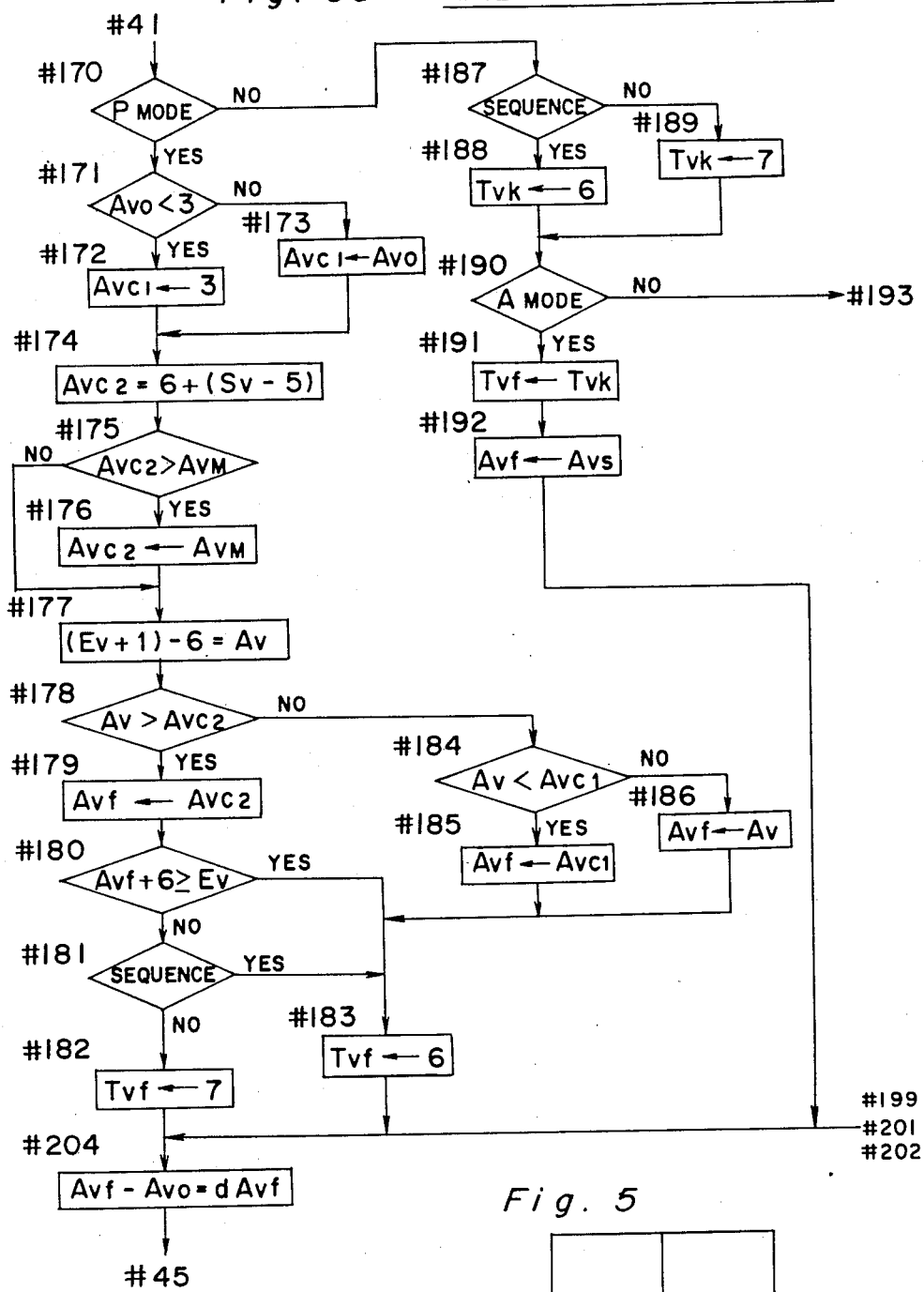
Fig. 5a  #42 FLASH-LIGHT CAL. I
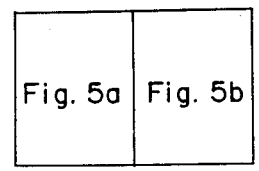
Fig. 5

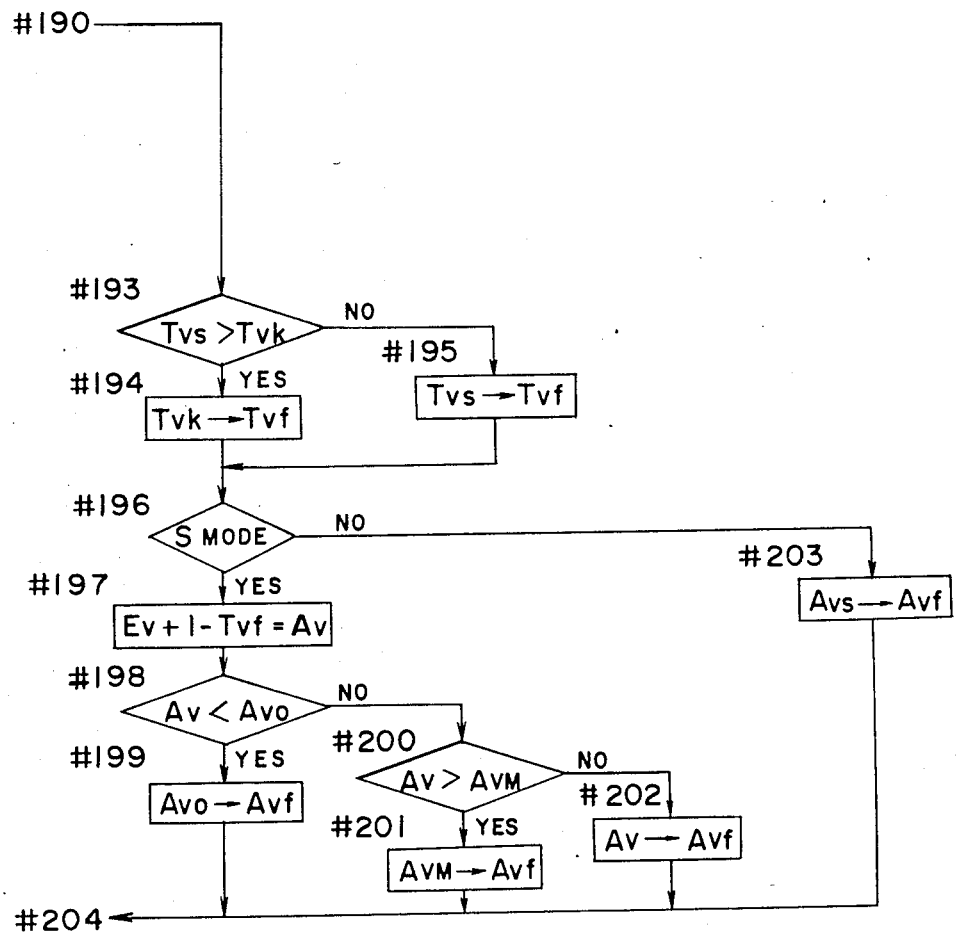
Fig. 5b  #42 FLASH-LIGHT CAL. I (Cont'd)

Fig. 6
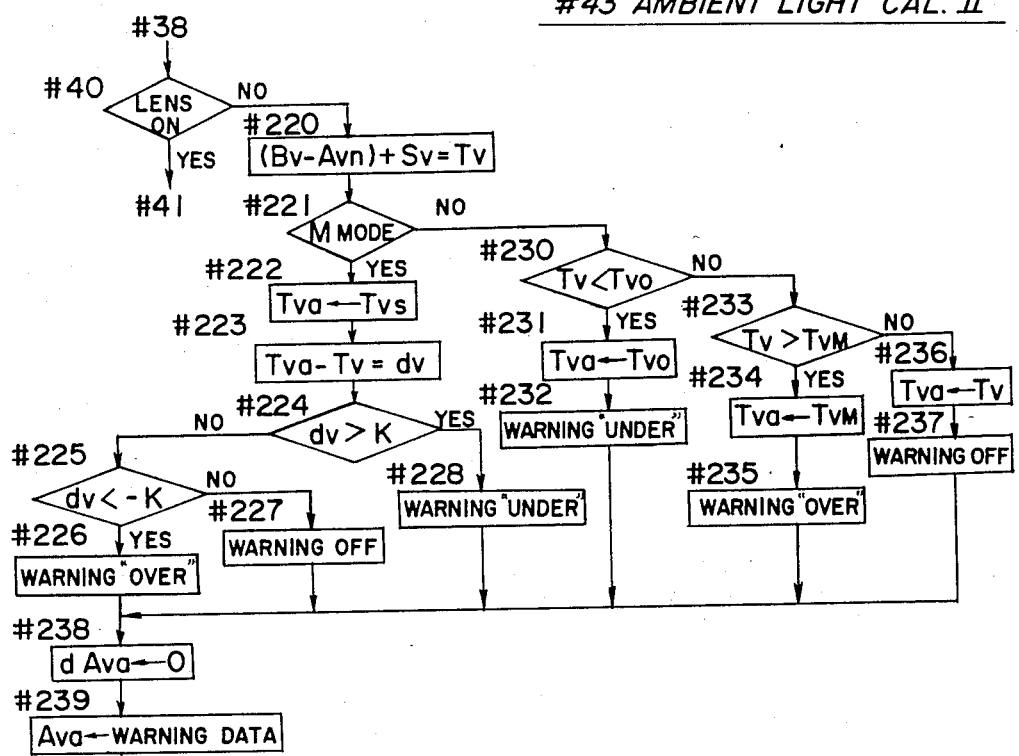
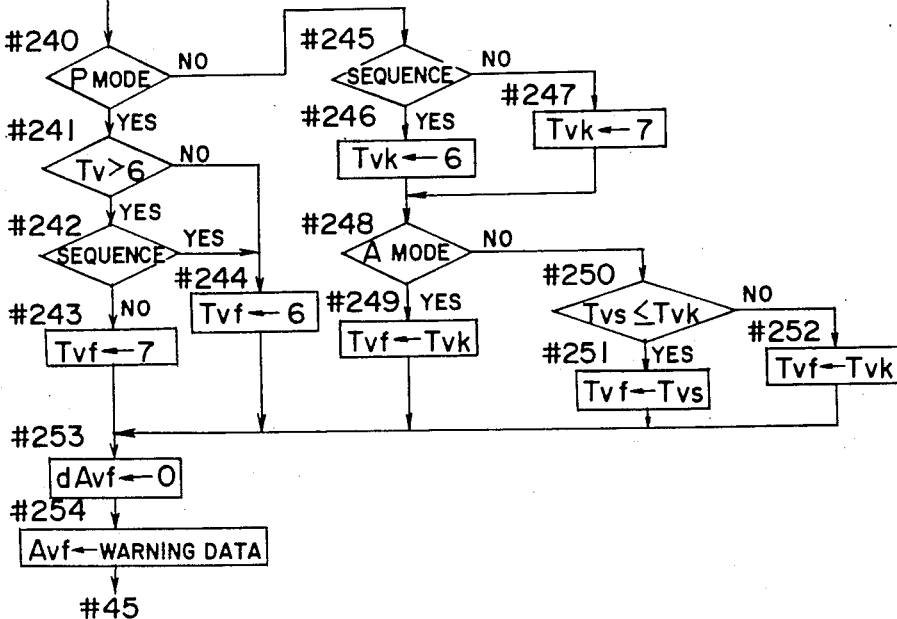

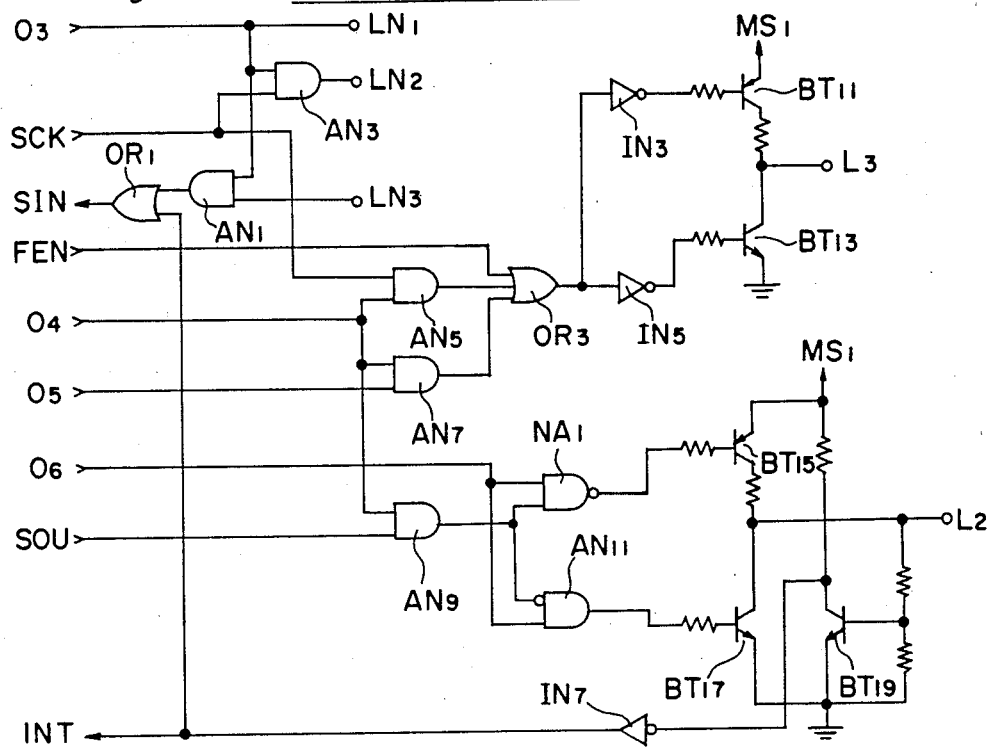
Fig. 7  INPUT OUTPUT CONTROL CIRCUIT IOC
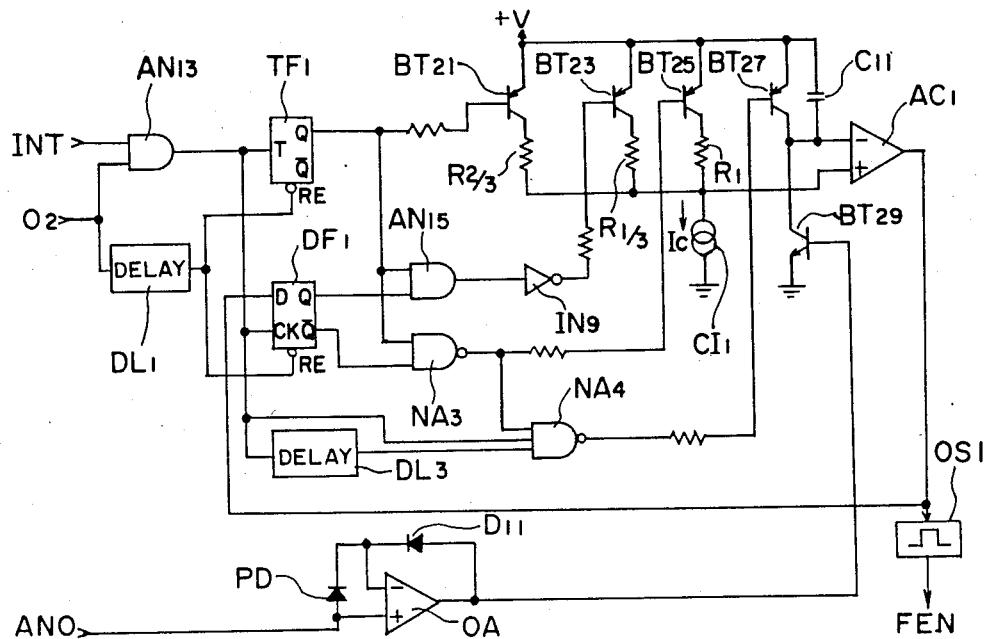
Fig. 8  LIGHT AMOUNT CONTROL CIRCUIT FST Fig. 9a          CONTROL CIRCUIT FLC 1
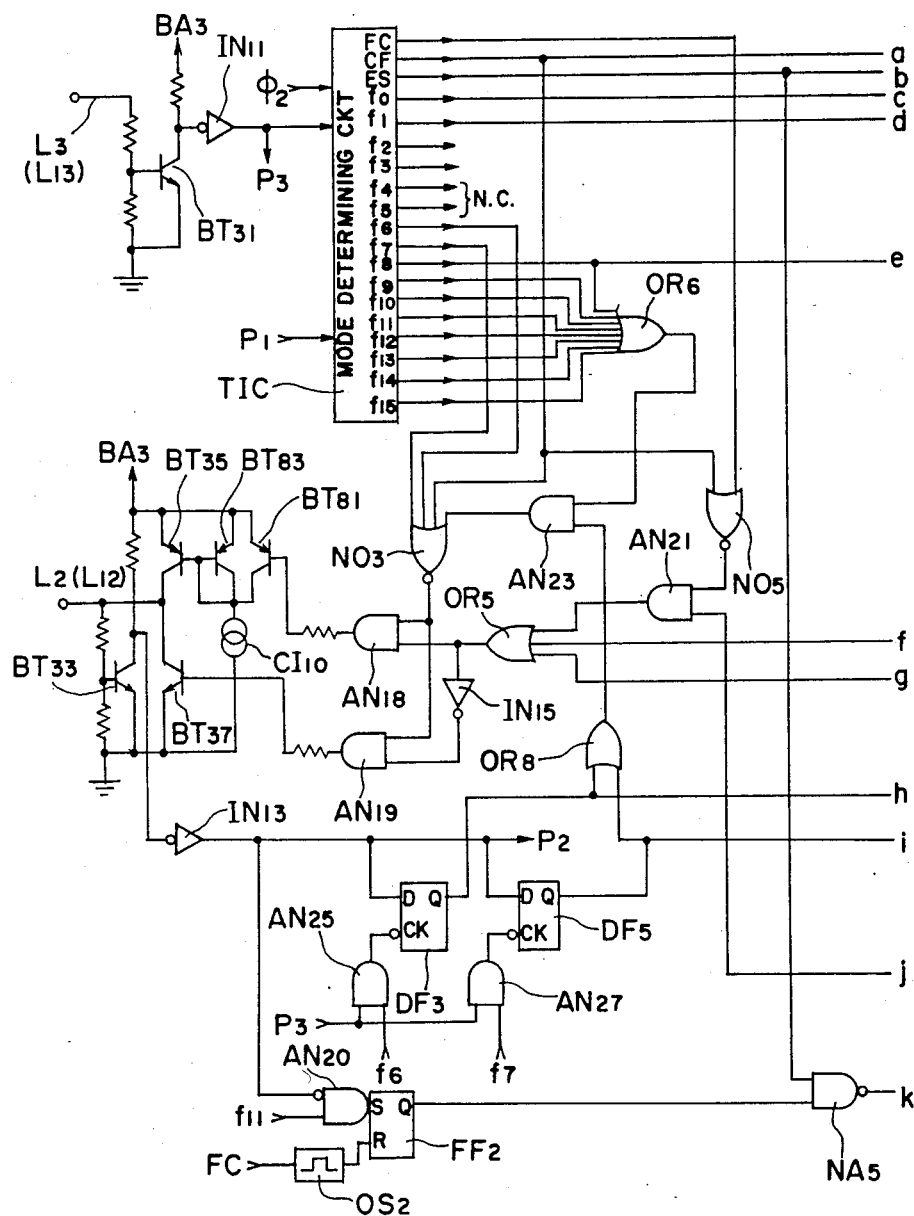
Fig. 9
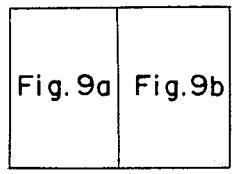

Fig. 9b  CONTROL CIRCUIT FLC1 (Cont'd)
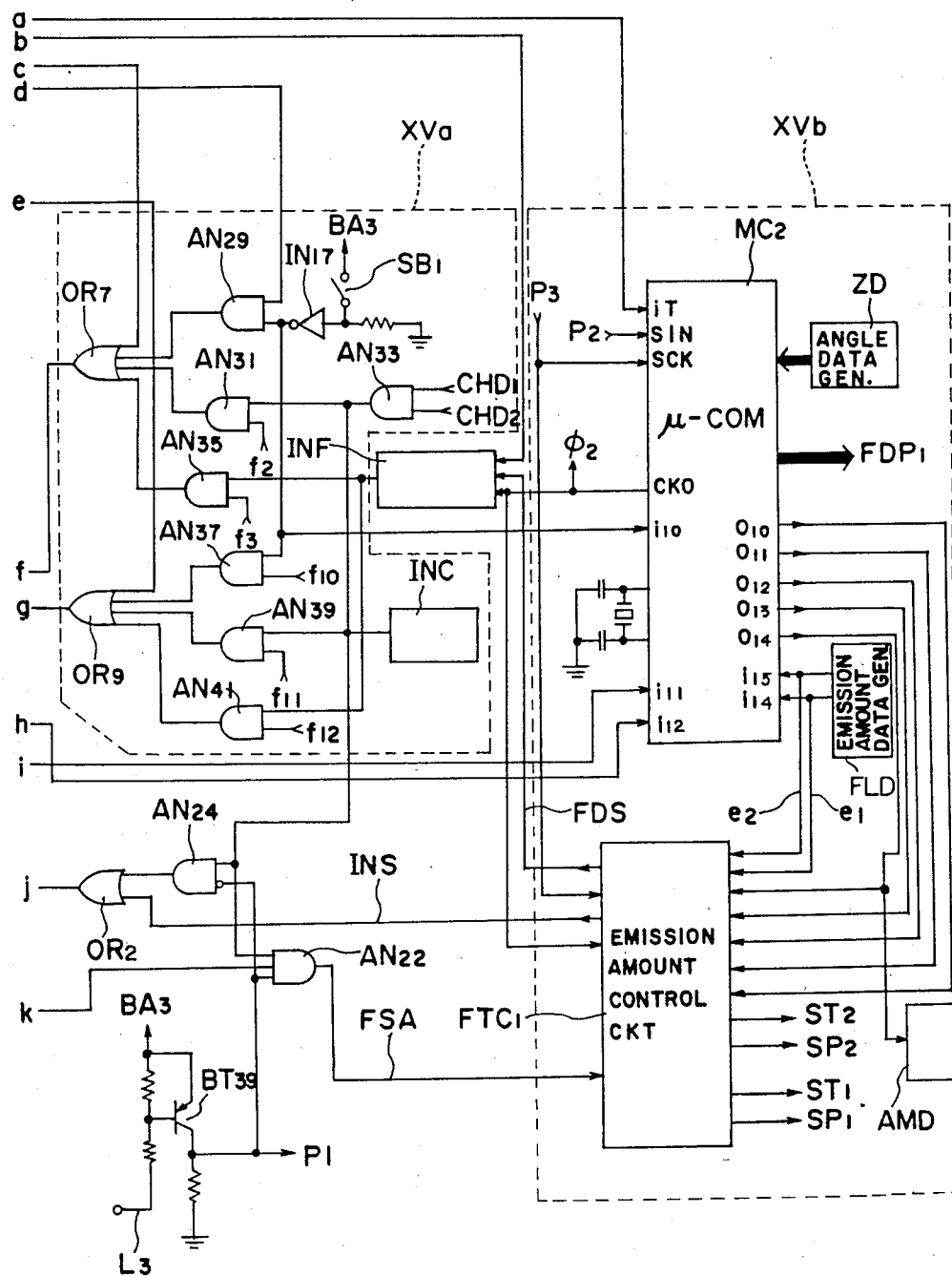

Fig. 10  MODE DETERMINING CIRCUIT TIC
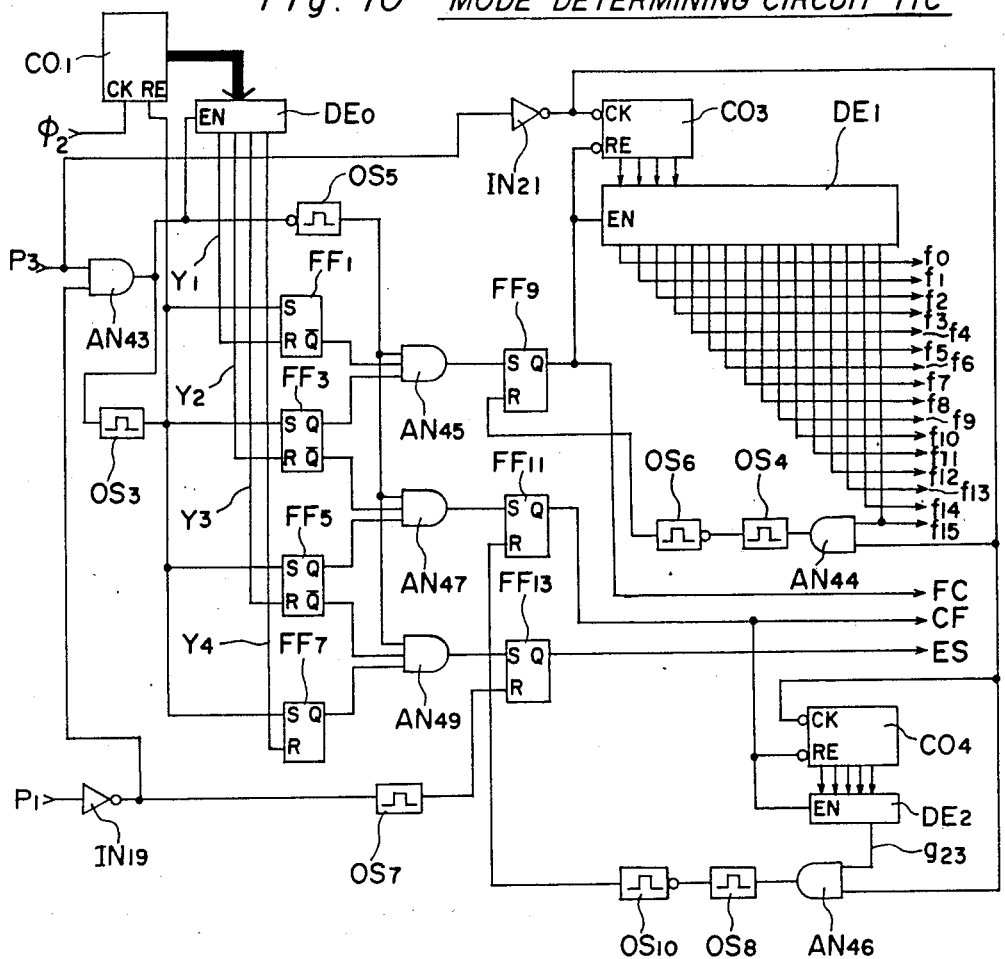
Fig. 12  INF
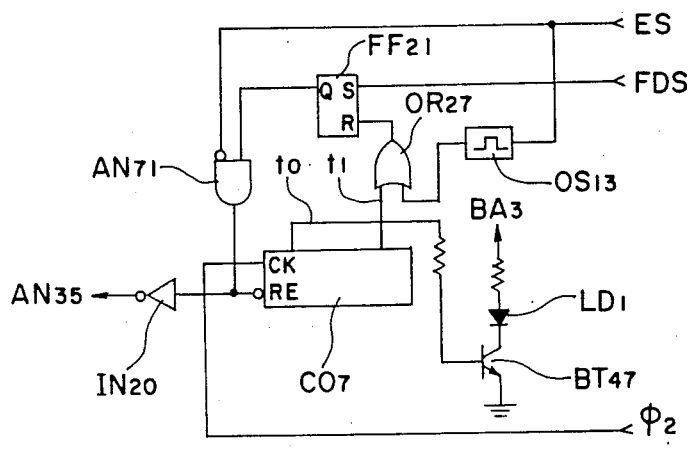

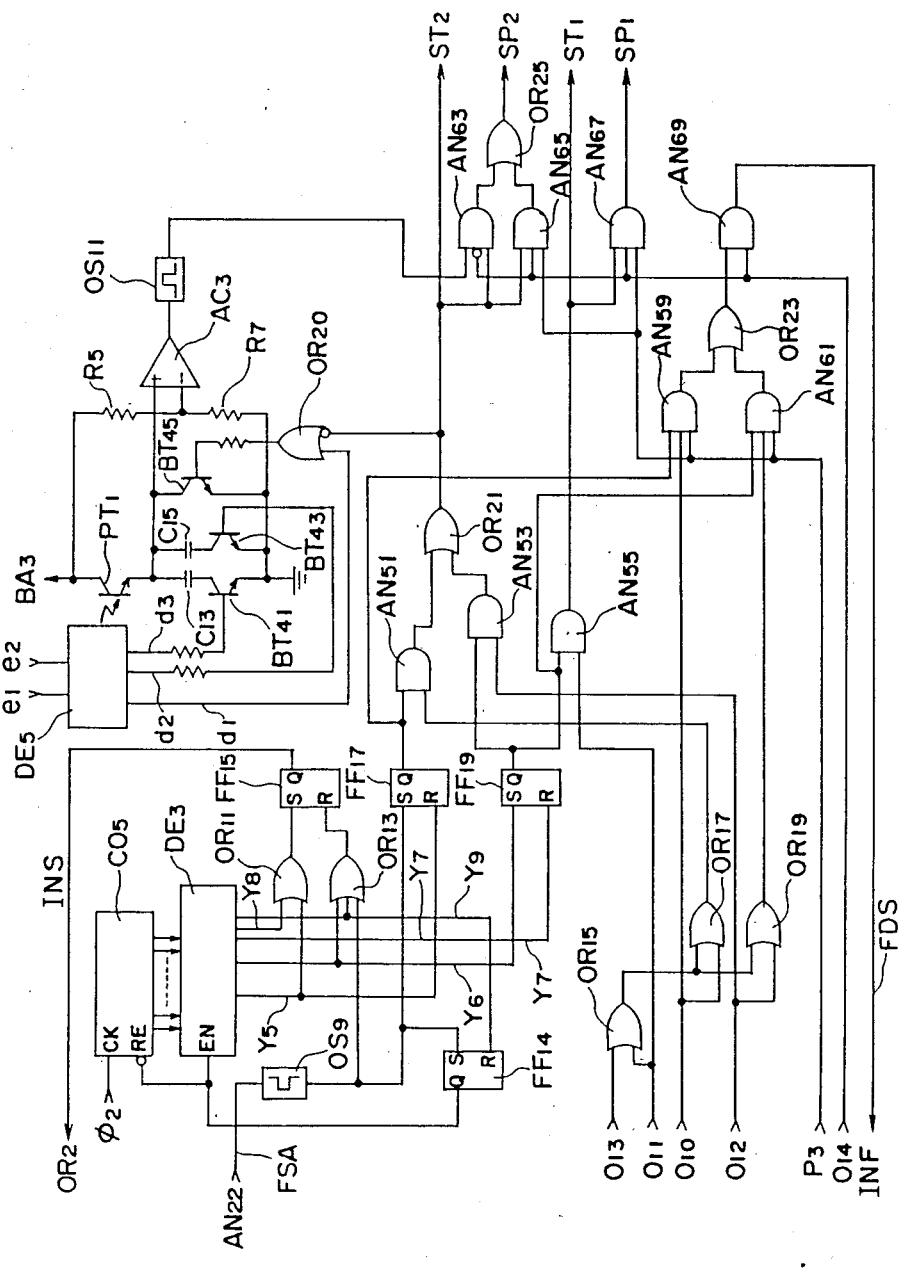
Fig. 11 EMISSION AMOUNT CONTROL CIRCUIT FTC1

Fig. 13a
Fig. 13
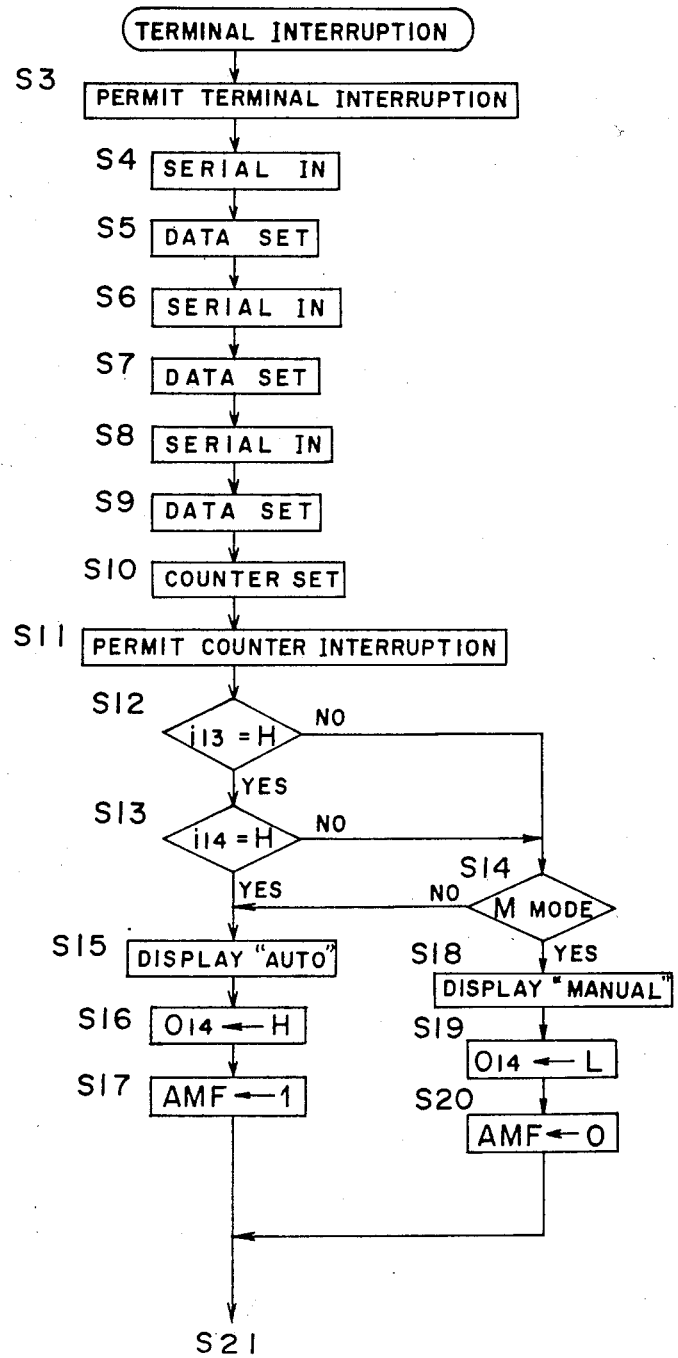
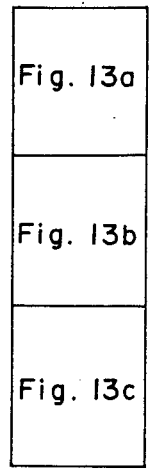

CONTROL CIRCUIT FLC2 or FLC3

Fig. 16  EMISSION AMOUNT CONTROL CIRCUIT FTC2
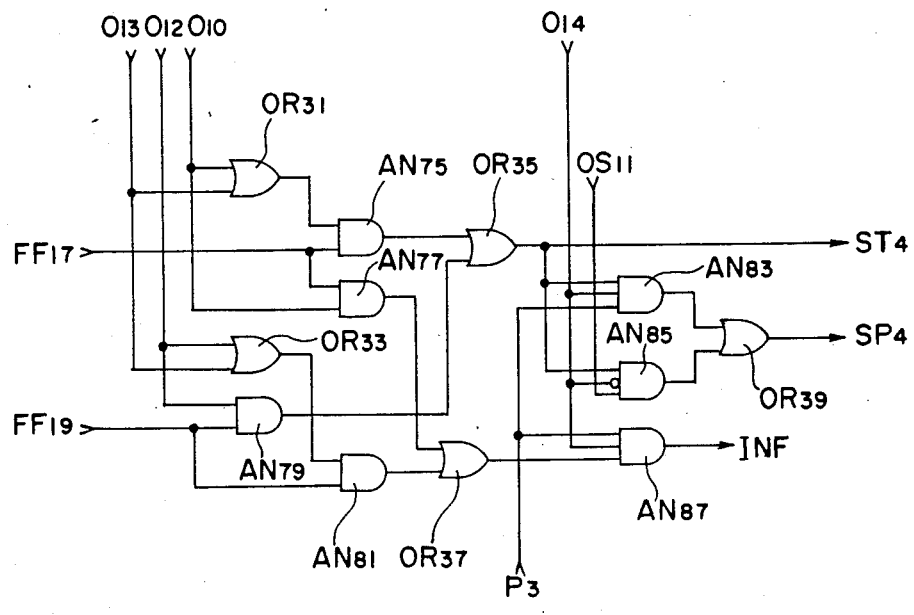
Fig. 17
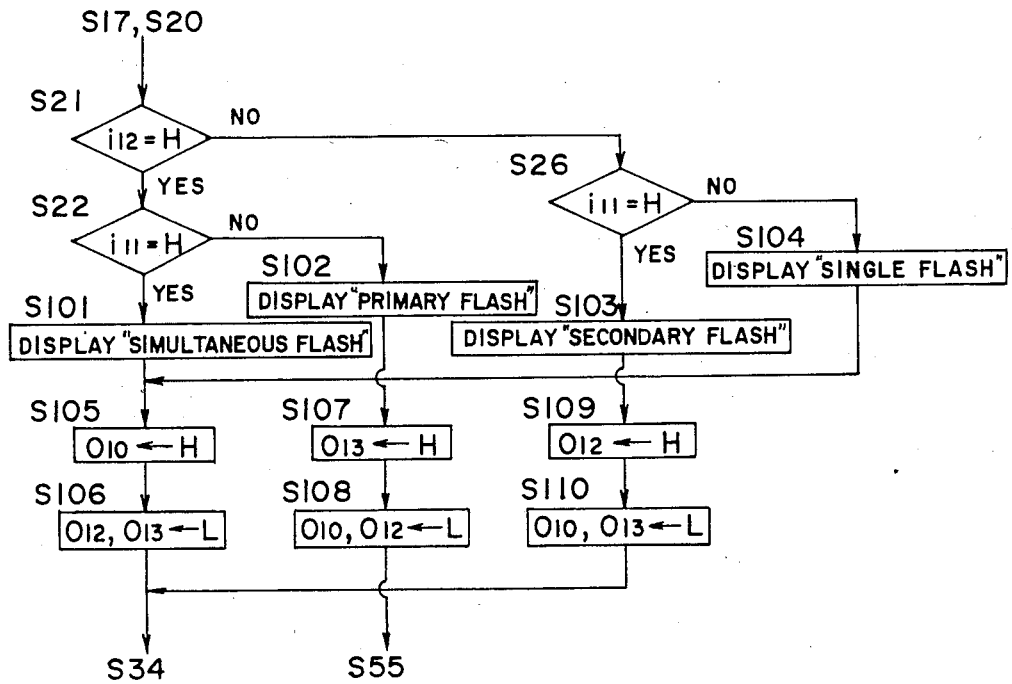

Fig. 18 FLASH CONTROL CIRCUIT CNC

FLASH PHOTOGRAPHING SYSTEM

This is a Division of application Ser. No. 819,015 filed Jan. 15, 1986, which is a Divisional application of Ser. No. 614,031, filed May 25, 1984 and now U.S. Pat. No. 4,573,786.

This invention is also related to pending U.S. application Ser. No. 801,303 which is a Divisional application of U.S. Pat. No. 4,558,939, and U.S. Pat. No. 4,550,996. All of these U.S. patents and applications are assigned to the same Assignee as the present invention.

BACKGROUND OF THE INVENTION

1. Field of the Invention

The present invention generally relates to an improvement in a flash photographing system, and in individual devices operative in the system, such as an electronic flash device and a camera. More specifically, the present invention relates to an improvement in the transmission of data and information among various devices in the system and also to an improvement in the control of a plurality of flash light emissions enabled by the system.

2. Description of the Prior Art

In the field to which the present invention pertains, it is well known to transmit various data and information among devices in a flash photographing system by way of a plurality of terminals. On the other hand, it is also well known that, by means of adopting a double flash-head type or a plurality of electronic flash devices within the system, a plurality of flash light emissions are carried out during one exposure. In such a system, the number and type of the data and information to be transmitted among the devices in the system are so numerous that it has long been desired to rationalize them efficiently. It has also long been desired to accurately and properly control the cooperative relationship between these devices in the system and also to avoid any possibility that the operation of the system as a whole would become unreasonable. In addition, in order to accomplish these objects, it has been desired to improve the individual devices, such as the electronic flash device and the photographic camera, which are operative in the flash exposure system.

SUMMARY OF THE INVENTION

The present invention has for its essential object to provide a flash photographing exposure system effective to permit the various data and information to be transmitted efficiently among the various devices in the system with the use of a minimum number of terminals to permit the devices to be cooperative integrally with each other.

Another object of the present invention is to provide an electronic flash device functioning within the system referred to above, wherein with the use of a minimum number of terminals, transmission of the data and information between the electronic flash device and another device in the system can be carried out efficiently.

A further object of the present invention is to provide an electronic flash device of the type referred to above, wherein an improvement has been made to avoid the occurrence of any confusion or interference among the data and information communicated with another device in the system.

A still further object of the present invention is to provide an electronic flash device of the type referred to above, which is so structured as to avoid any possible contradictory operations to those of the other devices in the system.

A still further object of the present invention is to provide an electronic flash device of the type referred to above, wherein when a plurality of such flash devices are employed in the system, no confusion arises in the system as a whole even if these flash devices are in contradictory conditions with each other.

A still further object of the present invention is to provide an improved electronic flash device of a type employing two flash light emitters.

Another object of the present invention is to provide an improved electronic flash device of the type referred to above, wherein the flash device operates satisfactorily even if the expected information fails to be received from another device in the system.

Yet another object of the present invention is to provide an improved electronic flash device, wherein the proper data and information can be transmitted in the system in accordance with the number of flash devices employed, whether it be one or more than one.

A still further object of the present invention is to provide a controlling device in the system which is, in the case where a plurality of electronic flash devices are employed, capable of collecting information fed from these electronic flash devices, determining the collected information and, based on the result of the determination, commanding the timing at which the electronic flash devices are to be fired and also delivering the result of the determination to the photographic camera.

A still further object of the present invention is to provide an improved electronic flash device of the type capable of firing at a desired firing timing in accordance with the command fed from the controlling device of the type referred to above.

A still further object of the present invention is to provide a photographic camera capable of variably setting a flash synchronized exposure time in automatic response to the information fed from the controlling device of the type referred to above.

A still further object of the present invention is to improve a photographic camera of a type which is capable of controlling the ratio of amount of flash light emitted from the individual flash light emitters in the case where a plurality of flash light emissions are carried out in the system.

A still further object of the present invention is to provide an electronic flash device capable of, for the sake of the photographic camera of the type referred to above, supplying proper light measurement controlling signals in synchronization with the flash firing.

A still further object of the present invention is to provide an electronic flash device capable of, when a plurality of flash light emissions take place sequentially, generating information to be displayed appropriate for the sequential flash light emissions.

A still further object of the present invention is to provide a controlling device capable of controlling the timing at which three electronic flash devices are to be fired.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 1b-1 and 1b-2 taken together as shown in FIG. 1b show circuit diagram of the system shown a in FIG. 1a;

FIG. 3 is a flow chart showing detailed steps for steps #38 of the flash condition display shown in FIG. 2b;

FIGS. 4a and 4b taken together as shown in FIG. 4 show a detailed flow chart of step #41 of ambient light calculation I shown in FIG. 2a;

FIGS. 5a and 5b taken together as shown in FIG. 5 show a detailed flow chart of step #42 of flash-light calculation I shown in FIG. 2a;

FIG. 6 shows a detailed flow chart of step #43 of ambient light calculation II and step #44 of flash-light calculation II shown in FIG. 2a;

FIG. 7 is a circuit diagram showing a detail of input output control IOC shown in FIG. 1b-1;

FIG. 8 is a circuit diagram showing a detail of light amount control circuit FST shown in FIG. 1b-1;

FIGS. 9a and 9b taken together as shown in FIG. 9 show a detail of control circuit FLC1 shown in FIG. 1b-2;

FIG. 10 is a circuit diagram showing a detail of mode determining circuit TIC shown in FIG. 9a;

FIG. 11 is a circuit diagram showing a detail of emisson amount control circuit FTC1 shown in FIG. 9b;

FIG. 12 is a circuit diagram showing a detail of light adjustment success indication circuit INF shown in FIG. 9b;

FIGS. 13a, 13b and 13c taken together as shown in FIG. 13 show a flow chart of the operation carried out by microcomputer MC2 shown in FIG. 9b;

FIG. 16 shows a part of emission amount control circuit FTC2 which is different from circuit FTC1 shown in FIG. 11;

FIG. 17 shows a part of a flow chart of the operation of microcomputer MC3, shown in FIG. 15b, and particularly showing a portion which is different from that shown in FIGS. 13a–13c;

DESCRIPTION OF THE PREFERRED EMBODIMENTS

Figure 1A:
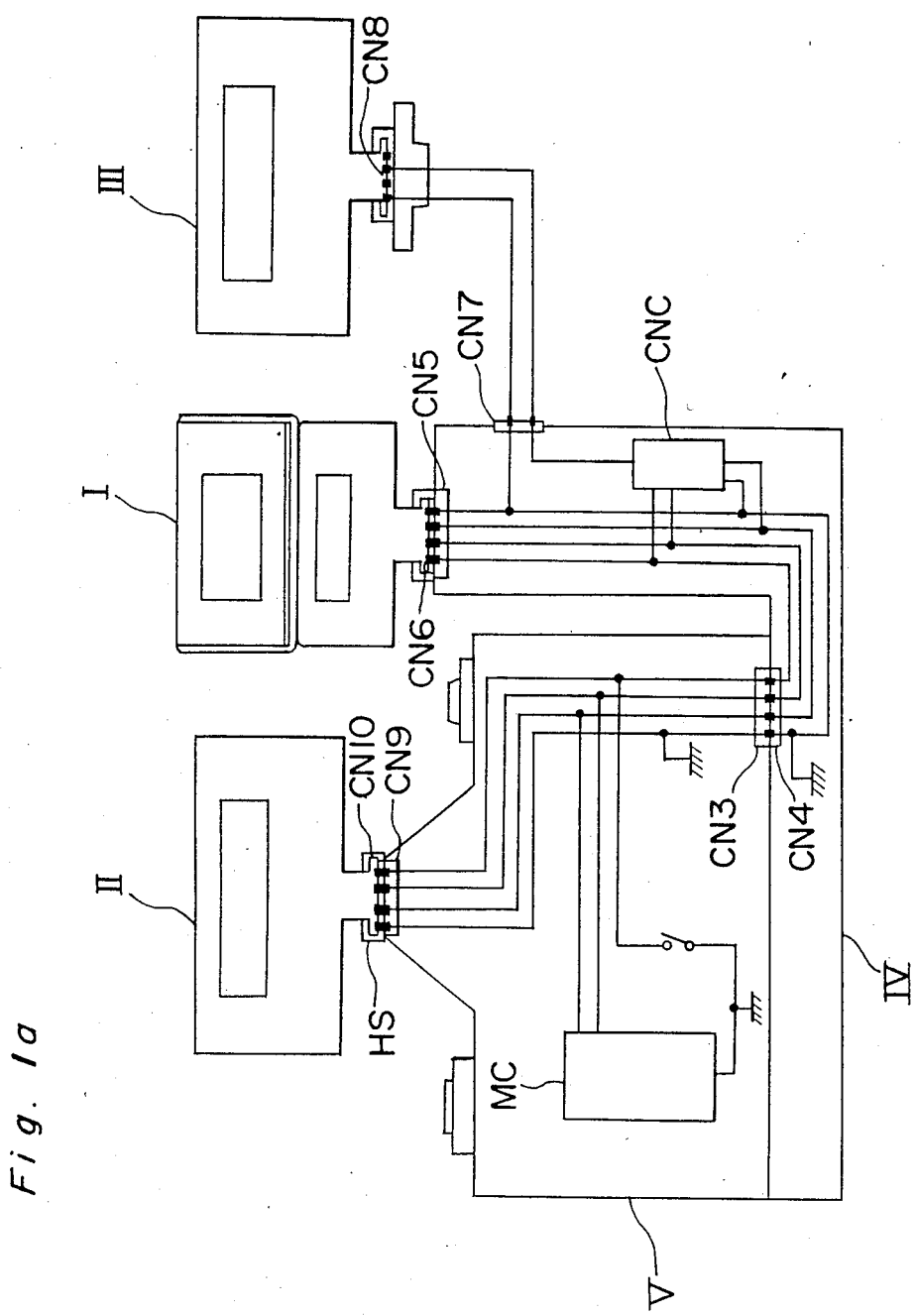
FIG. 1a is a diagrammatic view of a flash photographing system according to the present invention.

Referrng to FIG. 1a a flash photographing system according to the present is diagrammatically shown. The system as shown comprises a single-reflex camera body V having a shoe connector CN9 and bottom connector CN3, a flash controller IV having connectors CN4, CN5 and CN7, and three electronic flash devices I, II and III. Electronic flash device I is a double flash-head type having a connector CN6, electronic flash device II is a single flash-head type having a connector CN10, and III is the same electronic flash device as II with a connector CN8. Although not illustrated in FIG. 1a, the system further comprises an interchangeable lens VI (FIG. 1b-1) mounted on the camera body V. These elements, i.e., camera body V, interchangeable lens VI, flash controller IV and three flash devices I, II and III, are mutually connected with each other through a single network defining the flash photographing system of the present invention.

According to the example shown in FIG. 1a, electronic flash device I is connected to flash controller IV through connectors CN6 and CN5, electronic flash device II is connected to camera body V through connectors CN9 and CN10, and electronic flash device III is connected to flash controller IV through connectors CN8 and CN7.

Instead of the connection shown in FIGS. 1a and 1b, camera body V and flash controller IV can be connected with flash devices in other ways such as described below.

(1) Exchange flash devices I and II with each other.

(2) Remove flash device III and use only two flash devices I and II.

(3) Use only one flash device I or II by connecting it to shoe connector CN9.

(4) Use only one flash device I or II by connecting it to connector CN5 of flash controller IV.

(5) Use only one flash device I or II by connecting it to shoe connector CN9, and connecting flash controller IV to bottom connector CN3 but no flash device is connected to flash controller IV.

(6) Use no flash device, but merely a flash controller IV is connected to camera body V.

In the case of (6) where only the flash controller IV is connected and no flash device is connected, no flash photographing is carried out, but normal photographing under ambient light is carried out. In addition to the above, other types of electronic flash device, such as a type which is not dedicated to any particular system or is designed for a different flash photographing system, can be mounted on shoe connector CN9 or connector CN5. In such a case, the flash device may emit flash light in response to a start signal, but operates independently of the flash photographing system of the present invention. Furthermore, when a flash device is connected to connector CN7, no matter what type it is, it operates within the control of the present system, because the flash device connected to the connector CN7 is controlled only from the view point of the timed relationship with other operations, and not from the view point of the amount of light emitted therefrom.

Although various different connections are available, the description given below is directed to the connection shown FIG. 1a, unless it is stated otherwise.

Figure 1B:
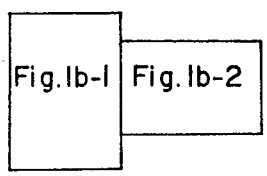
Figures 1, 1B:
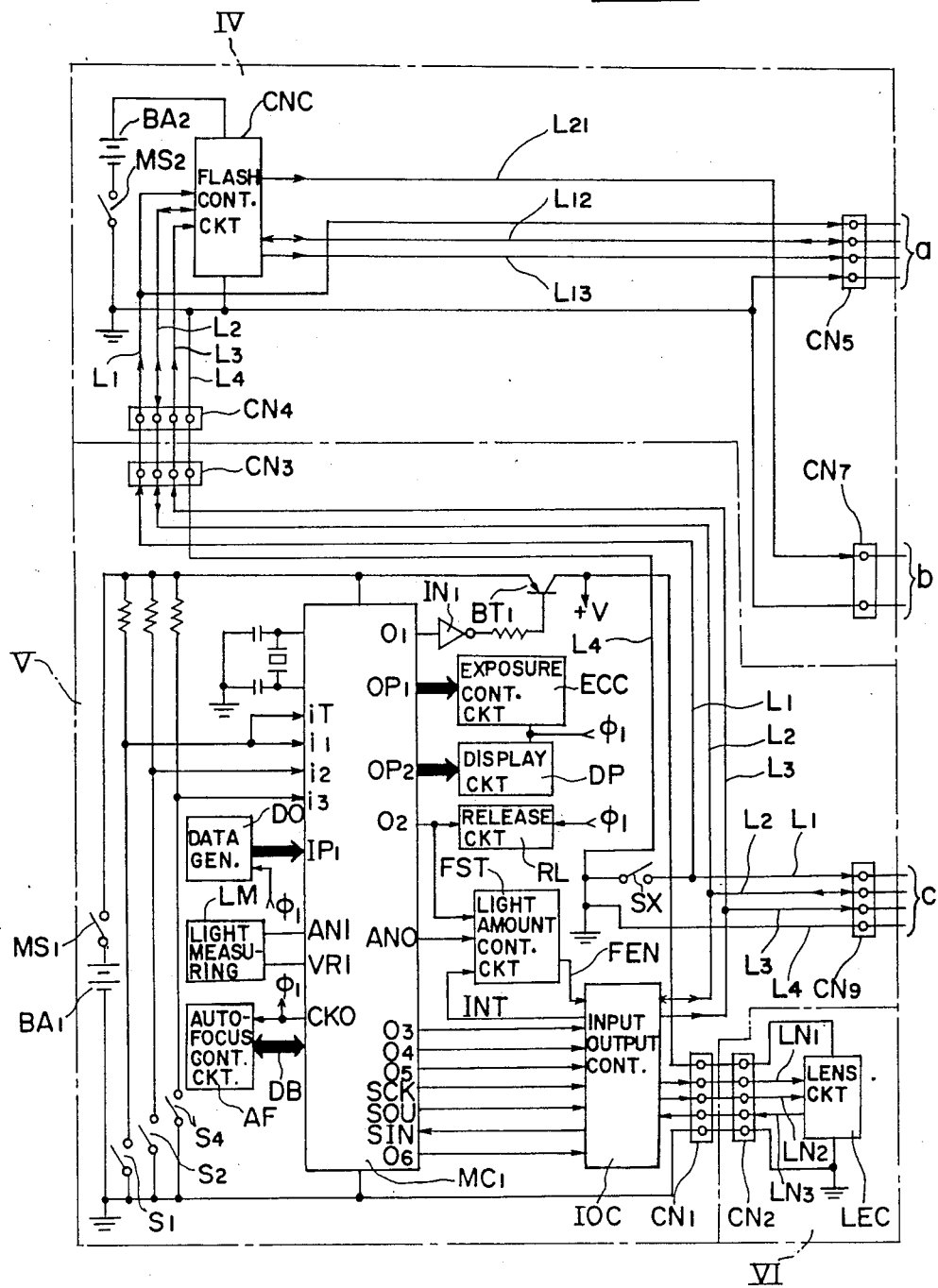
Figures 1, 1B, 2:
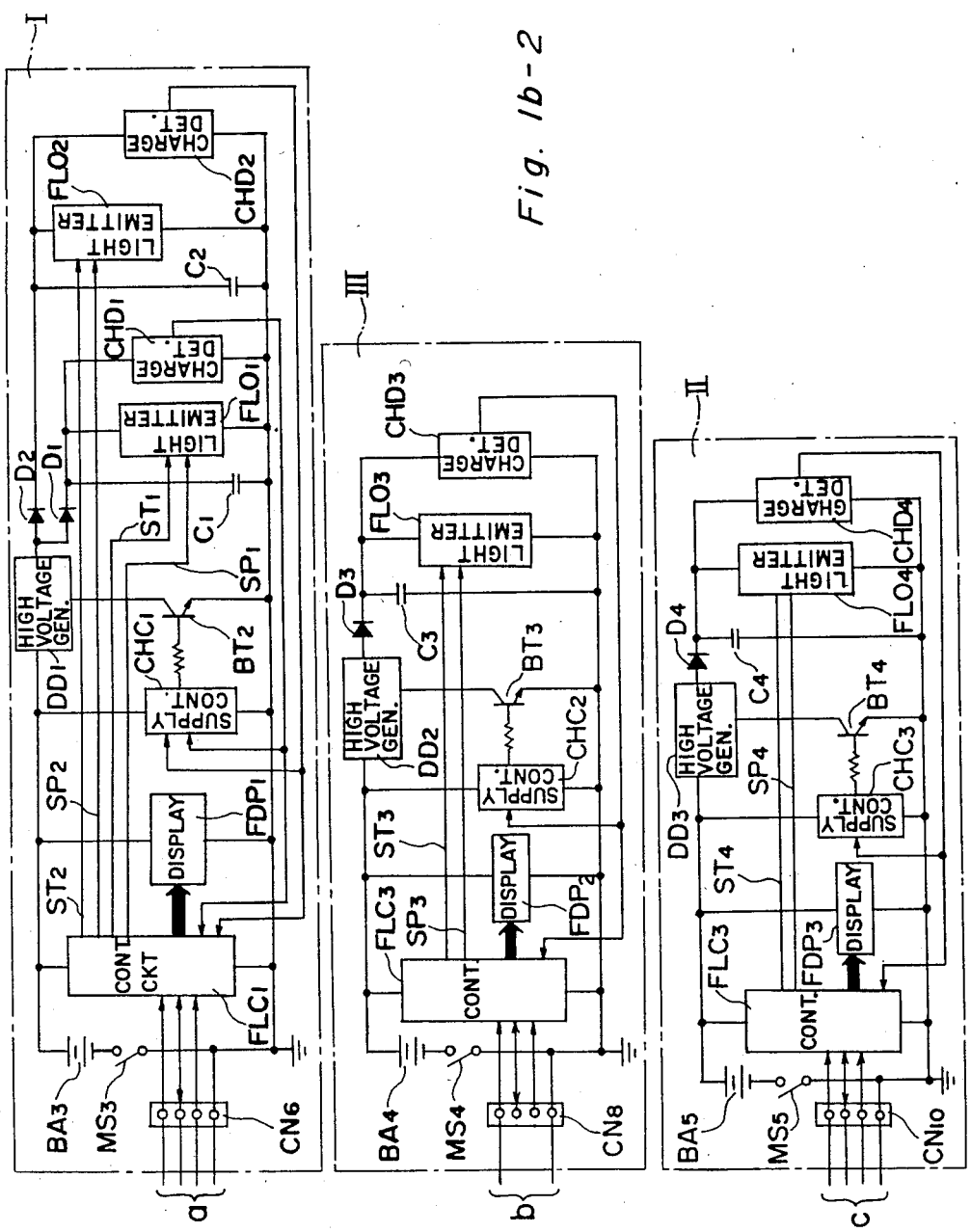

Referring to FIGS. 1b-1 and 1b-2 taken together as shown in FIG. 1b, a block diagram of a circuit of the flash photographing system shown in FIG. 1a is shown. Throughout the drawings, a heavy line represents a bundle of signal lines and a hairline represents a single signal line.

Referring particularly to FIG. 1b-1, camera body V has connectors CN1, CN3 and CN9. Connectors CN3 and CN9, each having four terminals, are both connected to the same lines L1, L2 and L3 and a grounded line. As shown in FIG. 1a, connector CN9 is preferably provided at a hot shoe HS for the direct connection with a flash device, such as I as illustrated in the drawings as an example, and connector CN3 is provided at the bottom of the camera body for the connection with flash controller IV. Connector CN1 is provided, for example, on a body mount ring (not shown) for mounting the interchangeable lens. Thus, when an interchangeable lens is properly mounted, connector CN1 having five terminals is connected with a connector CN2 provided in the interchangeable lens. Thus, various data are sent from a lens circuit LEC to camera body V.

Flash controller IV has a connector CN4 for the electric connection with camera body V through bottom connector CN3. Flash controller IV further has a four-terminal connector CN5 and two-terminal connector CN7, both are connectable to a flash device. When a flash device, such as I, is connected to connector CN5, signal exchange and data exchange are effected between the flash device and the flash controller IV to control the firing timing and amount of flash light emitted from the flash device I. On the other hand, when a flash device, such as III, is connected to connector CN7, only a start emission signal is applied at a controlled timing from flash controller IV to the flash device III to effect the emisson of flash light with a constant amount of light or an amount controlled by a system other than the system of the present invention.

Next, the description is particularly directed to the circuit of camera body V.

Referring to FIG. 1b-1, a main switch MS1 is connected to a battery BA1. Provided operatively to a shutter release button (not shown) are light measuring switch S1 and release switch S2 such that light measuring switch S1 turns on by a first half depression of the shutter release button and release switch S2 turns on by a further depression of the button. When light measuring switch S1 closes, a LOW signal is applied to microcomputer MC1 at each of interruption terminal iT and input terminal i1, and when release switch S2 closes, a LOW signal is applied to microcomputer MC1 at input terminal i2. A reset switch S4 is provided which opens when an exposure control operation completes, and closes when an exposure control mechanism (not shown) including a shutter mechanism and an aperture mechanism is charged. Like other switches, reset switch S4 produces a HIGH or LOW signal which is applied to microcomputer MC1 to input terminal i3.

A data generator DO is provided for generating set data, such as exposure control mode, film sensitivity, shutter speed, F-stop number, and the like. The generated data is applied to input IP1 of microcomputer MC1. Instead of manual setting, the film sensitivity data can be set automatically by reading the film sensitivity information provided on the film cartridge (not shown).

A light measuring circuit LM has two outputs: one is connected to input ANI of microcomputer MC1 for providing measured light intensity in an analog form to microcomputer MC1; and other is connected to input VRI for providing the microcomputer MC1 with a reference voltage by means of a reference voltage generator (not shown) in light measuring circuit LM for the purpose of giving a reference voltage required by an analog-to-digital (A-D) conversion to be effected in microcomputer MC1.

An auto-focus control circuit AF is provided which detects the focusing condition of picture taking lens and shifts it, when it is out-of-focus, to an infocus position. More specifically, auto-focus control circuit AF operates in response to the command signal from microcomputer MC1 through data bus DB, and detects the amount and direction of defocus of an image formed by the picture taking lens on a predetermined image forming plane. Then, by the data representing the amount of defocus and the data representing the type of interchangeable lens from lens circuit LEC, an amount of shift of picture taking lens (actually, an amount of shift of focusing lens of all the lenses provided in the picture taking lens) is calculated. Then, the lens is shifted in accordance with the calculated amount, and the focusing condition is displayed.

A release circuit RL is provided for starting the operation of the exposure control mechanism (not shown). It operates in response to a HIGH signal produced from output O2 of microcomputer MC1.

A display circuit DP is provided for displaying various control factors, such as exposure control value (e.g., shutter speed and F stop number to be effected), exposure control mode, film sensitivity, condition of flash device, etc. The display is effected in accordance with the data from output OP2 of microcomputer MC1.

An exposure control circuit ECC controls shutter and aperture mechanisms in accordance with shutter speed data and F-stop down data from output OP2 of mirocomputer MC2.

A transistor BT1 is provided for controlling a power supply. When microcomputer MC1 produces a HIGH signal from its output O1 and a LOW signal from inverter IN1, transistor BT1 conducts, thereby providing voltage +V to circuits other than microcomputer MC1 and also to lens circuit LEC.

A sync switch, or X contact, Sx is provided which closes to produce a LOW signal when a leading curtain (not shown) of the shutter mechanism completes its scan, indicating that the shutter is opened. The LOW signal from sync switch Sx is applied through line L1 to flash device II, flash controller IV, and further to flash device I.

A light amount control circuit FST is provided which controls the amount of flash light to be emitted from each connected flash device. A detail of light amount control circuit FST will be described later in connection with FIG. 8.

An input/output control IOC is provided for controlling signal transmission between camera body V and each of interchangeable lens VI, flash device II and flash controller IV. A detail of input/output control IOC will be described later in connection with FIG. 7.

Microcomputer MC1 has a number of input and output terminals which are described below.

An output CKO is provided for producing a train of clock pulses $\phi 1$ which is applied to each of auto-focus control circuit AF, data generator DO, exposure control circuit ECC, display circuit DP and release circuit RL.

An output ANO produces a D-A converted film sensitivity signal for the control of the amount of light to be emitted from each flash device.

Terminals SCK, SOU and SIN are for serial sending of data. For example, when data is to be sent from microcomputer MC1 to input/output control IOC, serial-output terminal SOU produces binary form data bit-by-bit serially in a synchronized relationship with a positive edge of each of eight clock pulses from output SCK. However, when data is to be sent from input/output control IOC to microcomputer MC1, serial-input terminal SIN receives binary form data bit-by-bit serially in a synchronized relationship with a negative edge of each of eight clock pulses from output SCK.

An output O3 produces a HIGH signal when data is to be sent between camera body V and mounted lens VI. An output O4 produces a HIGH signal when data is to be sent to a connected flash device and/or flash controller IV. An output O5 is provided for producing a signal representing the operating condition of a connected flash device and/or flash controller IV. More particularly, when data is to be sent to camera body V from the connected flash device and/or flash controller IV, output O5 produces a HIGH signal for a first predetermined period of time (such as 90 microseconds). When data is to be sent from camera body V to the connected flash device and/or flash controller IV, output O5 produces a HIGH signal for a second predetermined period of time (such as 150 microseconds). And, when an exposure control operation is to be effected by camera body V, output O5 produces a HIGH signal for a third predetermined period of time (such as 210 microseconds). An output O6 produces a HIGH signal when a data is to be sent from the camera body to a flash device and/or flash controller.

The interchangeable lens VI mounted on the camera body V has a lens circuit LEC which receives power +V from camera body V. When microcomputer MC1 in camera body V produces a HIGH signal from output O3, line LN1 carries a HIGH signal, thereby activating the lens circuit LEC. Then, in response to clock pulses applied through line LN2, the fixed data stored in lens circuit LEC is serially sent bit-by-bit through line LN3 to camera body V. The fixed data can be minimum F-stop data (fully opened aperture data), maximum F-stop data, focal length data, photographing distance data, various data for the auto-focus adjustment, check data (for checking whether or not an interchangeable lens is appropriate for the system of the present invention and is properly mounted on camera body V), and any other necessary data.

Line L1 is provided for sending a LOW signal when sync switch Sx closes.

Line L2 is provided as a bidirectional data bus for sending serial data from the camera body to each of the connected flash devices and/or flash controller, or vice versa. When flash light is being emitted for the connected flash devices, a light measurement control signal is transmitted through line L2 from each flash device to the camera body. This light measurement control signal is defined by a combination of a LOW signal, HIGH and LOW signal such that the first LOW signal starts from the beginning of the light emission from a first flash device and lasts for a first predetermined period of time (which is longer than a time necessary for the full emission of flash light, such as 2.5 milliseconds). Then comes a HIGH signal which lasts for a second predetermined period of time (such as 1 millisecond), and after that, the second LOW signal lasts for a third predetermined period of time necessary for the emission of two flash lights at their full light amount and effected one after another (such as 5.5 milliseconds). The light measurement control signal will be described in detail later. On the contrary, when flash light is not being emitted, or when no data transmission is effected, line L2 carries a HIGH or LOW signal indicating that the flash devices are in charged condition or in uncharged condition, respectively.

Line L3 is provided for sending clock pulses produced from output SCK of microcomputer MC1 to each flash device and flash controller when data transmission is to be effected therebetween so as to synchronize the data sending and receiving operation. Line L3 is also used for sending a signal from output O5 representing the operating condition of the camera body, and for sending an emission stop signal from light amount control circuit FST produced during the emission of flash light from the flash device.

Next, the description is directed to the circuit of flash device I.

Referring to FIG. 1b-2, flash device I of a double flash-head type comprises battery BA3 and main switch MS3. Control circuit FLC1 is provided for controlling light emission, data transmission, and calculation for display, and will be described in detail later in connection with FIGS. 9a, 9b, 10, 11, 12, 13a, and 14. Display FDP1 is provided for displaying various information, such as flash mode (which can be divided into a double-action twin flash mode wherein two flash lights are emitted sequentially from two flash heads in one flash device; the former or latter in a sequence flash mode wherein two flash lights are emitted sequentially from two flash devices; a simultaneous flash mode wherein two flash lights are emitted simultaneously from two flash devices; and a single flash mode wherein a flash light is emitted from one flash device), bounce mode, aperture size value based on the data transmitted from camera body, film sensitivity, focal length, and information relating to the illumination angle covered by the flash light where the flash device is of a type which can change the width of the illumination angle. Furthermore, in the case where the flash device is set to an automatic light amount control mode, display FDP1 displays an available range of distance (available range of photographing distance in which the light amount to be emitted can be controlled relatively to the photographing distance). When the flash device is set to a manual mode wherein the light amount to be emitted is manually set, a photographing distance which provides an appropriate exposure is displayed.

Flash device I further includes a supply control circuit CHC1 which receives signals from charge detectors CHD1 and CHD2 and provides a signal to transistor BT2 for controlling high voltage generator DD1. When transistor BT2 conducts, high voltage generator DD1 is so actuated as to step up the voltage from battery BA3 to a predetermined high voltage, such as 300 volts. The produced high voltage is applied through diodes D1 and D2 to capacitors C1 and C2, respectively, thereby charging the capacitors C1 and C2. When capacitors C1 and C2 are charged above respective predetermined levels charge detectors CHD1 and CHD2 produce a HIGH signal respectively. Such a HIGH signal is referred to as a charge completion signal. When a charge completion signal is produced from both charge detectors CHD1 and CHD2, supply control circuit CHC1 produces a LOW signal, thereby turning the transistor BT2 off to cut off the further supply of high voltage from high voltage generator DD1. When, however, a charge completion signal is not produced from at least one of charge detectors CHD1 and CHD2, supply control circuit CHC1 continues to produce a HIGH signal, thereby turning the transistor BT2 on to continue the supply of high voltage from high voltage generator DD1.

Flash device I still further includes two light emitters FLO1 and FLO2 for emitting two flash lights. Light emitter FLO2 is connected to control circuit FLC1 through lines SP2 and ST2 and is mounted in a pivotal fashion so as to change the light emitting direction between straight for the direct lighting and tilted (usually upwards) for the bounce lighting. Light emitter FLO1 is connected to control circuit FLC1 through lines SP1 and ST1 and is provided in a fixed flash-head for shooting only straight flash light.

When only flash device I is connected to camera body V directly at the hot shoe or through flash controller IV, and when light emitter FLO2 is facing straight (hereinafter referred to as a straight flashing fashion), the flash light emits only from light emitter FLO2 and not from light emitter FLO1. However, when only flash device I is connected to the camera body and when light emitter FLO2 is facing other than straight (hereinafter referred to as a bounce flashing fashion), the flash light emits first from light emitter FLO2 for an amount which is equal to about ⅔ of the necessary amount for the proper exposure, and then, flash light emits from light emitter FLO1 for the remaining ⅓ of the necessary amount. This flash mode is called double-action flash mode.

When flash device I is connected to camera body V not solely but together with another flash device II and/or III, as shown in FIGS. 1b-1 and 1b-2 taken together, flash device I operates in a different manner such that flash light emits only from light emitter FLO2 no matter whether light emitter FLO2 is in the straight flashing fashion or in the bounce flashing fashion.

It is to be noted that light emitters FLO1 and FLO2 start emission of light in response to a HIGH signal (start emission signal) applied thereto through lines ST1 and ST2, respectively. Also, since the capacity of capacitor C1 is much smaller than that of capacitor C2, the maximum available light that can be emitted from light emitter FLO1 is much smaller than that from light emitter FLO2. For example, the guide number of light emitter FLO2 itself is 40, whereas that of light emitter FLO1 itself is 8. Furthermore, light emitter FLO2 is pivotally supported to permit the change of light emitting direction, whereas light emitter FLO1 is fixedly supported to emit only the straight flash light. Both light emitters FLO1 and FLO2 can change the amount of light to be emitted such that light emitters FLO1 and FLO2 stop emission of light in response to a HIGH signal (stop emission signal) from lines SP1 and SP2, respectively.

Next, the description is directed to flash device II. The flash device II includes battery BA5 which is connected to main switch MS5. A control circuit FLC3, having the same function as the control circuit FLC1 in flash device I, is provided for sending display data to display FDP3 and sending a start emission signal through line ST4 and a stop emission signal through line SP4 to light emitter FLO4. The detail of the control circuit FLC3 will be described later in connection with FIGS. 15a, 15b, 16 and 17.

Flash device II further includes a supply control circuit CHC3 which receives a signal from charge detector CHD4 and provides a signal to transistor BT4 for controlling high voltage generator DD3 in a manner similar to high voltage generator DD1 described above. It is to be noted that light emitter FLO4 is supported pivotally to permit the change of light emitting direction, thereby permitting both the straight flashing fashion and bounce flashing fashion. Flash device III has the same structure as flash device II.

Next, the description is directed to flash controller IV shown in FIG. 1b-1. Flash controller IV includes battery BA2 which is connected to main switch MS2. Flash control circuit CNC is provided which receives data from flash devices I and/or II in a synchronized relationship with clock pulses from camera body V to detect the conditions of the flash devices, such as a mounted condition and various operating conditions, thereby determining a flash mode. When two flash devices, such as I and II, are connected to connectors CN5 and CN9, respectively, flash control circuit CNC simultaneously receives signals from flash devices I and II, and also simultaneously sends signals to them.

It is to be noted that the term "the flash device" herein used means not only one flash device connected to either one of the connectors CN5 and CN9, but also represents two flash devices connected to both connectors CN5 and CN9, unless it is stated otherwise.

A signal representing the determined flash mode is sent to the flash device in a synchronized relationship with clock pulses from camera body V. Then, by the clock pulses from camera body V, signals representing the flash mode and condition of flash device are sent to camera body V. Based on the result of determination of the flash mode, it is further determined whether or not to emit light from flash device III. When it is determined to emit light from flash device III (i.e., the determined flash mode is sequence flash mode), a start emission signal is applied through line L21 to flash device III after two flash devices I and II complete the emission of flash light. The detail of flash control circuit CNC is described later in connection with FIG. 18.

Next, the various flash modes are described.

The signal flash mode is established when only flash device I is connected to camera body V directly on the shoe connector CN9 or through flash controller IV at connector CN5, and when light emitter FLO2 is facing straight, as in the straight flashing fashion. In this case, a single slot of flash light is emitted from light emitter FLO2, and no light is emitted from light emitter FLO1. The available range of photographing distance under the signal flash mode is determined in accordance with the maximum light amount that can be emitted from light emitter FLO2 solely, and the determined available range is displayed.

The double-action twin flash mode is established when only flash device I is connected to camera body V directly on the shoe connector CN9 or through flash controller IV at connector CN5, and when light emitter FLO2 is set in the bounce flashing fashion facing other than straight. In the double-action twin flash mode, light emitter FLO2 emits ⅔ of the total necessary light for the proper exposure and, immediately thereafter, light emitter FLO1 emits the remaining ⅓ of the necessary light for the proper exposure. The available range of photographing distance under the double-action twin flash mode is determined and displayed in accordance with the maximum light amount that can be emitted from light emitter FLO1.

Another single flash mode is established when only flash device II is connected to camera body V directly on shoe connector CN9 or through flash controller IV at connector CN5 with light emitter FLO4 set either in the straight or bounce flashing fashion. When light emitter FLO4 is set in the straight flashing fashion under this single flash mode, the available range of photographing distance is determined and displayed in accordance with the maximum light amount that can be emitted from light emitter FLO4. But, when light emitter FLO4 is set in the bounce flashing fashion, no available range is determined nor displayed.

The simultaneous flash mode is established when two flash devices are connected to shoe connector CN9 and connector CN5, respectively, with at least one of the two flash devices being of a dedicated type such as flash device I or II, and when flash controller IV is selecting the simultaneous mode (This selection can be done manually through a suitable two-position switch (not shown) provided in the flash controller IV movable between "simultaneous" and "sequence".). Here, it is assumed that flash device I is connected to connector CN5 of flash controller IV and flash device II is connected to shoe connector CN9 of camera body V. Under the simultaneous flash mode, flash device I operates such that only light emitter FLO2 emits light and no light is emitted from light emitter FLO1, no matter whether the light emitter FLO2 is set in the straight or bounce flashing fashion. Thus, under the simultaneous flash mode, two flash devices I and II start the emission of flash light simultaneously and stop flashing when the sum of emitted lights from both devices I and II reaches a desired amount for the proper exposure. The available range of photographing distance under the simultaneous flash mode is determined and displayed in accordance with the maximum light amount that can be emitted from each flash device, only when light emitter FLO2 is set in the straight flashing fashion. When light emitter FLO2 is set in the bounce flashing fashion, no determination nor display is effected for the available range of photographing distance.

The sequence flash mode with two flash devices is established when two flash devices are connected to shoe connector CN9 and connector CN5, respectively, with each one of the two flash devices being of a dedicated type such as flash device I and II, and when flash controller IV is selecting the sequence mode, e.g., by the two-position switch provided in the flash controller IV. Here, it is assumed that flash device I is connected to connector CN5 of flash controller IV and flash device II is connected to shoe connector CN9 of camera body V. Under the sequence flash mode, flash device I operates such that only light emitter FLO2 emits light and no light is emitted from light emitter FLO1, no matter whether the light emitter FLO2 is set in the straight or bounce flashing fashion. Thus, under the sequence flash mode, first, flash device I emits ⅔ of the total necessary light for the proper exposure and, immediately thereafter, flash device II emits the remaining ⅓ of the necessary light for the proper exposure. The available range of photographing distance under the sequence flash mode is determined and displayed in accordance with the maximum light amount that can be emitted from flash device II.

The sequence flash mode with three flash devices is established when the third flash device, such as III as indicated in the drawings, is connected to connector CN7, and when flash controller IV is selecting the sequence mode, e.g., by the two-position switch provided in the flash controller IV. Under the sequence flash mode with three flash devices, the operation is similar to that with two flash devices, but is different such that, after the two flash devices I and II light in that order, the third flash device III emits light in response to a start emission signal transmitted through line L21 to the third flash device III. Since the third flash device III is connected to flash controller IV with only two lines, e.g., line L21 for the start emission signal and line L4 connected to ground, no stop emission signal produced by light amount control circuit FST in camera body V is applied to flash device III. Thus, the flash photographing system of the present invention controls not an amount of flash light from the third flash device but the timing when to start the light emission. Thus, the third flash device emits light with the full amount when it is a non-controllable type, or it may emit light less than a full amount when it is a self-controllable type manually or automatically. From this view point, the third flash device connected to connector CN7 can not only be a dedicated type such as flash device I or II, but also be any other known type. From the practical usage, the third flash device connected to connector CN7 is for lighting the background of a main subject to be photographed. For example, when a person standing in front of a wall is to be taken, the third flash device is placed away from the camera using an extension so as to light only the back wall, thereby eliminating undesirable shades produced by the other flash lights from flash devices I and II. In other words, since the main subject, in this case the person standing in front of the wall, is properly lighted by an aid of flash lights from flash devices I and II, it is not preferable to further light the main subject with the third flash light. Thus, the third flash device is particularly used for lighting the surrounding or background of the main subject for the effect of natural lighting.

Next, the operations of camera body V and the flash photographing system of FIG. 1a are described in connection with FIGS. 2a, 2b, 2c, 3, 4a, 4b, 5a, 5b, 6, 7 and 8.

Figure 2A:
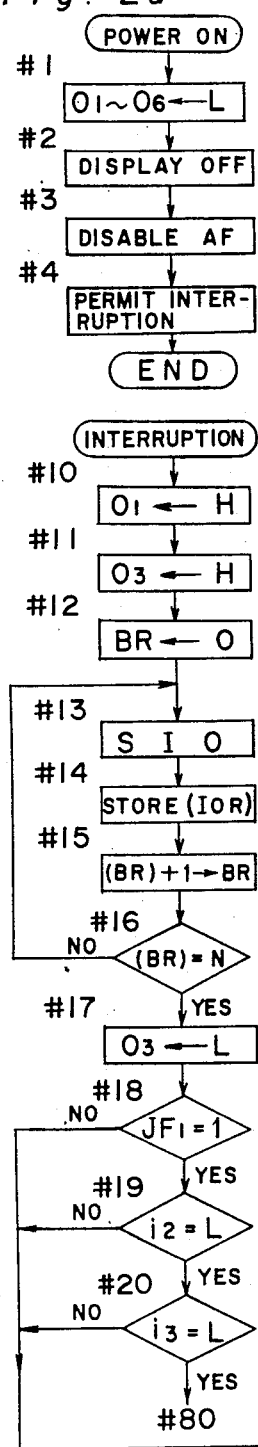
FIGS. 2a, 2b and 2c taken together as shown in FIG. 2 show a flow chart of the operation carried out by microcomputer MC1 shown in FIG. 1b-1.
Figure 2:
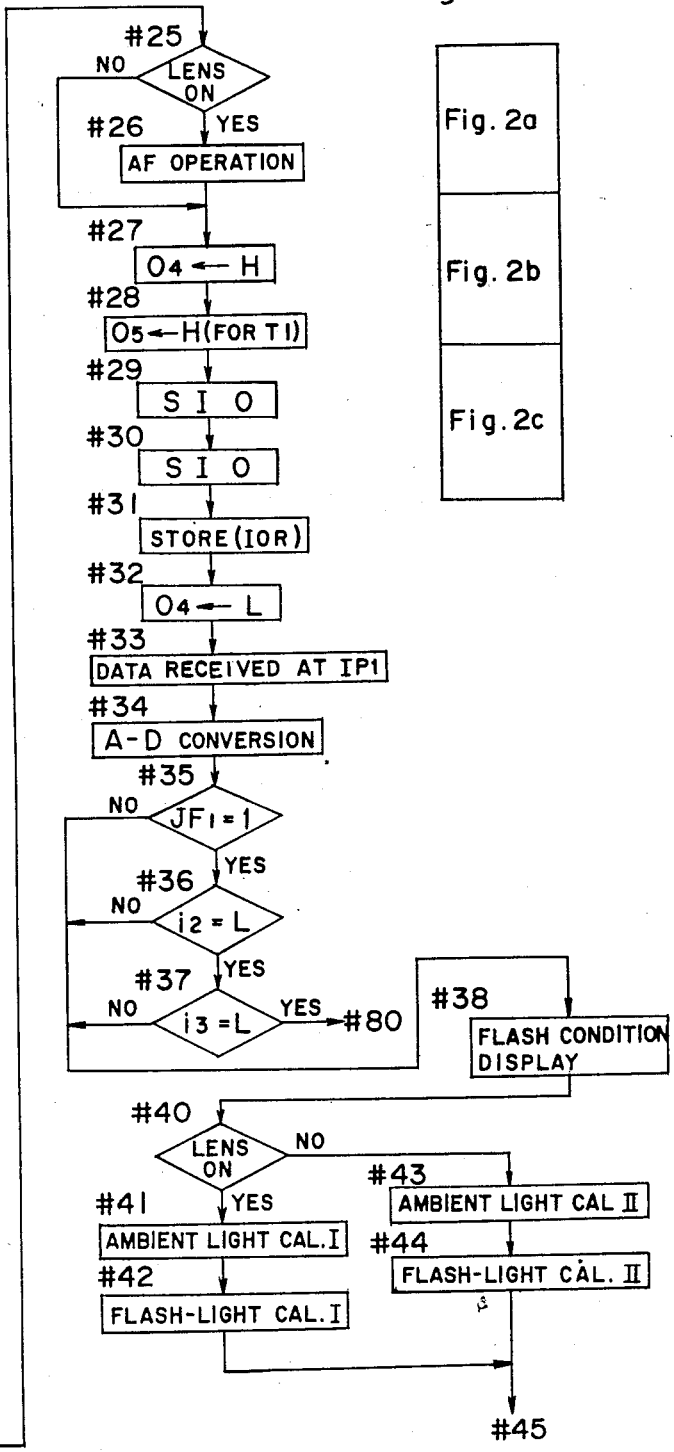
Figure 2B:
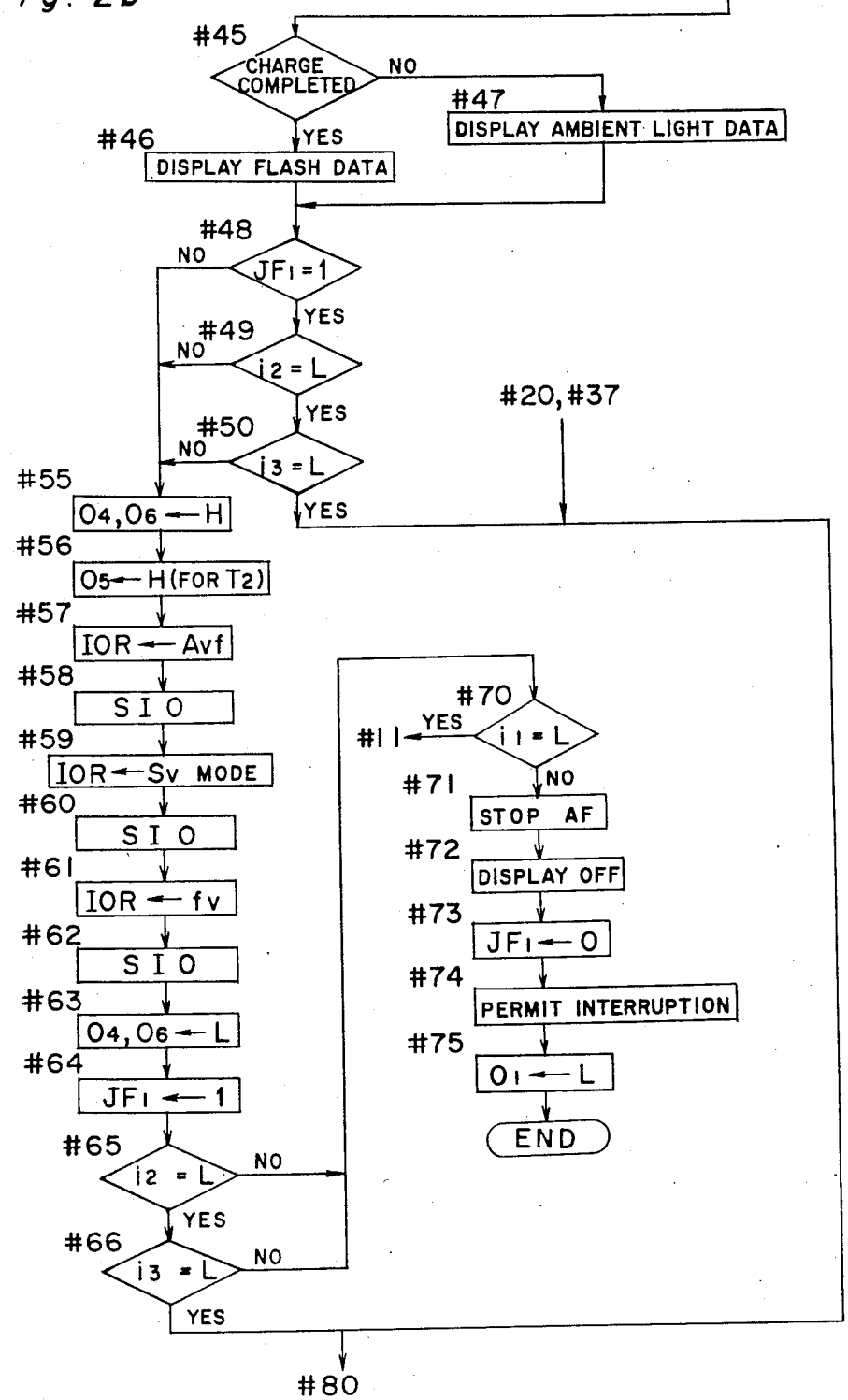
Figure 2C:
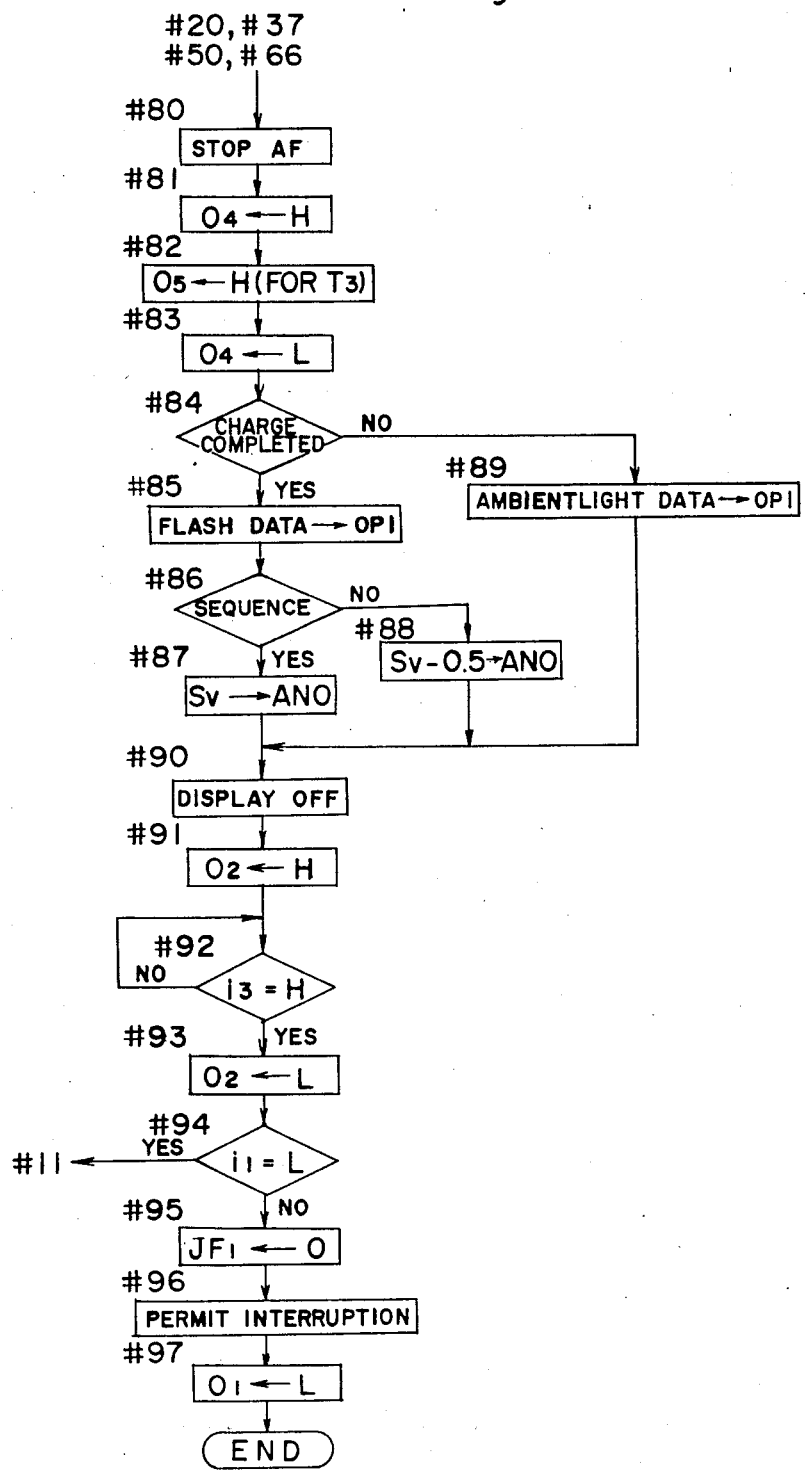

Referring particularly to FIGS. 2a, 2b and 2c taken together as shown in FIG. 2, a flow chart of the operation carried out by microcomputer MC1 is shown in FIG. 1b-1. When main switch MS1 of camera body V turns on, power is applied to microcomputer MC1, thereby starting an operation when power is supplied. At step #1, outputs O1-O6 produce a LOW signal, and at step #2, data for cancelling any display given through display circuit DP is produced. Then, at step #3, any transmission of data through data bus DB to autofocus control circuit AF is cut off thereby disabling the autofocus control circuit AF from being operated. At step #4, microcomputer MC1 is set in a condition ready to receive an interruption signal to its interruption terminal, iT, and it stops its operation.

When light measuring switch S1 closes, a LOW signal is applied to interruption terminal iT, thereby again starting the operation of microcomputer MC1. At step #10, output O1 produces a HIGH signal, thereby producing LOW from inverter IN1. Thus, transistor BT1 conducts to supply electric power to circuits other than microcomputer MC1 and also to lens circuit LEC. At step #11, output O3 produces HIGH, thereby starting the data reading from lens circuit LEC in a manner described below. First, register (BR) (A reference character(s) given in parentheses represents an element, such as a register or a flag, established within the microcomputer through programming) in microcomputer MC1 is set to "0", and at step #13, operations based on the serial-in/out instruction are carried out. Accordingly, the data from lens circuit LEC are read in serial in/out register (IOR) in microcomputer MC1. The contents of serial in/out register (IOR) are loaded into a certain register for the first time, thereafter adding "1" to the content of the register (BR). At the step #16, whether or not the contents of register (BR) reach "N" is determined, and if not, the procedure will return to step #3 to repeat the above mentioned functions. After repeating steps #13 to #16 for a predetermined number of times N, the contents of register (BR) reaching "N" is determined at step #16 and the procedure goes to step #17.

Next, the description is directed to data reading from the lens circuit LEC with reference to FIGS. 1b-1, 1b-2 and 7. FIG. 7 particularly shows the detail of input/output control circuit IOC shown in FIG. 1b-1. When output O3 of microcomputer MC1 produces a HIGH signal, AND gates AN1 and AN3 are enabled. The HIGH signal from ouput O3 of microcomputer MC1 is also applied through line LN1 to lens circuit LEC, thereby activating the lens circuit LEC. Then, eight clock pulses are serially produced from output SCK of microcomputer MC1, which are applied through AND gate AN3 and line LN2 to lens circuit LEC. In a synchronized relationship with the positive edges of the eight clock pulses, lens circuit LEC serially sends the first data through line LN3. The first data is applied through AND gate AN1 and OR gate OR1 to input SIN of microcomputer MC1. In the microcomputer MC1, the first data are read serially in register (IOR) in a sunchronized relationship with the negative edges of the same eight clock pulses.

Lens circuit LEC includes a ROM (read-only memory) for storing a plurality of fixed data in a predetermined alignment, address designating means for sequentially designating the address of ROM, and data producing means for serially producing the read data. Each time the train of eight clock pulses is applied through line LN2, address data are renewed, thereby producing different types of data serially in a predetermined number. Then, microcomputer MC1 stores the data in the sent order at certain registers. Thus, one register carries one data. For example, one register in microcomputer MC1 carries minimum F-stop data (fully opened aperture data) and another carries maximum F-stop data, and so on. In this manner, a certain register in microcomputer MC1 always carries the same kind of data sent from the mounted interchangeable lens. When the data to be sent is a photographing distance data (this data is in relation to the amount of movement of the focusing lens), a coded plate (not shown) for producing data corresponding to the photographing distance is provided operatively in association with the distance ring of the lens. By the use of data produced from the coded plate in combination with the number of clock pulses counted, an address can be designated. A similar arrangement can be applied in the case where the mounted lens is a zoom lens.

Returning back to FIG. 2a, at step #17, output O3 produces a LOW signal, thereby stopping the data reading from lens circuit LEC. Then, at step #18, it is determined whether flag (JF1) is carrying "1" or not. Flag (JF1) carries "1" when the calculations for the exposure control are completed, but carries "0" if not. When it is determined that flag (JF1) is carrying "0" indicating that the exposure control calculations are not completed, the program advances to step #25. On the contrary, when it is determined that flag (JF1) is carrying "1", it is further determined at step #19 whether or not input i2 is receiving a LOW signal as a result of closure of release switch S2. When input i2 is not receiving a LOW signal, the program goes to step #25. But, if input i2 is receiving a LOW signal indicating that release switch S2 is turned on, the program advances to step #20. At step #20, it is still further determined whether or not input i3 is receiving a LOW signal as a result of closure or reset switch S4. If reset switch S4 is still off, because the exposure control mechanism has not completed its charge, input i3 receives a HIGH signal. In this case, the program goes to step #25. On the contrary, when the exposure control mechanism is charged to turn switch S4 on, input i3 receives a LOW signal. In this case, the program follows the procedure from step #80 (FIG. 2c) to carry out the exposure control operation.

At step #25, it is determined whether or not the check data is included within all the data read in from the lens. The check data, such as "10101010" which is common to every type of interchangeable lens, is stored in the ROM at a certain address in every type of interchangeable lens. When it is determined that no check data is transmitted, microcomputer MC1 determines that no lens is mounted or that the lens is not properly mounted. On the contrary, when it is determined that the check data is transmitted, microcomputer MC1 determines that the lens is properly mounted. When the check data is present indicating that the lens is properly mounted, the program goes to step #26 at which the read in data related to autofocusing adjustment are transmitted through data bus DB to autofocus control circuit AF. Thus, autofocus operation is carried out by circuit AF and, thereafter, the program goes to step #27. On the contrary, when there is no check data indicating that no lens is properly mounted, no autofocus operation is carried out. Thus, in this case, the program jumps from step #25 to #27.

At step #27, output O4 produces a HIGH signal, thereby enabling data exchange with the flash device and/or with flash controller IV. Then, at step #28, output O5 produces a HIGH signal for a predetermined period T1, such as 90 microseconds. This HIGH signal is applied through lines L3 and L13 to the flash device and/or flash controller. After this period T1, the flash device and/or flash controller determines that it is in a mode to transmit data from flash device and/or flash controller to camera body V. Such a mode is hereinafter referred to as FC mode. The data transmission is carried out in the following manner.

At step #29, based on the serial-in/out instruction, eight clock pulses are serially transmitted through lines L3 and L13 from camera body V to the flash device. In a synchronized relationship with the positive edges of the eight clock pulses, the flash device serially sends six bits of data through line L2 and L12. The six bits of data are read in serially in the flash controller in a synchronized relationship with the negative edges of the first six of the same eight clock pulses. Then, the flash controller determines the flash mode based on the read in data and the data set in the flash controller by the two-position switch movable between "simultaneous" and "sequence". Then, in a synchronized relationship with the positive edges of the remaining two of the same eight clock pulses, two bits of data indicating the result of this determination are sent out through lines L2 and L12. During step #29, microcomputer MC1 reads the six bits data and two bits data on line L2 is a synchronized relationship with the negative edges of the eight clock pulses in serial in/out register (IOR). However, the microcomputer MC1 will not utilize this data.

Then, at step #30, eight clock pulses are again serially transmitted through lines L3 and L13 in accordance with the serial in/out instruction. Depending on the number of flash devices connected or depending, when one flash device is connected, where it is connected, the operation in step #30 is different.

In the case where two flash devices are connected, one through flash controller IV at connector CN5 and the other at shoe connector CN9, no data is transmitted from the flash devices through lines L2 and L12. This is done by holding both flash devices in an open condition. The open condition is established when transistors BT35 and BT37 (FIG. 9a) in control circuit FLC1 are maintained off. While the two flash devices are held in the open condition, the flash controller produces, in a synchronized relationship with the positive edges of the clock pulses, through line L2 to camera body V data which is determined by the setting of the two-position switch in combination with the data applied previously at step #29 to the flash controller from the two flash devices. Since the two flash devices are in the open condition at step #30, no interference takes place with the data sent from the flash controller on lines L2.

In the case where one flash device is connected through flash controller IV at connector CN5, the flash controller produces at step #30 the data obtained from the flash device through line L2. At this moment, the flash device produces data through line L12 in a manner similar to that carried out in step #29, but this time at step #30, the data is cut off by the flash controller.

In the case where one flash device is connected to shoe connector CN9, the operation in step #29 is repeated again in step #30. More specifically, at step #29, the data is produced from the flash device through line L2 in a synchronized relationship with clock pulses, and at step #30, the same data is produced again from the flash device through line L2 in a synchronized relationship with clock pulses.

It is to be noted that in the case where the flash controller is connected to the camera body but no flash device is connected to connector CN5, line L2 is maintained in the open condition to prevent signal transmission from taking place between camera body and flash device II directly connected thereto through connector CN9. In this case the open condition is established when transistors BT55 and BT 57 (FIG. 18) in flash control circuit CNC are maintained off.

Next, the description is directed to various data transferred in a synchronized relationship with the sixteen clock pulses during steps #29 and #30. The sixteen clock pulses are designated as bits b0, b1, b2, . . . and b15. A particular data is produced correspondingly to each bit. Table 1 given below shows the data with its name correspondingly to sixteen bits b0-b15, and it also shows the operating condition of the flash device, flash controller and camera.

TABLE 1

| Bit | Name of the Data | Data | Signal Transmission |
|---|---|---|---|
| b0 | Power On S. | H - power switch on | |
| b1 | Twin S. | L - bounce flash fashion | Flash Device → Flash Cont. |
| b2 | Ready S. | H - charge completed | |
| b3 | FDC S. | L - cease flash S. | Camera provides clock pulses. |
| b4 | Preserved | L | |
| b5 | ID S. | L - dedicated flash device | |
| b6 | Flash Mode S. | HH . . . Simultaneous | Flash Cont. → Flash Device |
| b7 | | HL . . . Former in Seq. LH . . . Later in Seq. LL . . . Single Flash | Camera provides clock pulses. |
| b8 | Power On S. | H - power switch on | |
| b9 | ID S. | L - dedicated flash device | Flash Device → Camera or |
| b10 | Seq. Flash S. | L - sequence flashing | |
| b11 | Ready S. | H - charge completed | Flash Cont. → Camera |
| b12 | FDC S. | L - cease flash S. | |
| b13 | Preserved | L | Camera provides clock pulses. |
| b14 | Preserved | L | |
| b15 | Preserved | L | |

Notes:
(a) S. represents Signal.
(b) H and L represent HIGH and LOW, respectively.
(c) - reads "in response to"

The first six data corresponding to the first six bits b0-b5 are produced from the flash device and are loaded in the flash controller. During the generation of the first six data, the camera body only produces the clock pulses.

In response to the positive edge of the first bit b0, a first data, namely a power on signal, is transmitted from the flash device to the flash controller, and in response to the negative edge of the first bit b0, the power on signal is loaded in the flash controller. The power on signal is HIGH when the power switch of the flash device is on.

Similarly, in response to the second bit b1, a second data, namely a twin signal, is sent from the flash device to the flash controller. The twin signal is LOW when the connected flash device is the same as flash device I and when the flash device is set in the bounce flashing fashion in which light emitter FLO2 is facing other than straight. The twin signal is HIGH when the situation is other than the above.

In response to the third bit b2, a third data, namely a ready signal, is sent from the flash device to the flash controller. The ready signal is HIGH when the main capacitor in the flash device is charged to the require level, and LOW if not.

In response to the fourth bit b3, a fourth data, namely an FDC signal, is sent from the flash device to the flash controller. The FDC signal is low when an FDC signal generator (which corresponds to circuit INF in FIG. 9) is enabled, and HIGH when the FDC signal generator is not enabled. The FDC signal generator is enabled for a period of time after X contact Sx is changed from a closed state to an opened state with a flash terminating signal from the camera body having reached the flash device prior to a lapse of predetermined time after the initiation of flash light emission. It is understood that when no FDC signal is generated, the light is not sufficient even after the full emission of flash light. In such a case, it will result in an under exposure.

The fifth bit b4 is preserved for future use. For example, if an auxiliary light emitter is provided for the auto-focus adjustment, a signal in response to the fifth bit b4 can be transmitted indicating that the auxiliary light emitter is ready for the light emission.

In response to the sixth bit b5, a sixth data, namely an ID (identification) signal, is sent from the flash device to the flash controller. The ID signal is LOW when the connected flash device is a flash device designed for the flash photographing system of the present invention. According to the commercially available flash devices, there are some which produce a HIGH signal on line L2 when the main capacitor is charged to the required level. When this type of flash device is mounted, the flash controller and camera body read the HIGH signal, thereby distinguishing the flash device of conventional type from the flash device applicable for the present system.

In response to the seventh and eighth bits b6 and b7, a seventh data, namely a flash mode signal, which is a 2-bit signal, is sent from the flash controller to the flash device through lines L2 and L12. The flash mode signal is determined by the power on signal which has been transmitted to flash controller IV from the flash device and the data set in the flash controller by the two-position switch. In other words, the flash controller produces data representing the actual flash mode signal through lines L2 and L12. Various flash mode signals under different conditions are shown in Table 2 below.

TABLE 2

| Power on S. on line L2 | Power on S. on line L12 | two-position sw. | Flash Mode | Flash Mode S. L2 b6 | L2 b7 | L12 b6 | L12 b7 |
|---|---|---|---|---|---|---|---|
| L | L | Simultaneous | No flash | L | L | L | L |
| L | L | Sequence | No flash | L | L | L | L |
| H | L | Simultaneous | Single flash | L | L | L | L |
| H | L | Sequence | Single flash | L | L | L | L |
| L | H | Simultaneous | Single flash | L | L | L | L |
| L | H | Sequence | Single flash | L | L | L | L |
| H | H | Simultaneous | Simultaneous | H | H | H | H |
| H | H | Sequence | Sequence | L | H | H | L |

When the flash device receives a particular flash mode signal shown in Table 2, the flash device carries out the operation based on that particular flash mode signal.

As stated above, the data corresponding to bits b0-b5 are sent from the flash device to the flash controller, and the data corresponding to bits b6 and b7 are sent in the opposite direction, i.e., from the flash controller to the flash device.

In the case where the flash device is connected to connector CN5 and/or CN9 through an extension cable, an undesirable stray capacitance may be produced among lines L2 and L3 and ground, resulting in an undesirable impedance in the extension cable. When the ID signal produced correspondingly to bit b5 from flash device is HIGH, and in the case where no flash controller is connected, there will be no discharge circuit. Thus, the charge by the HIGH signal is maintained in the lines as the stray capacitance. Thus, in the following steps corresponding to bits b6 and b7, the flash device receives pseudo HIGH signals. According to one example, in the case where the desired mode is a single flash mode with one flash device connected to shoe connector CN9 through an extension cable, pseudo HIGH signals appear as data corresponding to bits b6 and b7. Thus, the flash device erroneously reads as simultaneous flash mode or sequence flash mode, resulting in erroneous operation. In order to avoid such an erroneous operation, the flash device according to the system of the present invention produces a LOW signal as the ID signal at the bit b5.

The next eight data (Table 1) corresponding to the next eight bits b8-b15 are produced from the flash device and are loaded in the camera body, when a flash device is connected to the shoe connector CN9.

But, when a flash device is connected to the connector CN5 of the flash controller IV, the data transmission can be such that the data read from the flash devices at bits b8-b15 may be applied, as they are, through the flash controller to the camera body, thereby storing the non-revised data from the flash device in the camera body. However, this will produce a problem explained below. When a flash device is connected to the flash controller through an extension cable, there may be an undesirable delay of signal transmission by the cable and circuit in the flash controller. Thus, the clock pulses sent from camera body to flash device may be delayed, resulting in a time difference between the positive edges of the same clock pulse in the camera body and in the flash device. In response to the positive edge of the clock pulse in the flash device data is produced which is applied through the cable and the flash controller to the camera body, further delaying the data. In the camera body, the data is read in in response to the negative edge of the clock pulse. But when the total delay, i.e., the sum of delay of the clock pulse sent to the flash device and the delay of the data sent back to the flash controller, is longer than a period between the positive and negative edges of the clock pulse, the camera body reads an error signal. Thus, according to the system of the present invention, the data from the flash device is temporarily stored in the flash controller and, then, the data is sent from the flash controller to the camera body.

In the case where flash controller IV is connected to camera body V, but no flash device is connected to the flash controller at connector CN5, flash controller IV produces no signal on line L2 during bits b8-b15, but instead it is held in an open condition, i.e., high impedance condition. Thus, any signal transmitted from the flash device on shoe connector CN9 to camera body V will not be interferenced.

When the flash devices are connected to shoe connector CN9 and connector CN5 of flash controller IV, flash controller IV produces, during bits b6 and b7, a data "11", "10" or "01" indicating the multi-flash. The produced data is applied to each flash device, which is then held in the high impedance condition producing no data through lines L2 and L12. Then, the flash controller determines data based on the data read from both flash devices and the setting of a two-position switch. The determined data is transmitted, during bits b8-b15, from flash controller IV to camera body V.

Next, each data in bits b8-b15 is described.

In response to the bit b8, data, namely a power on signal, is sent from the flash device or flash controller to the camera body. When it is sent from the flash device, the power on signal is HIGH when the power switch of the flash device is closed. When it is sent from the flash controller, the power on signal is HIGH when at least one flash device has provided HIGH to flash controller in the previous step at the bit b0.

In response to bit b9, a data, namely an ID signal, is sent from the flash device or flash controller to the camera body. When the ID signal is sent from the flash device, a LOW signal is applied indicating that the connected flash device is a flash device designed for the flash photographing system of the present invention. When the ID signal is sent from the flash controller, a LOW signal is applied in the case where the flash controller has received at least one a LOW signal in the previous step at b5 from the connected flash devices.

In response to bit b10, data, namely a sequence flash signal, is sent from the flash device or flash controller to the camera body. If the sequence flash signal is sent from the flash device, it is LOW when the mounted flash device is a double flash-head type set in the double-action twin flash mode, and HIGH when it is other than that. If the sequence flash signal is sent from the flash controller, it produces a LOW signal when mode is sequence, and HIGH when the mode is other than that.

In response to bit b11, data, namely a ready signal, is sent from the flash device or flash controller to the camera body. If the ready signal is sent from the flash device, it is HIGH when the main capacitor in the flash device is charged to a required level. If the ready signal is sent from the flash controller, it is HIGH when the signals received in the previous step at b2 are all HIGH, indicating that the connected flash devices are both ready for the light emission. When at least one of the two flash devices in the previous step b2 has provided a LOW signal to the flash controller, the flash controller sends a LOW signal at this step b11.

In response to bit b12, data, namely an FDC signal, is sent from the flash device or flash controller to the camera body. If the FDC signal is sent from the flash device, it is LOW when the FDC signal generator of the flash device is enabled. On the contrary, if the FDC signal is sent from the flash controller, it is LOW when at least one of the two flash devices in the previous step b3 has provided a LOW signal to the flash controller.

The bits b13, b14 and b15 are preserved for the future use. For the time being, LOW signal are sent from the flash device or flash controller to the camera body during bits b13-b15.

When the data transmission described above is completed, the flash device and the flash controller are set in a waiting mode to receive pulses from lines L3 and L13. During the waiting mode, line L2 produces a HIGH signal when the flash device is charged to the required level, and a LOW signal if not.

Referring back to FIG. 2a, at step #31, the data sent from the flash device of flash controller are read in a certain register (IOR) in the microcomputer MC1. Thereafter, at step #32, output O4 produces a LOW signal. Then, at step #33, various data applied to input IP1, such as exposure control mode, set exposure time Tvs in APEX index, set aperture size Avs in APEX index, set or detected (Detection is done by reading marks formed on the film cartridge.) film sensitivity Sv in APEX index, etc., are stored at number of registers prepared for each data. At step #34, output signal Bv-Avo (Bv is the brightness of an object to be photographed in APEX index, and Avo is a fully opened aperture value in APEX index) from light measuring circuit LM is A-D converted, and the converted digital signal is stored in a certain register. Then, at steps #35-#37, it is determined, in a similar manner to steps #18-#20, whether or not to carry out the exposure control operation. When it is determined to carry out the exposure control operation, the program advances to step #80, but if not, the program goes to step #38.

The detail of step #38 is shown in FIG. 3. At step #210, it is detected whether or not the FDC signal is LOW or HIGH. At step #210, when it is detected that the FDC signal is LOW, FDC display is effected at step #211, indicating that sufficient flash light has been emitted. Thereafter, at step #212, charge completion display is disabled. On the contrary, at step #210, when it is detected that FDC signal is HIGH, FDC display is disabled at step #213, and at step #214, it is detected whether a charge completion signal is present or not. When the charge completion signal is present, the program goes to step #215 for display of charge completion. When the charge completion signal is not present, the program goes to step #212 disabling the charge completion signal. Thereafter, the program goes to step #40.

Referring back to FIG. 2a, at step #40, it is determined whether or not check data "10101010" is present. When check data is present, calculations at steps #41 and #42 are carried out, and if not, calculations at steps #43 and #44 are carried out. The calculations at steps #41, #42, #43 and #44 are described in detail below with reference to FIGS. 4a to 6.

Referring particularly to FIGS. 4a and 4b, a flow chart is shown for carrying out an ambient light calculation I for step #41.

At step #101, an exposure value EV expressed in APEX index is calculated through an equation (1) below:

$$(Bv - Avo) + Avo + Sv = Ev. \qquad (1)$$

Then, at step #102, the exposure control mode is detected, whether it is a P mode (program exposure mode) or not. When it is P mode, the procedure goes to step #103 and to #104. In these steps, following calculations are effected.

$$p \cdot Ev = Av \qquad (0 < p < 1) \qquad (2)$$

$$Ev - Av = Tv \qquad (3)$$

wherein Av and Tv are given in the APEX index representing the aperture value and exposure time, respectively, to be controlled, and p is a program constant to determine a ratio of distribution of exposure value Ev between aperture value and exposure time value. The program constant p determines the program chart, and can be set at the design stage or can be made variable for the manual setting by the user. Then, at step #105, when it is determined that Av < Avo, Avo is assigned to Ava at step #106, and at step #107, $$Ev - Ava = Tv \qquad (5)$$

is calculated. Then, when Tvo ≦ Tv, Tv in equation (5) is assigned to Tva (step #112), and at the same time, providing no warning (step #111). On the contrary, when Tvo > Tv, Tvo is assigned to Tva (step #110), and at the same time, providing a warning "UNDER" for the indication of under exposure (step #109). The exposure time Tvo corresponds to the longest controllable exposure time in the camera body.

At step #105, when Av obtained through the equation (2) is such that Av≧Avo, the program goes to step #113 at which it is determined whether AV>AvM. When Av>AvM, the program goes to step #114 at which AvM is assigned to Ava. Then, at step #115, the calculation of equation (5) is carried out. Then, at step #116, when it is detected that Tv≦TvM, Tv is assigned to Tva and no warning is provided. On the contrary, when it is detected that Tv>TvM at step #116, TvM is assigned to Tva and a warning "OVER" is provided for the indication of over exposure. The exposure time TvM corresponds to the shortest controllable exposure time in the camera body.

At step #113, when it is detected that Av≦AvM, no warning is produced. Then, the Av obtained through equation (2) is assigned to Ava representing the aperture value for photographing under the ambient light, and the Tv obtained through equation (3) is assigned to Tva representing the shutter speed value for photographing under the ambient light.

Then, at step #163, a calculation $$Ava - Avo = dAva \quad (4)$$

is carried out, in which dAva represents a number of steps stopped down under the ambient light. Then, data Ava, dAva and Tva are stored in registers.

At step #102, when it is detected that the mode is not P mode, the program goes to step #125 (FIG. 4b) to detect whether or not the mode is S mode (exposure time preferred/aperture auto-controlled mode). When the mode is S mode, set exposure time data Tvs is assigned to Tva at step #126. Then a calculation $$Ev - Tva = Av \quad (6)$$

is carried out. When it is detected that Av<Avo at step #128, Avo is assigned to Ava, and also a warning "UNDER" is provided for the indication of under exposure. When Av≧Avo, the program goes to step #131 at which it is detected whether Av>AvM. When Av>AvM, AvM is assigned to Ava, and also a warning "OVER" is provided for the indication of overexposure. When it is detected that the condition is not Av<Avo or Av>AvM, Av as obtained from equation (6) at step #134 is assigned to Ava, and at the same time, no warning is provided. Thereafter, the program goes to step #163.

At step #125, when it is detected that the mode is not S mode, the program goes to step #140 to further detect whether or not the mode is A mode (aperture preferred/exposure time auto-controlled mode). When the mode is A mode, the program goes to step #141 at which the set aperture value Avs is assigned to Ava representing the aperture value for photographing under ambient light. Then, the calculation of equation (5) is carried out. Then at step #143, when Tvo>Tv, Tvo is assigned to Tva and at the same time, a warning "UNDER" is provided. When it is detected at step #143 that Tvo≦Tv, the program goes to step #146. Then, at step #146, when TvM<Tv, TvM is assigned to Tva and, at the same time, a warning "OVER" is provided. When it is detected that the condition is not Tvo>Tv or TvM<Tv, the result Tv obtained from the equation (5) is assigned to Tva representing the exposure time for photographing under ambient light and, at the same time, no warning is provided. Thereafter, the program goes to step #163.

When the mode is not P, S, or A, but is an M mode (normal setting exposure control mode), the program further goes to step #155 and to #156 at which set data Avs and Tvs are assigned to Ava and Tva, respectively. A following calculation $$Ev - (Tva + Ava) = dv$$

is carried out at step #157. When the result dv of the calculation is such that dv<−K (K is a constant representing the film latitude), a warning "UNDER" is produced. When the result is such that dv>K, a warning "OVER" is produced. When the result is such that −K≦dv≦K, no warning is produced. Thereafter, the program goes to step #163.

At step #163, using Ava representing the aperture value for photographing under the ambient light and Avo representing the fully opened aperture value, the dAva representing the number of steps stopped down under the ambient light is calculated through a following equation $$dAva = Ava - Avo.$$

Then, the program advances to step #42 for the flash light calculation I.

Referring to FIGS. 5a and 5b, a detail of step #42 for the flash light calculation I is shown. At step #170, when the detected mode is P mode, and at step #171, when Avo<3 (Avo=3 corresponds to F-stop number=2.8) "3" is assigned to Avc1. However, at step #171, when Avo≧3, Avo is assigned to Avc1. Then at step #174, $$Avc2 = 6 + (Sv - 5) \quad (7)$$

is calculated. Here, 6 corresponds to F-stop No. 8, and 5 corresponds to ISO100. Then, at step #175, when Avc2>AvM, AvM is assigned to Avc2, but if Avc2≦AvM, Avc2 continues to hold the value equal to the result obtained through equation (7). Then, the program goes to step #177 at which a calculation $$Ev + 1 - 6 = Av \quad (8)$$

is carried out. When the calculated result Av is detected to be Av>Avc2 at step #178, Avc2 is assigned to Avf at step #179. At the next step #180, when it is detected that $Avf + 6 \geq Ev$, "6" is assigned to Tvf. However, at step #180, when it is detected that Avf+6<Ev, it is further detected at step #182 whether or not the data obtained from the flash device represents the sequence flash mode (or double-action twin flash mode). When the flash mode is other than the sequence flash mode (or double-action twin flash mode), "7" is assigned to Tvf. When the flash mode is sequence flash mode (or double-action twin flash mode), "6" is assigned to Tvf, even when Avf+6<Ev.

When the result Av calculated from equation (8) is such that Av<Avc1, the program goes from step #184 to #185, at which Avc1 is assigned to Avf. When the result Av calculated from equation (8) is such that Avc1≦Av≦Avc2, the result Av is assigned to Avf as an aperture value for photographing with an aid of flash light. Thereafter, the program goes to step #183 at which "6" is assigned to Tvf. Then, the program goes to step #204.

At step #170, when it is detected that the mode is not P mode, the program goes to step #187 at which it is detected whether the data obtained from the flash device (or flash controller IV) represents the sequence flash mode (or double-action twin flash mode) or other mode. When the flash mode is a sequence flash mode, "6" (corresponding to 1/60 sec) is assigned to Tvk representing the limit of synchronizing exposure time. When the flash mode is not a sequence flash mode, "7" (corresponding to 1/125 sec) is assigned to Tvk. Thereafter, the program goes to step #190 at which it is detected whether the mode is A mode or not.

When it is detected at step #190 that the mode is A mode, set aperture value Avs is assigned to Avf (step #192) and Tvk is assigned to Tvf (step #191). Then, the program goes to step #204. When it is detected at step #190 that the mode is not A mode, the program goes to #193.

Referring to FIG. 5b, at step #193, it is detected whether Tvs>Tvk or not. If yes, Tvk is assigned to Tvf and, if no, Tvs is assigned to Tvf. Then, at step #196, it is detected whether the mode is S mode or not. When the mode is S mode, $$Ev+1-Tvf=Av \qquad (9)$$

is calculated. Then, it is detected whether the calculated result Av is below Avo, above AvM or between Avo and AvM. When the result Av is below Avo (Av<Avo), Avo is assigned to Avf (step #199). When the result Av is above AvM (Av>AvM), AvM is assigned to Avf (step #201). And, when the result Av is between Avo and AvM (Avo≦Av≦AvM), Av is assigned to Avf. Thereafter, the program goes to step #204.

On the other hand, if it is detected at step #196 that the mode is not S mode, i.e., the mode is M mode, the program goes to step #203 in which the value Avs is assigned to Avf, and further advances to step #204.

Referring to FIG. 6, the description is now directed to the details of the ambient light calculation II at step #43 and flash light calculation II at step #44.

At step #220, a calculation $$Bv-Avn+Sv=Tv \qquad (10)$$

is carried out. Here, Bv−Avn represents an output of light measuring wherein Avn is an aperture value representing not the aperture controlled according to the present embodiment, but an aperture value representing the manually set or fixed aperture value, such as in various adaptors like an extention ring, a bellows, a pin hole adaptor, or an interchangeable lens.

Then, at step #221, it is detected whether the mode is M mode or not. When it is M mode, the program goes to step #222 at which set exposure time Tvs is assigned to control exposure time Tva. Then, a calculation is carried out as follows:

$$Tva-Tv=dv,$$

wherein Tv is the result of equation (10). When the result dv of the calculation is such that dv<−K (K is a constant representing the film latitude), a warning "OVER" is produced. When the result is such that dv>K, a warning "UNDER" is produced. When the result is such that −K≦dv≦K, no warning is produced. Thereafter, the program goes to step #238.

When it is detected at step #221 that the mode is not M mode, it is understood that the mode is automatic exposure control mode. In this case, the program follows step #230 et seq. to detect whether the result Tv of equation (10) is smaller than Tvo, greater than TvM, or between Tvo and TvM. When Tv<Tvo, Tvo is assigned to Tva, and a warning "UNDER" is produced. When Tv>TvM, TvM is assigned to Tva, and a warning "OVER" is produced. When Tvo≦Tv≦TvM, the result Tv of equation (10) is assigned to Tva, and no warning is produced. Thereafter, the program goes to step #238.

At step #238, "0" is assigned to dAva. Then, at step #239, a warning data is assigned to Ava so as to permit the warning of "NO LENS MOUNTED".

At the next step #240, it is detected whether the mode is P mode or not. When the mode is P mode, the program goes to step #241 for detecting whether Tv (obtained from equation (10)) is greater than "6". At step #241, when it is detected that Tv≦6, ("6" corresponds to 1/60 sec)

"6" is assigned to Tvf. However, at step #241, when it is detected that

Tv>6, it is further detected at step #242 whether or not the flash mode is the sequence flash mode. When the flash mode is other than the sequence flash mode, "7" ("7" corresponds 1/125 sec) is assigned to Tvf. When the flash mode is sequence flash mode, "6" is assigned to Tvf.

At step #240, when the detected mode is not P mode, it is further detected at step #245 whether or not the flash mode is sequence flash mode. When the flash mode is a sequence flash mode, "6" (corresponding to 1/60 sec) is assigned to Tvk representing the limit of synchronizing exposure time. When the flash mode is not a sequence flash mode, "7" (corresponding to 1/125 sec) is assigned to Tvk (step #247). Thereafter, the program goes to step #248 at which is is detected whether the mode is A mode or not.

When it is detected at step #248 that the mode is A mode, Tvk is assigned to Tvf (step #249). Then, the program goes to step #253. When it is detected at step #248 that the mode is not A mode, the program goes to #250. At step #250, it is detected whether Tvs≦Tvk or not. If yes, Tvs is assigned to Tvf and, if no, Tvk is assigned to Tvf. Then, the program goes to step #253.

At step #253, "0" is assigned to dAvf. Then, at step #254, a warning data is assigned to Avf so as to permit the warning of "NO LENS MOUNTED". Then, the program goes to step #45 (FIG. 2b).

It is to be noted that in the case of sequence flash mode three flash devices, at maximum, emit light sequentially. Thus, the limit of synchronizing exposure time, i.e., a period of time between the closure of X contact (Sx) and the start scan of trailing curtain, is made longer than the time necessary for the three flash devices to emit light, such as 1/60 second. On the contrary, when the flash mode is not a sequence flash mode, the flash lights emit light simultaneously. Thus, the limit of synchronizing exposure time is made longer than the time necessary for one flash light to exit light, such as 1/125 second.

Referring back to FIG. 2b, after the above described calculations, the program goes to step #45 at which it is detected whether or not the ready signal (indicating the completion of charge) is produced from the flash device. When the ready signal is present, flash photographing is available. Thus, aperture value Avf for the flash photographing and exposure time value Tvf for the flash photographing are applied to the display circuit DP. On the contrary, when the ready signal is not present, photographing under an ambient light is available. In this case, aperture value Ava for the ambient light photographing and exposure time value Tva for the ambient light photographing are applied to the display circuit DP. Then, at steps #48-#50, a procedure similar to steps #18-#20 is carried out, that is, the further procedure will follow the step #80 et seq. if exposure control operation is to be carried out, and the step #55 et seq. if not.

At step #55, microcomputer MC1 produces a HIGH signal from outputs O4 and O6. Accordingly, NAND gate NA1 and AND gate AN11 (FIG. 7) are enabled to permit signal transmission through lines L2 and L12 from camera body V to the flash device. Then, a HIGH signal is produced from output O5 for a predetermined period of time T2 (such as 150 microseconds). The HIGH signal from output O5 is transmitted through lines L3 and L13 to the flash device and flash controller, thereby informing that the mode is the CF mode, that is a mode for transmitting various data from camera body V to the flash devices. Then, microcomputer MC1 sets the aperture value Avf for photographing under flash light in the serial in/out register (IOR). Thereafter, the set data are serially sent out. Next, the data of film sensitivity Sv and data of exposure mode are set in register (IOR), and are sent out serially. Next, the data of focal length fv of the mounted interchangeable lens are set and serially sent out. Then, at step #63, outputs O4 and O6 produce a LOW signal, and the program goes to step #64.

Next, the description is particularly directed to the data transmission between the flash device and camera body V.

Referring to FIG. 7, a detail of input/output control circuit IOC is shown. When the mode is FC mode, a LOW signal is applied to circuit IOC from output O6 of microcomputer MC1. Thereupon, NAND gate NA1 produces a HIGH signal and AND gate AN11 produces a LOW signal, thereby turning transistors BT15 and BT17 off and maintaining line L2 in the open condition. And the output O4 produces a HIGH signal, thereby enabling AND gates AN5, AN7 and AN9. Then, the clock pulses from output SCK of microcomputer MC1 are transmitted through AND gate AN5 and OR gate OR3. At the HIGH signal of the clock pulses, inverter IN3 produces a LOW signal, thereby turning transistor BT11 on, and at the LOW signal of the clock pulses, inverter IN5 produces a HIGH signal, thereby turning transistor BT13 on. Thus, line L3 produces similar clock pulses.

In the FC mode, the data from the flash device through line 2 are permitted to pass through the circuit IOC to serial-input terminal SIN of microcomputer MC1 in the following manner. In the FC mode, transistors BT15 and BT17 are both turned off. Thus, when a HIGH signal is applied to L2 from the flash device, transistor BT19 turns on, thereby producing a HIGH signal from inverter IN7. When a LOW signal is applied to L2, transistor BT19 turns off, thereby producing a LOW signal from inverter IN7. These HIGH and LOW signal from inverter IN7 are transmitted through OR gate OR1 to serial-input terminal SIN of microcomputer MC1.

On the contrary, when the mode is CF mode, output O6 produces a HIGH signal, thereby enabling NAND gate NA1 and AND gate AN11. Then the output O4 produces a HIGH signal, thereby enabling AND gates AN5, AN7 and AN9, and the data from serial-output terminal SOU of microcomputer MC1 pass through AND gate AN9. When the signal from output SOU is HIGH, NAND gate NA1 produces a LOW signal, thereby turning transistor BT15 on, and providing a HIGH signal to line L2. When the signal from output SOU is LOW, AND gate AN11 produces a HIGH signal, thereby turning transistor BT17 on, and providing a LOW signal to line L2.

Referring back to FIG. 2b, a further description on the flow chart is given. At step #64, since the preparation for the exposure control is completed, "1" is assigned to a flag (JF1). Then, at steps #65 and #66, it is detected whether or not to start an exposure control operation, in a similar manner to the previous steps #19 and #20. If yes, the program goes to step #80, and if no, the program goes to step #70. At step #70, it is detected whether or not the light measuring switch S1 is turned on, by the detection whether or not input i1 is receiving a LOW signal. When input i1 is LOW, the program returns back to step #11 and repeats the above described operations. However, when input i1 receives a HIGH signal, the operation of auto-focus control circuit AF is stopped by the microcomputer MC1, and, nothing is made to be displayed through display circuit DP. Then, "0" is assigned to flag JF1. At the next step #74, it is permitted to receive an interruption signal through terminal iT. Thereafter, a LOW signal is produced from output O1, thereby turning transistor BT1 off and cut off the power supply (+V), and ending the operation of microcomputer MC1.

Referring to FIG. 2c, when it is required to carry out the exposure control operation, the program follows the step #80 et seq. At step #80, the operation of auto-focus control circuit AF is stopped. Then, output O4 produces a HIGH signal, and output O5 produces a HIGH signal for a predetermined period of time T3, such as 210 microseconds. Then, output O4 produces a LOW signal. The flash device and flash controller read this signal from output O5 through line L3 so that they are informed that an ES mode has been established for carrying out the exposure control operation. Then, there is a wait until line L1 is grounded by the closure of X contact Sx provided in the camera body. At step #84, it is detected whether a ready signal is produced from the flash device or not. When the ready signal is produced from the flash device and is supplied to the microcomputer MC1, the exposure control values Tvf and dAvf for flash photographing are produced from output OP1 and are applied to exposure control circuit ECC (step #85). On the contrary, when microcomputer MC1 is not receiving any ready signal, the exposure control values Tva and dAva for ambient light photographing are produced from output OP1 and are applied to exposure control circuit ECC (step #89). In the case of flash photographing, it is further detected whether the mode is sequence flash mode or not. If the mode is sequence flash mode, an analog signal corresponding to film sensitivity Sv is produced from output ANO, and if not, output ANO produces an analog signal corresponding to Sv-0.5. A further detail of these analog signals will be described later in connection with FIG. 8.

At step #90, nothing is displayed through display circuit DP, and then, output O2 produces a HIGH signal. Thereupon, release circuit RL operates to start the exposure control operation. Then, the aperture mechanism is operated to control the size of aperture, and a reflection mirror (not shown) flips up. When the mirror flips up completely, a leading curtain starts to scan. When the leading curtain completes its scan, X contact Sx closes, thereby effecting, in the case of flash photographing, the emission of flash light. The amount of flash light to be emitted will be described later in connection with FIG. 8. After the exposure time from the start of the leading curtain, a trailing curtain starts to scan. When the trailing curtain completes its scan, the reflection mirror moves down, and the aperture mechanism sets the aperture in the fully opened condition. When the above exposure control operation completes, switch S4 turns off. As a result, a HIGH signal is provided to input i3 of microcomputer MC1. At step #92, microcomputer MC1 waits until it receives a HIGH signal to its input i3. When input i3 receives a HIGH signal, the program goes to step #93 at which a LOW signal is produced from output O2, and at step #94, it is detected whether or not input i1 is receiving a LOW signal, which is accomplished in response to the closure of light measuring switch S1. If input i1 is receiving a LOW signal, the program returns to step #11, and if it is receiving a HIGH signal, the program goes to step #95 to assign "0" to flag (JF1). At the next step #96, it is permitted to receive an interruption signal through terminal iT. Thereafter, a LOW signal is produced from output O1, thereby turning transistor BT1 off to cut off the power supply (+V), and ending the operation of microcomputer MC1.

Referring to FIG. 8, a detail of light amount control circuit FST is shown. It is provided for controlling the amount of flash light to be emitted from each connected flash device. A photodiode PD is located at a position to receive light which has been transmitted through the picture taking lens and reflected from the film surface. The output of photodiode PD is connected to a diode D11 for the logarithmic compression of the output signal from photodiode PD. Also connected to photodiode PD is an operational amplifier OA which receives data Sv from analog output ANO of microcomputer MC1 when it is in a sequence flash mode, and data Sv-0.5 when it is not in a sequence flash mode. Operational amplifier OA produces, during the emission of flash light, data determined by the intensity of flash light reflected from the object to be photographed, controlled aperture value and film sensitivity. Such data can be expressed as:

$$Qv - Sv - Avf$$

or $$Qv + (Sv - 0.5) - Avf,$$

wherein Qv is a logarithmically compressed value of intensity of reflected light from the object under flash light illumination. The output of operational amplifier OA is applied to the base of transistor BT29 which produces a collector current representing the logarithmically expanded value of the output signal from ampli-fier OA. The collector current is integrated in capacitor C11, which produces an integrated voltage:

$$2^{Sv} \cdot \int 2^{Qv} dt / 2^{Avf}$$

or $$2^{Sv-0.5} \cdot \int 2^{Qv} dt / 2^{Avf}.$$

From output O2, a HIGH signal is provided to circuit FST of FIG. 8 for starting the exposure control operation. In response to a HIGH signal from output O2, AND gate AN13 is enabled to produced a HIGH signal. A HIGH signal from output O2 is also applied to a delay circuit DL1 which after the delay of a predetermined time produces a HIGH output. The delayed HIGH output is applied also to reset terminals of T flip-flop TF1 and D flip-flop DF1, thereby releasing the reset condition. Thus, T flip-flop TF1 and D flip-flop DF1 are both in the operative condition. At this point, both T flip-flop TF1 and D flip-flop DF1 are in a reset condition, producing a LOW signal from the Q terminal and a HIGH signal from the $\overline{Q}$ terminal.

From terminal INT, which is the output of inverter IN7, shown in FIG. 7, HIGH and LOW signals transmitted from the flash device through line L2 are applied. Under the ES mode, a HIGH signal is applied from INT when the flash device is in the ready condition. Upon closure of X contact Sx, the flash device starts to emit light, and at the same time, the signal from INT changes in the following manner. Upon closure of the X contact, the signal from INT changes to a LOW signal for 2.5 milliseconds. Then, it holds HIGH for 1 millisecond, and then holds LOW for 5.5 milliseconds. Thereafter, the signal from INT is maintained HIGH. In other words, upon closure of the X contact, terminal INT produces two LOW pulses sequentially. The first LOW pulse is produced in response to the closure of the X contact and has a pulse width of 2.5 milliseconds. The second LOW pulse is produced after the interval of 1 millisecond from the end of the first LOW pulse and has a pulse width of 5.5 milliseconds. Therefore, when delay circuit DL1 starts to produce a HIGH output, AND gate AN15 produces a LOW output, inverter IN9 produces a HIGH output, NAND gate NA3 produces a HIGH output, and NAND gate NA4 produces a LOW output. Accordingly, transistors BT21 and BT27 turn on, and transistors BT23 and BT25 turn off. By the turn on of transistor BT21, a constant current Ic flows from the source +V through transistor BT21, resistor R2/3 and constant current source CI1 to ground. Thus, a first predetermined voltage is produced at a junction between resistor R2/3 and constant current source CI1, and which first predetermined voltage is applied to a non-inverting input of comparator AC1. The resistor R2/3 and constant current source CI1 are so selected that the first predetermined voltage is equal to 70% of a level appropriate for the proper exposure.

Next, the description is directed to the light amount control operation of the case when the mode is not the sequence flash mode with the flash device being connected to connector CN5 and/or CN9.

When the emission of the flash light starts at the positive edge of the first LOW pulse AND gate AN13 produces a LOW output, thereby producing a HIGH output from NAND gate NA4, and turning transistor BT27 off. Thus, capacitor C11 starts to integrate collector current of transistor BT29. In this case, since terminal ANO is producing an analog signal representing Sv-0.5, the integrated voltage Vx across the capacitor can be given as:

$$Vx = 2^{Sv} \cdot \int 2^{Qv} dt/2^{Avf} \cdot 2^{0.5}$$
$$\approx 0.7 \cdot 2^{Sv} \cdot \int 2^{Qv} dt/2^{Avf}.$$

When the integrated voltage Vx becomes equal to 0.7Z, that is, when $$0.7 \cdot 2^{Sv} \cdot \int 2^{Qv} dt/2^{Avf} = 0.7Z = Ic \cdot R2/3 \qquad (11)$$

wherein Z is a constant representing a voltage for the proper exposure, comparator AC1 produces a HIGH output, thereby producing a HIGH output from one-shot circuit OS1. The pulse from OS1 is applied through circuit IOC of FIG. 7 and line L3 to the flash device, thereby stopping the emission of flash light. Since equation (11) can be given as:

$$\int 2^{Qv} dt = 2^{Avf} \cdot Z/2^{Sv}, \qquad (12)$$

the flash device emits flash light for an amount appropriate for the proper exposure. For example, it takes about 2 milliseconds to fully emit the flash light, the flash device will stop its emission not longer than 2 milliseconds, which is shorter than the duration of the first LOW pulse. After the above described operation, circuit FST of FIG. 8 carries out a further operation based on the further signal, such as the second LOW pulse obtained from terminal INT, but since the flash mode is not sequence flash mode, such a further operation has no meaning.

Next, the description is directed to the light amount control operation for the sequence flash mode, particularly with two light emissions: the first light emission is effected during the first LOW pulse; and the second light emission is effected during the first half of the second LOW pulse. In this case, two flash devices are connected to connector CN5 and CN9, respectively. The emission of the first flash light is carried out in a similar manner as described above. The only difference is in the value of current for integrating the capacitor C11. In the sequence flash mode, analog output terminal ANO provides a signal Sv and, therefore, the integrated voltage across capacitor C11 can be given as:

$$Vx' = 2^{Sv} \cdot \int 2^{Qv} dt/2^{Avf}.$$

When Vx' becomes equal to 0.7Z, that is, when $0.7Z = 2^{Sv} \cdot \int 2^{Qv} dt/2^{Avf}$, comparator AC1 produces a HIGH signal to stop the emission of flash light. The above equation can be rewritten as:

$$\int 2^{Qv} dt = 0.7 \cdot 2^{Avf} \cdot Z/2^{Sv} \qquad (13)$$

indicating that the emitted light amount $\int 2^{Qv}$ is equal to 70% of the necessary light amount for the proper exposure. Then, when the signal at terminal INT changes from LOW to HIGH at the end of the first LOW pulse, T flip-flop TF1 changes its condition, thereby producing a HIGH output from its Q terminal and a LOW output from its $\overline{Q}$ terminal. At this time, D flip-flop DF1 receives the output of comparator AC1. Thus, when the exposure amount reaches 70% of the necessary light for the proper exposure during the emission of the first flash light, D flip-flop DF1 is changed to such a condition that its Q terminal produces a HIGH output and its $\overline{Q}$ terminal produces a LOW output. If the exposure amount resulted below 70% of the necessary light for the proper exposure, even when the first emission of flash light is completed, comparator AC1 continues to produce a LOW output even after the first LOW pulse. Thus, D flip-flop DF1 is maintained in a condition that its Q terminal produces a LOW output and its $\overline{Q}$ terminal produces a HIGH output.

When the light amount reached 70% of necessary light for the proper exposure by the first emission of flash light, NAND gate NA3 continues to produce a HIGH output. Thus, NAND gate NA4 produces a LOW output after the delay, caused by delay circuit DL3 from the receipt of a HIGH input from the terminal INT. Then, transistor BT27 turns on to discharge capacitor C11.

When the light amount is still below 70% of the necessary light for the proper exposure even at the end of the first LOW pulse, i.e., after 2.5 milliseconds from the start of the first emission of the flash light (for example, one full emission of flash light lasts about 2 milliseconds), capacitor C11 continues to hold its charge, in a manner described below. After 2.5 milliseconds from the start of emission, a HIGH signal is provided from terminal INT, thereby changing the condition of T flip-flop TF1 such that its Q terminal produces a HIGH output. At that time, D flip-flop maintains it $\overline{Q}$ terminal HIGH since the comparator AC1 continues to produce a LOW output. Thus, NAND gate NA3 produces a LOW output. And, even when the output from delay circuit DL3 produces a HIGH signal, NAND gate NA4 continues to produce a HIGH output, thereby maintaining transistor BT27 off. Thus, capacitor C11 further integrates the current representing the received light.

In the case where the light amount reached 70% of the necessary light amount for the proper exposure during the first emission of flash light, AND gate AN15 produces a HIGH output and inverter IN9 produces a LOW output, thereby turning transistor BT23 on to provide a second predetermined voltage level, determined by resistor R1/3 and constant current source CI1, to the non-inverting input of comparator AC1. The resistor R1/3 and constant current source CI1 are so selected that the second predetermined voltage is equal to 30% of a level appropriate for the proper exposure.

On the contrary, in the case where the light amount did not reach 70% of the necessary light amount before the end of the first LOW pulse, NAND gate NA3 produces a LOW output, thereby tuning transistor BT25 on. Thus, non-inverting input of comparator AC1 receives a third predetermined voltage level determined by resistor R1 and constant current source CI1, which is equal to 100% of the necessary light amount for the proper exposure.

Then, in response to next LOW input from terminal INT (that is the start of the second LOW pulse which occurs after 3.5 milliseconds from the start emission of the first shooting), the second emission of flash light starts. When the light amount had reached 70% during the emission of the first flash light, transistor BT27 turns off again in response to the second LOW pulse, and capacitor C11, which has been discharged at the aperture of the 1 millisecond HIGH pulse, starts to integrate the collector current of transistor BT29 from the beginning. However, when the light amount had not reached 70% during the emission of the first flash light, transistor BT27 is maintained off and, therefore, the capacitor C11, which is still carrying the charge accumulated during the emission of the first flash light, continues to integrate the collector current of transistor BT29 in addition to the charge already stored therein.

In the case, where the light amount had reached 70% during the emission of the first flash light, the second emission of the flash light stops when the amount of light amount during the second emission reaches 30% of the necessary light for the proper exposure, that is when the following equation is satisfied.

$$\int 2^{Qv2}dt = 0.3 \cdot 2^{Avf} \cdot Z/2^{Sv} \quad (14)$$

In this manner, the proper exposure is effected when the first and second emission of flash light are completed with the ratio of the light amount emitted by the first and second emission being fixed at 7:3.

In the case, where the light amount has not reached 70% during the emission of the first flash light, the second emission of the flash light stops when the amount of light emitted during the second emission reaches the remaining percentage of necessary light for the proper exposure, that is when the following equation is satisfied.

$$\int (2^{Qv1} + 2^{Qv2})dt = 2^{Avf} \cdot Z/2^{Sv} \quad (15)$$

In this manner, the proper exposure is effected when the first and second emission of flash light are completed with the ratio of the light amount emitted by the first and second emission being A:10-A, wherein A is less than 7.

Next, the description is directed to the light amount control operation for the sequence flash mode, particularly with three light emissions: the first light emission is effected during the first LOW pulse; the second light emission is effected during the first half (2.5 milliseconds) of the second LOW pulse; and the third light emission is effected during the latter half (3 milliseconds) of the second LOW pulse. In this case, three flash devices are connected to connector CN5, CN7 and CN9, respectively. The first and second light emissions are effected in the same manner as described above by the flash devices connected to connectors CN5 and CN9, and the third light emission is effected by the flash device connected to connector CN7 after the counting of 2.5 milliseconds from the negative edge of the second LOW pulse. At the start of the third light emission, since the signal from terminal INT is LOW, capacitor C11 continues to integrate the collector current from transistor BT29. If the light amount during the first and second emission is not sufficient for the proper exposure, an ineffective stop emission signal might be produced through line L3 during the emission of the third light, but the third flash device connected to connector CN7 emits full light or an amount determined within the third flash device, because only the start emission signal is transmitted through the connector CN7.

It is to be noted that since the FDC signal (the signal produced to stop the emission of the flash light during the second emission when the light amount has reached 100%) is controlled to produce within the first half (2.5 milliseconds) of the second LOW pulse, and the exposure control signal (the signal produced to stop the emission of the flash light, such as, during the first emission when the light amount has reached 70%) is produced with the first LOW pulse, there is no chance of an error operation caused by the ineffective stop emission signal.

Next, the description is directed to the circuit of a double flash-head type electronic flash device, such as flash device I, shown in FIG. 1b-2, in connection with FIGS. 9a, 9b, 10, 11, 12, 13a, 13b, 13c and 14.

Referring to FIGS. 9a and 9b, control circuit FLC1 is shown. Through terminal L3, a pulse with its width representing either FC, CF or ES mode, clock pulses for the data transmission, and pulses to stop the emission of flash, light are applied. When the terminal L3 receives a HIGH input transistor BT31 turns on, thereby producing a HIGH signal from output P3 of inverter IN11. A mode determining circuit TIC counts the pulsewidth of the HIGH pulse from output P3 and determines the mode, and thereby controls the flash device. The detail of the mode determining circuit TIC is described below.

Referring to FIG. 10, mode determining circuit TIC includes inverter IN19 which receives a HIGH signal from terminal P1 (FIG. 9b, bottom) during the time when line L1 is grounded upon closure of X contact Sx to turn transistor BT39 on, but it receives a LOW signal during the receipt of a pulse having a width representing either FC, CF or ES mode and clock pulses for the data transmission. Thus, during the latter, inverter IN19 produces a HIGH output. When a HIGH signal is applied from terminal P3, AND gate AN43 produces a HIGH output, thereby producing a HIGH output from one-shot circuit OS3. By the HIGH from one-shot circuit OS3, counter CO1 is reset, thereby start counting clock pulses $\phi 2$ from output CKO of microcomputer MC2. Also, by the same HIGH signal from one-shot circuit OS3, flip-flops FF1–FF7 are reset. Counter CO1 provides signals representing the result of the count to decoder DE0, which then produces four delayed HIGH pulses from its outputs Y1, Y2, Y3 and Y4. From the start of counting in counter CO1, signals at outputs Y1, Y2, Y3 and Y4 are delayed 60 microseconds, 120 microseconds, 180 microseconds and 240 microseconds, respectively. Therefore, from the start of counting, flip-flop FF1 is held in the set condition for 60 microseconds. Similarly, flip-flop FF3 is held in the set condition for 120 microseconds, flip-flop FF5 is held in the set condition for 180 microseconds, and flip-flop FF7 is held in the set condition for 240 microseconds. Therefore, AND gate AN45 is held in the enabled condition during 60-120 microseconds from the start of counting. Similarly, from the start of counting, AND gate AN47 is enabled during 120-180 microseconds and AND gate AN49 is enabled during 180-240 microseconds.

Then, one-shot circuit OS5 produces a pulse in response to the negative edge of the pulse applied from terminal P3. The pulse from terminal P3 has a pulse width which is equal to either 90 microseconds, 150 microseconds or 210 microseconds. When the pulse from terminal P3 has a pulse width of 90 microseconds, the pulse from one-shot circuit OS5 is transmitted through AND gate AN45 to a set terminal of flip-flop FF9, thereby producing a HIGH output from its Q terminal and further from terminal FC. When the pulse from terminal P3 has a pulse width of 150 microseconds, the pulse from one-shot circuit OS5 is transmitted through AND gate AN47 to a set terminal of flip-flop FF11, thereby producing a HIGH output from its Q terminal and further from terminal CF. Furthermore, when the pulse from terminal P3 has a pulse width of 210 microseconds, the pulse from one-shot circuit OS5 is transmitted through AND gate AN49 to a set terminal of flip-flop FF13, thereby producing a HIGH output from its Q terminal and further from terminal ES.

After the pulse having a pulse width which is equal to either 90 microseconds or 150 microseconds, a train of clock pulses, each having a pulse width of about a few microseconds, are applied from terminal P3 for the data transmission. In this case, one-shot circuits OS3 and OS5 produce pulses in response to such clock pulse from AND gate AN43, but since the time interval between these two pulses from circuits OS3 and OS5 is a few microseconds which is much narrower than 60 microseconds, there will be no error operation of flip-flops FF9, FF11 and FF13.

When terminal FC produces a HIGH signal, counter CO3 is released from the reset condition, thereby making the decoder DE1 in a condition ready to produce an output. Then, the train of data transmission clock pulses from terminal P3 are inverted in inverter IN21 and are applied to counter CO3, which counts up in response to the negative edges of the inverted pulses. The counted values in counter CO3 are applied to decoder DE1 which produced a HIGH signal from one of its sixteen outputs f0–f15 in a manner described below. When counter CO3 has counted one pulse, it produces "0001" from its output, and output f0 is HIGH. When counter CO3 has counted two pulses, it produces "0010" from its output, and output f1 is HIGH. Similarly, when counter CO3 has counted eight pulses, it produces "1000" from its output and output f7 is HIGH. When counter CO3 has counted nine pulses, it produces "1001" from its output, and output f8 is HIGH. And when counter CO3 has counted sixteen pulses, it produces "1111" from its output, and output f15 is HIGH. These signals produced from outputs f0–f15 are used for controlling the gates for transmitting data. When output f15 is HIGH, AND gate AN44 is enabled, thereby transmitting a signal from inverter IN21 to one-shot circuit OS4 and further to one-shot circuit OS6. In response to the positive edge of a pulse from inverter IN21, that is, in response to the negative edge of a sixteenth clock pulse under the FC mode, one-shot circuit OS4 produces a pulse. By the negative edge of this pulse, one-shot circuit OS6 is triggered to produce a pulse which resets flip-flop FF9, thereby producing a LOW output from its Q terminal, which is substantially equal to terminal FC. Then, the mode is set to a waiting mode.

When terminal CF produces a HIGH signal to establish a CF mode, the reset condition of counter CO4 is released and, at the same time, the decoder DE2 is set in a condition ready to produce an output. Then, counter CO4 counts up clock pulses from inverter IN21. When it counts 24 pulses (this is equal to 3 bites) it produces an output "11000" and, thereupon, output g23 of decoder DE2 produces a HIGH signal. The HIGH signal from decoder DE2 enables AND gate AN46, thereby transmitting a signal therethrough from inverter IN21. Then, in response to the negative edge of the 24th pulse from terminal P3 that is in response to the positive edge of AND gate AN46, one-shot circuit OS8 produces a pulse. By the negative edge of this pulse, one-shot circuit OS10 produces a pulse. Then, by the pulse from one-shot circuit OS10, flip-flop FF11 is reset, thereby producing a LOW output from its Q terminal, which is substantially equal to that of the CF terminal. Then, the mode is set to a waiting mode.

When terminal ES produces a HIGH signal to establish an ES mode, a LOW signal is applied from terminal P1. This LOW signal is applied in the following steps. When the trailing curtain of the shutter mechanism completes its scan to close the shutter, X contact Sx opens, thereby turning transistor BT39 (FIG. 9b) off. Thus, terminal P1 produces a LOW output. By the LOW signal applied from terminal P1, inverter IN19 produces a HIGH signal, thereby producing a pulse from one-shot circuit OS7. Accordingly, flip-flop FF13 is reset, thereby producing a LOW output from its Q terminal, which is substantially equal to that of the ES terminal. Then, the mode is set to a waiting mode.

Now, referring to FIG. 9b, an emission amount control circuit FTC1 is shown at the right-hand bottom thereof. The detail of this circuit FTC1 will be described later in connection with FIG. 11. Coupled to the emission amount control circuit FTC1 is microcomputer MC2, the operation of which will be described in detail later in connection with FIGS. 13a, 13b, 13c and 14. During the waiting mode, all the terminals FC, CF and ES and all the outputs f0–f15 of mode determining circuit TIC produce a LOW output. Thus, each of NOR gates NO3 and NO5 produces a HIGH output. Emission amount control circuit FTC1 has an output INS which produces a LOW signal in response to the closure of X contact Sx. The LOW signal from output INS is maintained for 2.5 milliseconds and, thereafter, it changes to a HIGH signal which is held for 1 millisecond. Then, a LOW signal is produced for 5.5 milliseconds, and then, a HIGH signal is produced for 2 milliseconds. Thereafter, output INS is maintained LOW. In other words, upon closure of the X contact, output INS produces two LOW pulses sequentially. The first LOW pulse is produced in response to the closure of the X contact and has a pulse width of 2.5 milliseconds. The second LOW pulse is produced after the interval of 1 millisecond from the end of the first LOW pulse and has a pulse width of 5.5 milliseconds. The signal from OR gate OR2 is made LOW because AND gate AN24 is disabled by the closure of X contact Sx. Thereafter, through AND gate AN21 (FIG. 9a) and OR gate OR5, the signals from terminal INS are applied to AND gates AN18 and AN19, and further to transistor BT35 and BT37. Accordingly, the signals from terminal INS is produced through line L2. In the case of the waiting mode, AND gate 24 (FIG. 9b) produces a HIGH output when AND gate AN33 is HIGH at the completion of charge, and produces a LOW signal when AND gate AN33 is producing a LOW signal while charging. When the charge is completed, transistors BT83 and BT35 turn on to produce a HIGH signal through line L2, but when the charge is not completed, transistors BT81 and BT37 turns on to produce a LOW signal through line L2.

When the FC mode is established, mode determining circuit TIC produces a HIGH signal from its output terminal FC, thereby producing a LOW output from NOR gate NO5 and further from AND gate AN21. When output f0 of mode determining circuit TIC is HIGH, OR gates OR7 and OR5 are HIGH, thereby producing a HIGH signal on the line L2, which HIGH signal is the power on signal produced corresponding to bit b0, shown in Table 1.

When output f1 of mode determining circuit TIC is HIGH, AND gate AN29 is enabled, thereby producing a LOW output from AND gate AN29 when switch SB1 closes upon turning of light emitter FLO2 of flash device I to bounce flashing fashion, or a HIGH output when switch SB1 opens upon turning of light emitter FLO2 to straight flashing fashion. Therefore, when AND gate AN29 is HIGH, AND gate AN18 is HIGH and AND gate AN19 is LOW, thereby turning transistors BT83 and BT35 on. Thus, a HIGH signal is produced through line L2. However, when AND gate AN29 is LOW, AND gate AN18 is LOW, and AND gate AN19 is HIGH, thereby turning transistors BT81 and BT37 on to produce a LOW output through line L2. This signal is the twin signal produced in response to the second bit b1, shown in Table 1.

When output f2 of mode determining circuit TIC is HIGH, AND gate AN31 is enabled. Accordingly, signals from AND gate AN33 are transmitted therethrough. AND gate AN33 is HIGH when both charge detectors CHD1 and CHD2 are HIGH upon charge completion of both main capacitors C1 and C2 in flash device I. This signal from AND gate AN33 is produced on line L2 as a read signal.

When output f3 of mode determining circuit TIC is HIGH, AND gate AN35 is turned to an operative condition. Thus, the FDC signal, which is LOW when there is an indication of generation of a cease flash signal, and HIGH when there is no such an indication, from light adjustment success indication circuit INF (this will be described in detail later in connection with FIG. 12) is produced through line L2 in response to bit b3, shown in Table 1.

Then, when outputs f4 and f5 of mode determining circuit TIC, which are connected to nowhere, are HIGH, OR gate OR5 is LOW, AND gate AN19 is HIGH and AND gate AN18 is LOW. Thus, transistors BT81 and BT37 turn on, thereby producing a LOW signal along the line L2. These signals are produced in response to bits b4 and b5, shown in Table 1, wherein the signal in response to bit b4 is for the future use and the signal in response to bit b5 is the identification signal for the identification of the present system.

When outputs f6 and f7 of mode determining circuit TIC are HIGH, NOR gate NO3 is LOW, thereby producing a LOW output from each of AND gates AN18 and AN19. Thus, transistors BT35 and BT37 turn off, thereby transmitting the flash mode signal (see Table 1) determined in the flash controller IV through line L2 and transistor BT33 to inverter IN13. More specifically, when a HIGH signal is sent from the flash controller to the circuit of FIG. 9a through line L2, transistor BT33 turns on, thereby producing a HIGH output from inverter IN13. When a LOW signal is sent through line L2, transistor BT33 turns off, thereby producing a LOW output from inverter IN13. While the output f6 is HIGH, AND gate AN25 is enabled, thereby transmitting the 7th clock pulse from terminal P3. In response to the negative edge of this clock pulse, D flip-flop DF3 stores a signal in response to bit b6 from terminal P2. Then, when output f7 is HIGH, AND gate AN27 is enabled, thereby transmitting the 8th clock pulse from terminal P3. Thus, D flip-flop DF5 stores a signal in response to bit b7 from terminal P2. The data stored in D flip-flops DF3 and DF5 are sent to inputs i11 and i12 of microcomputer MC2, thereby detecting the flash mode determined in the flash controller.

As understood from Table 1, when a flash device other than the flash device I described above is connected, at least one of the two D flip-flops DF3 and DF5 is storing a HIGH signal. Therefore, OR gate OR8 is the HIGH, and AND gate AN23 is HIGH during the HIGH signal produced from one of outputs f8–f15. Thus, NOR gate NO3 is LOW, thereby forcibly stopping any data from being sent out through line L2 from the control circuit FLC1. Since the flash mode is either simultaneous or sequence flash mode, signals produced from flash controller IV in response to bits b8–b15 are transmitted through line L2 and are stored in the camera body. Thus, during the presence of bits b8–b15, transistors BT35 and BT7 are maintained off to prevent any interference in the data exchange between the camera body and the flash controller.

Still referring to FIG. 9a, in the case where the flash mode is a single flash mode wherein only one flash is connected to the camera, data stored in flip-flops DF3 and DF5 will be both LOW. Thus, the operation after the bits b6 and b7 is different from that described above. In this case, immediately after the signals LOW and LOW produced in response to bits b6 and b7, OR gate OR8 and AND gate AN23 are LOW, and NOR gate NO3 is HIGH. Thus, AND gates AN18 and AN19 are enabled, thereby permitting data transmission from control circuit FLC1 through line L2. Then, when terminal f8 is HIGH, OR gate OR 9 (FIG. 9b) is HIGH. Thus, OR gate OR5 and, in turn, AND gate AN18 are HIGH, whereby a HIGH output is produced on line L2, in a manner described above. This HIGH output on line L2 is the power on signal (Table 1) produced in response to bit b8. Then, when a HIGH signal is produced from terminal f9, OR gate OR9 is LOW, thereby producing a LOW signal on line L2. This LOW signal is the ID signal (Table 1) produced in response to bit b9. Then, when a HIGH signal is produced from terminal f10, a signal representing the on or off condition of switch SB1 (FIG. 9b) is produced from AND gate AN37 (FIG. 9b) and, in turn, OR gate OR9, thereby producing a HIGH signal on line L2. This signal on line L2 is the sequence flash (or double-action twin flash) signal (Table 1) produced in response to bit b10, and is LOW when the flash device is set in the bounce flash fashion and indicating the sequence flash mode (or double-action twin flash mode). By this LOW the camera body detects that the mode is sequence flash mode (or double-action twin flash mode). Then, when terminal f11 produces a HIGH signal, the charge completion signal from AND gate AN33 is transmitted through AND gate AN39 and OR gate OR9 to line L2.

It is to be noted that by the HIGH signal from terminal FC of mode determining circuit TIC, one-shot circuit OS2 (bottom of FIG. 9a) produces a pulse which resets flip-flop FF2. Thus, in the case of single flash mode, the ready signal (or charge completion signal) produced in response to bit b11 causes transistors BT35 and BT33 to turn on, resulting in a HIGH output from inverter IN13, that is, from terminal P2. In this case, AND gate AN20 continues to produce a LOW output, and flip-flop FF2 is maintained in reset condition. Therefore, NAND gate NA5 is HIGH, thereby enabling AND gate AN22 (FIG. 9b) to transmit a start emission signal from terminal P1 to emission amount control circuit FTC1. On the contrary, when the charge is not completed, transistor BT37 turns on, thereby producing a LOW signal on line L2. Thus, transistor BT33 turns off to produce LOW from terminal P2. Accordingly, flip-flop FF2 is set, thereby producing a LOW output from NAND gate NA5 in response to the HIGH signal produced from terminal ES.

Thus, AND gate AN22 is disabled. Accordingly, notwithstanding the start emission signal from terminal P1, no flash emission will be carried out. Thus, by the ready signal sent to the camera body in response to bit b11, the flash device itself determines whether or not to emit light, and by the received ready signal, the camera determines whether or not to carry out the flash photographing operation. Thus, there will be no error operation in the system of the present invention.

In the case of the multi-flash mode, no signal will be produced from the flash device during bits b8–b15, but instead, the flash controller produces in a manner described later, on line L2 a HIGH signal when both flash devices are ready to emit light, and a LOW signal when at least one flash device is not ready to emit light. Then, this signal will be read in the camera body as a ready signal (charge completion signal), and in the flash device it is also read by flip-flop FF2, thereby determining whether or not to emit light.

As to the output on line L2 from the flash device, the electric current flowing away from the flash device to produce a HIGH signal is smaller than the electric current flowing towards the flash device to produce a LOW signal. In other words, there is an impedance difference between these two conditions, for the reason explained below.

There is a case in which two or more flash devices are connected to the camera body parallelly through a suitable option-connector to emit an intensified flash light simultaneously. In such a case, when terminal f11 produces a HIGH signal to produce the charge completion signal, at least one flash device may not produce a charge completion signal while others do. In the flash device producing no charge completion signal, transistor BT37 turns on. Thus, even if the transistor BT35 in the other flash device turns on, the electric current from transistor BT35 is restricted to a certain level by constant current circuit CI10 and transistor BT83. Therefore, even if transistor BT35 turns on, the electric current therefrom will be directed to transistor BT37 of the flash device producing no charge completion signal. Therefore, transistor BT33 in any one of the connected flash devices is maintained off, thereby setting flip-flop FF2. Thus, no light emission is effected from the flash devices connected to the option-connector.

Then, when the terminal f12 of mode determining circuit TIC is HIGH, a signal from light adjustment success indication circuit INF is transmitted through AND gate AN41, OR gate OR9 and is outputted on line L2. This signal is the FDC signal produced in response to bit b12 (Table 1), and is used in the camera body for the indication of the condition of the flash device. Then, when one of terminals f13, f14 and f15 is is HIGH, OR gate OR9 is LOW, thus, during which a LOW signal is produced on line L2. As understood from Table 1, bits b13, b14 and b15 are preserved for the future use.

Next, the description is directed to the emission amount control operation under ES mode, in connection with FIGS. 9a, 9b and 11. When terminal P1 is HIGH in response to the closure of X contact Sx of camera body (FIG. 1b-1), NAND gate NA5 is HIGH when flip-flop FF2 is in the reset condition. And furthermore, when the charge is completed, AND gate AN22 is HIGH along line FSA. Accordingly, one-shot circuit OS9, shown in FIG. 11, produces a HIGH pulse. By this pulse through OR gate OR13, flip-flop FF15 is reset and flip-flops FF17 and FF14 are set. Then, by a HIGH signal from the Q terminal of flip-flop FF14, counter CO5 is released from the reset condition, and at the same time, decoder DE3 is set in a condition ready to produce an output signal. Decoder DE3 has five outputs Y5, Y6, Y7, Y8 and Y9 each of which produces a HIGH pulse after a predetermined time from the HIGH output produced from the Q terminal of flip-flop FF14. After 2.5 milliseconds from the HIGH output from the Q terminal of flip-flop FF14, output Y5 of decoder DE3 produces a HIGH pulse. Similarly, output Y6 produces a pulse after 3.5 milliseconds from the HIGH output from the Q terminal of flip-flop FF14. Also, outputs Y7, Y8 and Y9 produce a pulse after 6 milliseconds, 9 milliseconds and 11 milliseconds, respectively. Flip-flop FF15 has a set terminal S connected to OR gate OR11 which is further connected to outputs Y5 and Y8, and a reset terminal R connected to OR gate OR13 which is further connected to outputs Y6, Y9 and one-shot circuit OS9. Accordingly, for 2.5 milliseconds from the HIGH output from the Q terminal of flip-flop FF14, the Q terminal of flip-flop FF15 is LOW. Then, it is HIGH for 1 milliseconds (between 2.5–3.5 milliseconds), LOW for 5.5 milliseconds (between 3.5–9 milliseconds), HIGH for 2 milliseconds (between 9–11 milliseconds). Thereafter, it is LOW. These HIGH and LOW signals from the Q terminal of flip-flop FF15 are transmitted through line INS to OR gate OR2 (FIG. 9b). In this case, even if the charge is completed, AND gate AN24 produces a LOW output by the HIGH output produced from terminal P1 (FIG. 9b). Thus, OR gate OR2 produces these signals applied thereto from line INS. When the mode is ES mode, NOR gate NO5 (FIG. 9a) is HIGH, and, therefore, AND gate AN21 produces the signals applied thereto from OR gate OR2. These signals are further transmitted in a manner described above, and are outputted to line L2. These signals are used for controlling the emission amount described above in connection with FIG. 8. In the case where this flash device is connected to a camera which does not produce a pulse that represents the mode on line L3, a HIGH output produced from terminal P1 upon completion of charge is applied, since terminal ES is LOW, to line FSA, thereby effecting the light emission.

Referring to FIG. 9b, microcomputer MC2 has a terminal O13 which is HIGH when the primary or first flash mode under the sequence flash mode is to be established. Terminal O11 is HIGH when it is a double-action twin flash mode. Terminal O12 is HIGH when the secondary or second flash mode under the sequence flash mode is to be established. Terminal O10 is HIGH when it is a simultaneous flash mode or single flash mode. Terminal O14 is HIGH when it is the light amount auto-adjustment mode. In FIG. 9b, a circuit FLD is provided for generating emission amount data for use in both the light amount auto-adjustment mode and light amount manual adjustment mode. The emission amount data generating circuit FLD has two outputs e1 and e2 which are applied to decoder DE5, shown in FIG. 11, so that decoder DE5 produces a 3-bit signal from its outputs d1, d2 and d3. The relationship between signals on outputs e1 and e2 and signals on outputs d1, d2 and d3, and the corresponding mode and amount of emission for each combination of signal are shown in Table 3 below.

TABLE 3

| e1 | e2 | d1 | d2 | d3 | Flash Mode | Amount of Emission |
|----|----|----|----|----|------------|--------------------|
| H | H | H | L | L | Auto-Adjustment | |

TABLE 3-continued

| e1 | e2 | d1 | d2 | d3 | Flash Mode | Amount of Emission |
|----|----|----|----|----|------------|--------------------|
| H | L | H | L | L | Manual Adjustment | Full amount |
| L | H | L | H | L | Manual Adjustment | ½ of Full amount |
| L | L | L | L | H | Manual Adjustment | ¼ of Full amount |

As understood from Table 3, only terminal d2 of decoder DE5 (FIG. 11) is HIGH when it is required to emit ½ of the full amount. In this case, transistor BT43 turns on, thereby defining a current path between power source BA3 and ground through phototransistor PT1, capacitor C15 and transistor BT43. Phototransistor PT1 is provided to receive directly the light emitted from light emitter FLO2 and produces current which is in relation to the intensity of emitted light. Light emitter FLO2 emits light in response to a HIGH output (start emission signal) from OR gate OR21 through line ST2. Since the start emission signal is also applied through OR gate OR20 to transistor BT45, transistor BT45 is maintained on before the emission of flash light, thereby discharging capacitor C15. Then, in response to the start emission signal, light emitter FLO2 starts to emit light and, at the same time, capacitor C15 starts to charge current corresponding to the the light emitted from light emitter FL02, as detected by phototransistor PT1. Thus, the voltage charged across capacitor C15 is in relation to the amount of light emitted from light emitter FLO2, and is provided to the non-inverting input of comparator AC3. When the charged voltage across capacitor C15 exceeds a predetermined voltage determined by resistors R5 and R7, comparator AC3 produces a HIGH SIGNAL which is applied to one-shot circuit OS11, thereby producing a HIGH pulse (stop emission signal). The stop emission signal is applied through AND gate AN63 and OR gate OR25 through line SP2, so as to stop the emission of flash light from light emitter FLO2.

When it is required to emit ¼ of the full amount, only terminal d3 of decoder DE5 is HIGH. In this case, transistor BT41 turns on, thereby defining a current path between power source BA3 and ground through phototransistor PT1, capacitor C13 and transistor BT41. It is to be noted that the capacitance of capacitor C13 is equal to half the capacitance of capacitor C15. Therefore, a stop emission signal is produced when the charged amount reaches half the amount of that charged in capacitor C15.

When it is required to emit the full amount or automatically adjusted amount of light from light emitter FLO2, only terminal d1 of decoder DE5 is HIGH, thereby producing a HIGH output from OR gate OR20. Thus, transistor BT45 is maintained on to prevent one-shot circuit OS11 from producing any stop emission signal.

Still referring to FIGS. 9a, 9b and 11, an operation under double-action twin flash mode is described. In this case, microcomputer MC2 (FIG. 9b) produces HIGH from its output O11, thereby producing a HIGH output from OR gates OR15, OR17 and OR19. Therefore, in this case, after the closure of X contact Sx, AND gate AN51 (center of FIG. 11) is HIGH for 2.5 milliseconds, which HIGH output is transmitted through OR gate OR21 on line ST2, serving as the first start emission signal. Thus, light emitter FLO2 starts the light emission. In this case, if the mode is auto-adjustment shown in Table 3, AND gate AN65 is being enabled. Thus, the first stop emission signal, which is sent from the camera body through terminal P3, is transmitted through AND gate AN65, OR gate OR25 to line SP2, thereby stopping the emission of flash light from light emitter FLO2. On the contrary, if the mode is manual adjustment mode shown in Table 3, AND gate AN63 is being enabled. Thus, the first stop emission signal, which is sent from one-shot circuit OS11, is applied through AND gate AN63, OR gate OR25 to line SP2, thereby stopping the emission of flash light from light emitter FLO2.

Then, between 3.5 and 6 milliseconds from the closure of X contact Sx, AND gate AN55 is HIGH, which is transmitted through line ST1, serving as the second start emission signal. Thus, light emitter FLO1 starts the light emission. In this case, if the mode is auto-adjustment and microcomputer MC2 (FIG. 9b) is produced a HIGH output from its output O14, the second stop emission signal applied thereto from terminal P3 is transmitted through AND gate AN67 to line SP1, thereby stopping the emission of flash light from light emitter FLO1. Also, the second stop emission signal is applied through AND gate AN61, OR gate OR23 and AND gate AN69 to light adjustment success indication circuit INF. On the contrary, if the mode is manual adjustment mode, microcomputer MC2 continues to produce a LOW output, thereby no stop emission signal is produced from AND gate AN67. Thus, light emitter FLO1 flashes with its full amount.

Next, an operation under simultaneous flash mode or single flash mode is described. In this case, microcomputer MC2 (FIG. 9b) produces a HIGH signal from its output O10, thereby producing HIGH output from OR gate OR17. Therefore, in this case, after the closure of X contact Sx, AND gate AN51 (center of FIG. 11) is HIGH for 2.5 milliseconds, which HIGH output is transmitted through OR gate OR21 on line ST2, serving as the start emission signal. Thus, light emitter FLO2 starts the light emission. In this case, if the mode is auto-adjustment shown in Table 3, the stop emission signal, which is sent from terminal P3, is transmitted through AND gate AN65, OR gate OR25 to line SP2, thereby stopping the emission of flash light from light emitter FLO2. On the contrary, if the mode is manual adjustment mode, the stop emission signal, which is sent from one-shot circuit OS11, is applied through AND gate AN63, OR gate OR25 to line SP2, thereby stopping the emission of flash light from light emitter FLO2. In this case, no start emission signal will be produced on line ST1 and, therefore, light emitter FLO1 remains non-actuated. Also, the stop emission signal, which has been applied from terminal P3 within 2.5 milliseconds from the closure of X contact Sx, is fed to light adjustment success indication circuit INF through AND gate AN59, OR gate OR23 and AND gate AN69.

Next, an operation under sequence flash mode is described. In the case of the first flash light emission in this mode, microcomputer MC2 (FIG. 9b) produces a HIGH signal from its output O13, thereby producing a HIGH output from OR gates OR15, OR17 and OR19. Therefore, after the closure of X contact Sx, line ST2 is HIGH for 2.5 milliseconds. Thus, light emitter FLO2 starts the light emission. In this case, if the mode is auto-adjustment, the emission of flash light stops in response to the stop emission signal from terminal P3, and if the mode is manual adjustment mode, the emission of flash light stops in response to the stop emission signal from one-shot circuit OS11. Also, the stop emission signal, which is sent from terminal P3 between 3.5-≠milliseconds from the closure of X contact Sx, is applied through AND gate AN61, OR gate OR23 and AND gate AN69 to light adjustment success indication circuit INF. Therefore, even if it did not reach ⅔ of the necessary amount for the proper exposure by the first flash light, FDC display, for the indication of a sufficient amount of light for the proper exposure, will be effected if the emitted light amount total of the first and second flash lights reaches the necessary amount.

On the other hand, in the case of the second flash light emission, microcomputer MC2 (FIG. 9b) produces a HIGH signal from its output O12, thereby AND gate AN53 becomes enabled. Between 3.5 and 6 milliseconds from he closure of X contact SX, AND gate AN53 is HIGH, thereby emitting flash light from light emitter FLO2. Light emitter FLO2 stops emission in response to the stop emission signal on line SP2 produced from terminal P3 or from one-shot circuit OS11. Also, the stop emission signal, which is sent from terminal P3 between 3.5-6 milliseconds from the closure of X contact Sx, is applied to light adjustment success indication circuit INF. In the sequence flash mode described above, no flash light will be emitted from light emitter FLO1, if the employed flash device is the double flash-head type I.

Referring to FIG. 12, the description is directed to light adjustment success indication circuit INF. When the stop emission signal from control circuit FTC1 is produced on line FDS, flip-flop FF21 is set. At this moment, when the mode is ES mode, a HIGH signal is provided on line ES from mode determining circuit TIC (FIG. 9a). Therefore, AND gate AN71 is LOW, thereby holding the counter CO7 in the reset condition. Then, when the waiting mode provides a LOW on line ES, AND gate AN71 is HIGH, thereby producing a LOW output from inverter IN20 to transmit the FDC signal to AND gate AN35 (FIG. 9b). Also, by the HIGH output from AND gate AN71, counter CO7 is released from its reset condition, thereby starting the count of clock pulses φ2 from microcomputer MC2. Counter CO7 has two outputs t0 and t1. Output t0 is a train of pulses having a frequency of 8 Hz for turning transistor BT47 on and off repeatedly. Thus, light emitting diode LD1 connected to transistor BT47 blinks with a frequency of 8 Hz. Output t1 produces a HIGH pulse after 3 seconds from the start of counting of counter CO7. The HIGH signal produced from output t1 is applied through OR gate OR27 to flip-flop FF21, thereby resetting flip-flop FF21. Thus, counter CO7 is reset and, at the same time, inverter IN20 is HIGH. Furthermore, light emitting diode LD1 stops light emission.

In the case where the photographings are carried out successively within very short intervals, the ES mode may be established during the blinking of light emitting diode LD1. In such a case, when mode determining circuit TIC produces a HIGH signal from its output ES, AND gate AN71 is LOW, and inverter IN20 is HIGH. Furthermore, counter CO7 is turned to the reset condition, thereby forcibly stopping blinking of the light emitting diode LD1. Furthermore, by the HIGH signal from the output ES, one-shot circuit OS13 produces a pulse which resets flip-flop FF21.

Now, referring to FIGS. 13a, 13b, 13c and 14, the operation of microcomputer MC2 is described. When it becomes the CF mode, mode determining circuit TIC produces a HIGH signal from its output CF which is applied to interruption terminal iT of microcomputer MC2. Thereupon, microcomputer MC2 starts operation from step S3 shown in FIG. 13a. At step S3, the terminal interruption is permitted. When the terminal interruption starts, the data transmitted to terminal SIN from terminal P2 are taken in microcomputer MC2 in accordance with the clock pulses applied to terminal SCK from terminal P3. Then, the aperture value data Avf for the flash photographing is stored in a certain register in microcomputer MC2. Next, similarly, various serial data (such as film sensitivity Sv, exposure control mode) are stored in different registers in microcomputer MC2. Furthermore, 1-bite long data fv, representing the focal length of the lens, is stored in a certain register in microcomputer MC2. By the above steps, data are transferred from the camera body to microcomputer MC2. Then, to count a predetermined period of time (such as 10 seconds), necessary data is stored in an internally provided counter which then starts counting (step S10). When the predetermined time has been counted, interruption is permitted. Then, at steps S12 and S13, respectively, it is detected whether terminals i13 and i14 are receiving a HIGH signal or not to determine the selected mode for flash as indicated in Table 3. When both terminals are HIGH, as happens when the selected mode is auto-adjustment mode, the program goes to step S15. On the contrary, when at least one of two inputs i13 and i14 is "LOW", microcomputer MC2 further detects whether or not the data representing the exposure control mode as obtained from the camera body is for the manual mode or not. If the data representing the exposure control mode as obtained from the camera body is for the manual mode, the program goes to step S18. If it is not for the manual mode, even if the mode set in the flash device is a manual mode, the program follows the auto-adjustement mode, and therefore, the program goes to step S15. At step S15, a display for the indication of the auto-adjustment is effected. Then, output O14 is HIGH (step S16), and "1" is assigned to flag (AMF). Thereafter, the program goes to step S21. However, at step S18, a display for the indication of the manual adjustment is effected. Then, output O14 is LOW and "0" is assigned to flag (AMF). Thereafter, the program goes to step S21.

Figure 13B:
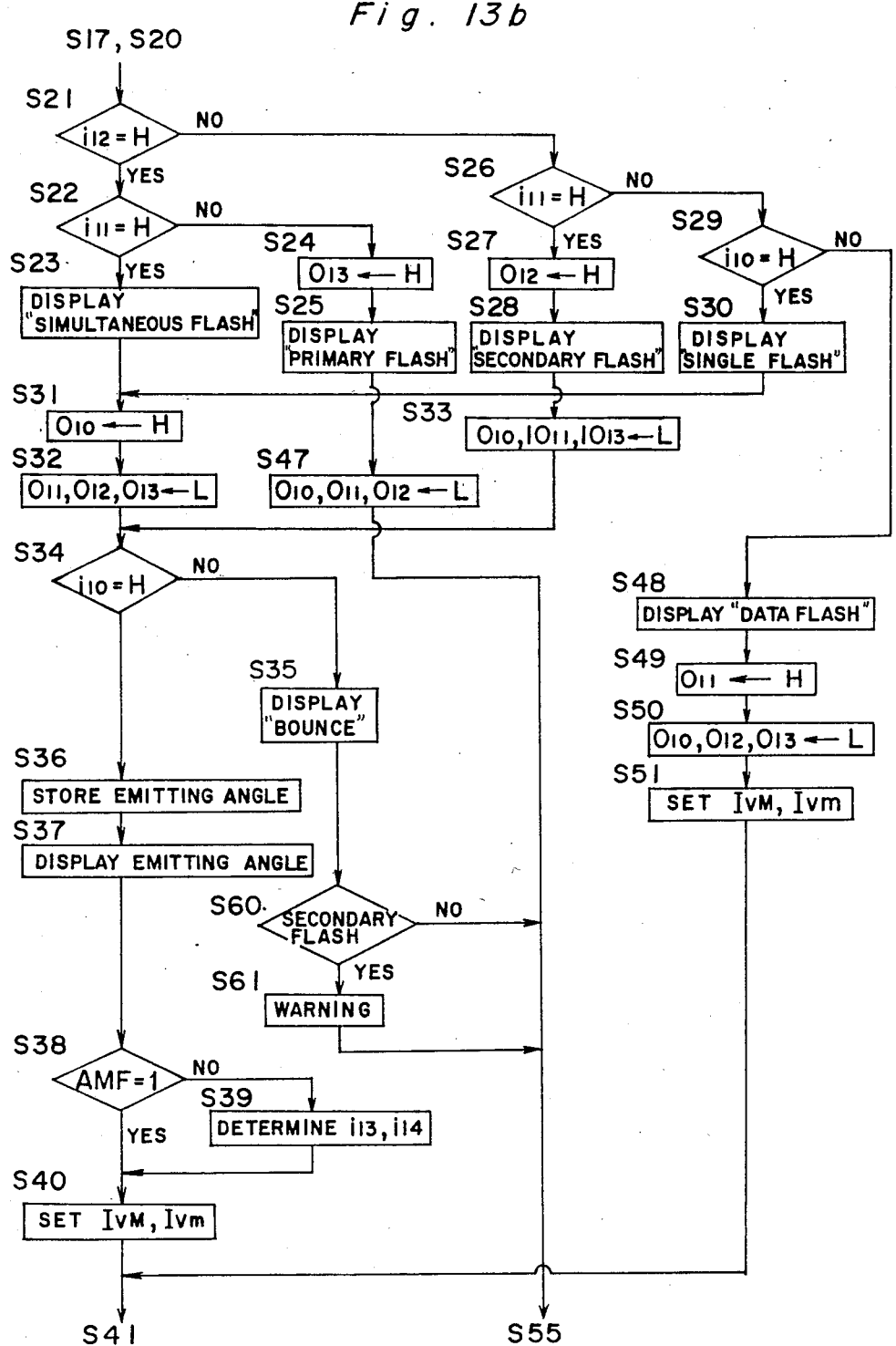

Referring to FIG. 13b, at steps S21 et seq., it is determined which one of the flash modes has been selected in accordance with the signal applied to inputs i10, i11 and i12. When inputs i12 and i11 are both HIGH, the required mode is the simultaneous flash mode and, therefore, the program goes to step S23 for the display of the simultaneous flash mode. Thereafter, a HIGH signal is produced from output O10, and a low signal is produced from each of outputs O11, O12 and O13. Then, the program goes to step S34. At step S34, it is detected whether or not input i10 is HIGH. If input i10 is HIGH, indicating, that the flash device is arranged in the straight flashing fashion, the program goes to step S36. On the contrary, if input i10 is LOW indicating that the flash device is arranged in the bounce flashing fashion, the program goes to step S35 for the indication of bounce flashing fashion and further to step S60.

When input i12 is HIGH and input i11 is LOW, the required mode is the sequence flash mode and particularly for effecting the first or primary flash of the sequence flash mode. In this case, the program goes to step S24 for producing a HIGH signal from output O13 and then to step S25 for the display of primary flash. Thereafter, a LOW signal is produced from each of outputs O10, O11 and O12. Then, the program goes to step S55.

When input i12 is LOW and input i11 is HIGH, the required mode is the sequence flash mode and particularly for effecting the secondary flash of the sequence flash mode. In this case, the program goes to step S27 for producing a HIGH signal from output O12 and then to step S28 for the display of secondary flash. Thereafter, a LOW signal is produced from each of outputs O10, O11 and O13. Then, the program goes to step S34.

When both inputs i12 and i11 are LOW indicating that only one flash device I is connected directly or through the flash controller, the program goes to step S29. At step 29, it is detected whether input i10 is HIGH or not. If input i10 is HIGH indicating that the flash device is arranged in the straight flashing fashion, the program goes to step S30 for the display of single flash. On the contrary, if input i10 is LOW indicating that the flash device is arranged in the bounce flashing fashion, the program goes to step S48 for the indication of double-action twin (DAT) flash mode. Thereafter, the program goes to step S49 to produce a HIGH signal from output O11 and to step S50 to produce a LOW signal from each of outputs O10, O12 and O13. Then, in accordance with the maximum and minimum available light amount from light emitter FL01, a maximum controllable amount IvM and minimum controllable amount Ivm are set at step S51 and, thereafter, the program goes to step S41.

At step S36, data indicating the flash shooting angle as produced from angle data generator ZD (FIG. 9b) upon turning of light emitter FLO2, is stored, and at step S37, the flash shooting angle is displayed. Then, it is detected whether or not flag AMG is carrying "1". If if is carrying "1", the program goes to step S40, and if not, the level of signals at inputs i13 and i14 are detected. Then, in the case of the auto-adjustment mode or manual adjustment mode with the full emission, IvM and Ivm are set, respectively, for the maximum and minimum controllable amount of the light emitter FLO2. In the case of the manual adjustment mode, but other than with full emission, the set maximum controllable amount corresponds to the amount of emission indicated in Table 3. After setting the maximum and minimum controllable amounts IvM and Ivm in the above described manner, the program goes to step S41.

At step S41, it is detected whether or not an interchangeable lens is properly mounted on the camera body. If the lens is not mounted, or not properly mounted, on the camera body, it is displayed that no lens is mounted and, thereafter, the program goes to step S59. Furthermore, if the lens is not mounted, a special data is sent in place of the data Avf for the aperture value to the flash device. Thus, the flash device, upon receipt of the special data, detects that no lens is mounted. On the contrary to the above, if it is detected at step S41 that an interchangeable lens is properly mounted, the program goes to step S43 to carry out the calculations:

$$IvM + Sv - Avf = DvM$$

and $$Ivm + Sv - Avf = Dvm, \quad (15)$$

wherein DvM and Dvm are the maximum and minimum distances, respectively, which the flash light can emit with the proper exposure. Thereafter, at step S45, it is detected whether or not the minimum shooting distance Dvm is shorter than a lower limit shooting distance DvL determined, for example, by parallax. In the case where $$Dvm < DvL,$$

DvL is used, in place of Dvm, for the minimum distance. Thereafter, the program goes to step S52.

At step S52, it is detected whether the flag AMF is carrying "1" or not. If the flag AMF is carrying "1" representing the auto-adjustment mode, a controllable range of distance is determined by the maximum controllable light amount IvM and minimum controllable light amount Ivm, and the determined range is displayed. However, if the flag AMF is carrying "0" representing the manual adjustment mode, a photographing distance which gives the proper exposure is determined by maximum controllable light amount IvM, and the determined photographing distance is displayed. Then, the aperture value determined by the data Avf for the aperture value under flash photographing, focal length determined by the data fv for the focal length of the mounted lens, and film sensitivity determined by the data Sv for the film sensitivity are displayed. Thereafter, the program returns back to step S12 to repeat the operations of data reading, calculation and display. Then, when the output CF of mode determining circuit TIC (FIG. 9a) provides a HIGH signal to interruption input iT of microcomputer MC2, the operation from step S3 is repeated. It is to be noted that at step S55, a determination whether a lens is mounted or not, as in step S41, is carried out. If a lens is mounted, the program goes to step S57, and if not, no lens is displayed and, thereafter, the program goes to step S59.

The modes which provide the controllable range of distance or the photographing distance which gives the proper exposure are the simultaneous flash mode, single flash mode, the second flasing under the sequence flash mode (provided that, for all these modes, the flash device is not arranged in the bounce flashing fashion, but in the straight flashing fashion), and double-action twin flash mode. In the case of double-action twin flash mode, the controllable range of distance or the photographing distance which gives the proper exposure which will be displayed is based on the light emitter FLO1. Accordingly, in the case of the first flashing under the sequence flash mode, simultaneous flash mode and the second flashing under the sequence flash mode (provided that, for all these modes, the flash device is arranged in the bounce flashing fashion), no display is effected for the controllable range of distance or for the photographing distance which gives the proper exposure. It is to be noted that in the case of the simultaneous flash mode, the second flashing under the sequence flash mode, or the single flash mode, provided that for all these modes the flash device is arranged in the bounce flashing fashion, a display for the indication of bounce flashing is effected at step S35. Thereafter, the program goes to step S60. Furthermore, since it is very rare to provide a proper exposure when light emitter FLO2 is in the bounce flashing fashion for the second flashing under the sequence flash mode, a warning is produced at step S61. Thereafter, the program goes to step S55.

Figure 14:
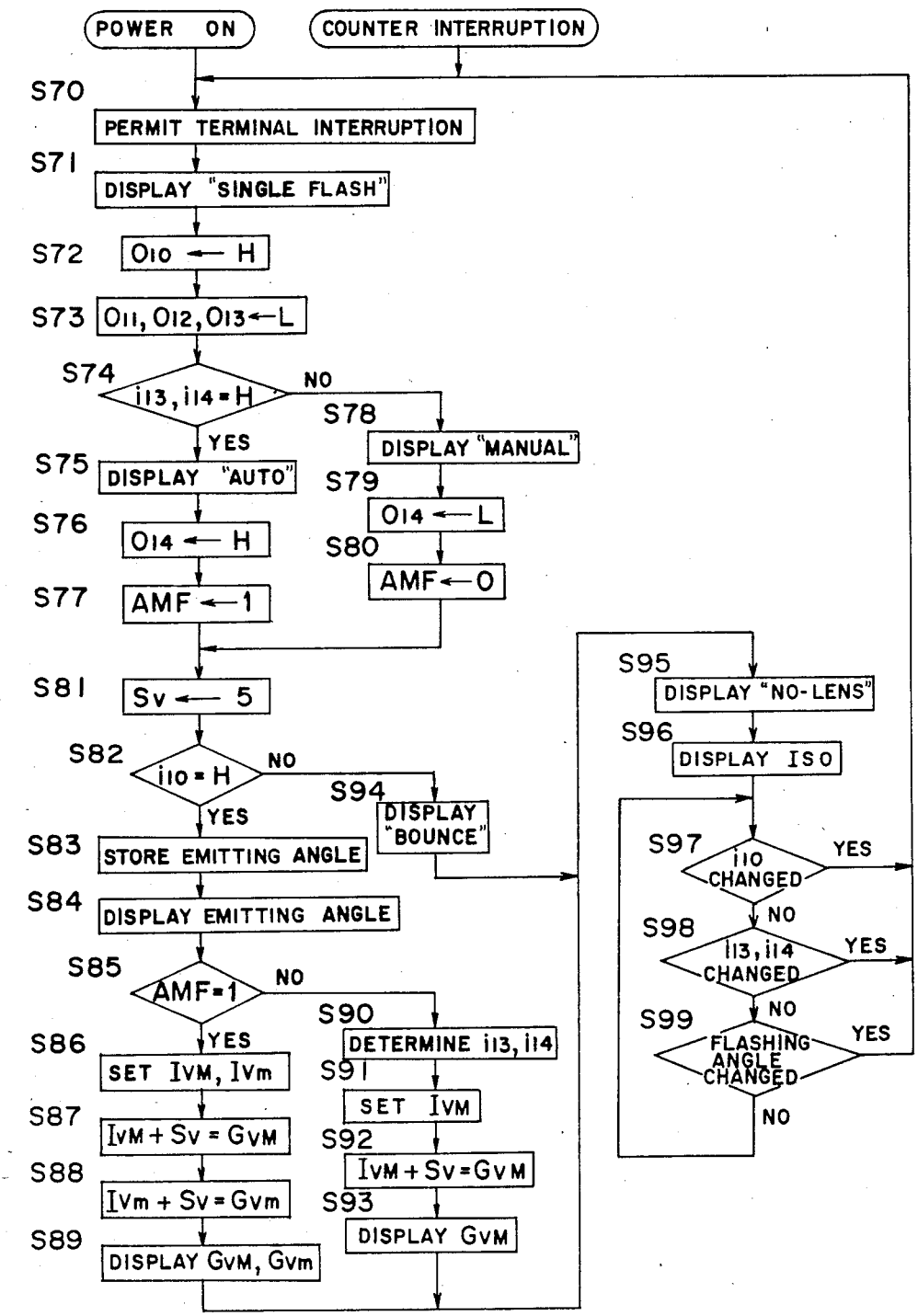
FIG. 14 shows a flow chart of OP carried out upon supply of power to microcomputer MC2 shown in FIG. 9b.

Referring to FIG. 14, when microcomputer MC2 is supplied with electric power, it follows the program after step S70. At step S70, display FDP1 is erased and, at the same time, an interruption to terminal iT is permitted. Then, in order to establish the simultaneous or single flash mode, output O10 is HIGH, and outputs O11, O12 and O13 are LOW and, thereafter, the program goes to step S74.

At step S74, it is detected whether or not the mode is an auto-adjustment mode in accordance with the signal applied to inputs i13 and i14. If the detected mode is an auto-adjustment mode, "AUTO" is displayed and, then, a HIGH signal is produced from output O14 and "1" is assigned to flag AMF. Then, the program goes to step S81. If the detected mode is not an auto-adjustment mode, "MANUAL" is displayed and, then, a LOW signal is produced from output O14. The, "0" is assigned to flag AMF and, the program goes to step S81. At step S81, "5" is assigned to register (Sv) for the indication of ISO 100. Then, at step S82, a signal from input i10 is detected for the determination whether or not light emitter FLO2 is arranged in the bounce flashing fashion. If it is in the bounce flashing fashion, "BOUNCE" is dispayed at step S94, and the program advances to step S95. If it is detected at step S82 that light emitter FLO2 is in the straight flashing fashion, the program goes to step S83 for reading the flash shooting angle as produced from angle data generator ZD (FIG. 9b), and the read angle is displayed. Then, it is detected whether or not the flag AMF is carrying "1" representing the auto-adjustment mode. If the mode is auto-adjustment mode, the maximum and minimum controllable amounts IvM and Ivm, respectively, for the detected flash shooting angle are set. Then, $$IvM + Sv = GvM$$

and $$Ivm + Sv = Gvm$$

are calculated for the display of maximum and minimum guide numbers GvM and Gvm, respectively, for the film having an ISO 100. Then, the program goes to step S95. On the contrary, at step S85, if it is detected that the flag AMF is carrying "0" representing the manual mode, signals applied to inputs i13 and i14 are determined, and the maximum controllable amount IvM based on the detected flash shooting angle is set. Then, a calculation, $$GvM = IvM + Sv$$

is carried out for the display of guide number GvM based on the set values. Thereafer, the program goes to step S95.

At step S95, in order to indicate that no data related to the lens has been transmitted from the camera body, "NO LENS" is displayed. It is further displayed that the film has ISO 100. Then, the program goes to step S97. At step S97, S98 and S99, it is repeatedly checked whether or not any change is made to the settings effected by the external setting means. If any change has been made in the setting, the program returns to step S70 to repeat the above described operation and also to change the display.

In the case where no interruption signal is transmitted within a certain period of time (such as 10 seconds) from the supply of interruption signal from terminal CF to input iT, the microcomputer itself starts the interruption (such as an interruption is referred to as a counter interruption) when an internally provided counter has counted a predetermined time. Thereupon, the microcomputer carries out the program from step S70. Thus, in this case, for the 10 seconds after the supply of the data from the camera body is stopped, a display based on the data from the camera body is effected. After that 10 seconds, the data which can be obtained by the values set in the flash device is displayed.

Next, with reference to FIGS. 15a, 15b, 16 and 17, the flash devices II and III are described.

Figure 15A:
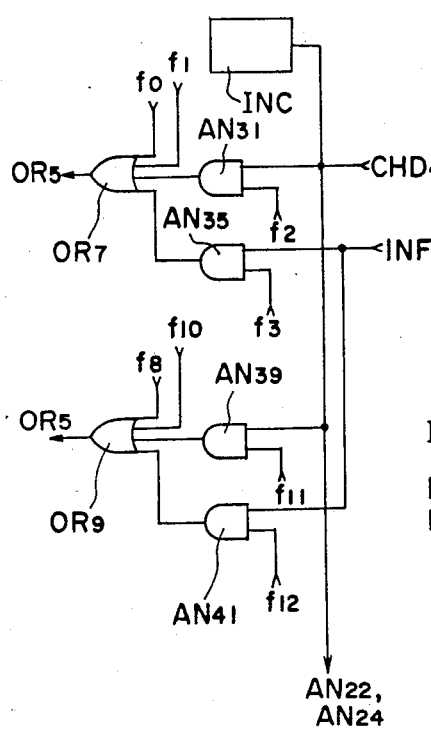
FIGS. 15a and 15b show parts of control circuit FLC2 or FLC3 shown in FIG. 1b-2, and particularly showing parts which are different from circuit FLC1 shown in FIG. 9b as enclosed by dotted lines XVa and XVb, respectively.
Figure 15B:
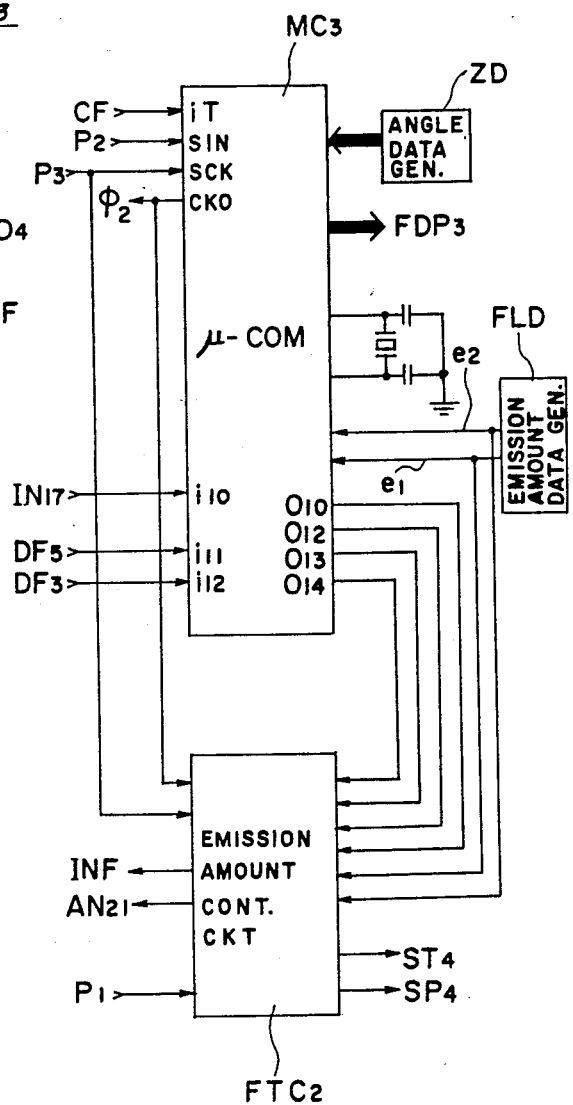

Referring to FIGS. 15a and 15b, parts of control circuit FLC2 or FLC3 which are different from control circuit FLC1 shown in FIG. 9b, are shown. More particularly, FIG. 15a shows a part corresponding to a dotted-line block XVa in FIG. 9b, and FIG. 15b shows a part corresponding to a dotted-line block XVb in FIG. 9b. The flash device II or III has only one light emitter FLO3 or FL04 and, therefore, the double-action twin flash mode is not available. Therefore, in the case of the FC mode, it is not necessary to indicate at bits b1 and b10 the twin flash mode. Thus, terminals f1 and f10 of mode determining circuit TIC are directly connected to OR gates OR7 and OR9, respectively, and therefore, a HIGH signal is produced in response to bit b1 and b10. Furthermore, microcomputer MC3 has no output O11 that produces a HIGH signal representing the double-action twin flash mode.

Referring to FIG. 16, a part of an emission amount control circuit FTC2 which is different from that shown in FIG. 11 is shown. Under the simultaneous or single flash mode, output O10 of microcomputer MC3 (FIG. 15b) produces HIGH signal which is applied to OR gate OR31 and the AND gate AN75, thereby enabling AND gate AN75. Accordingly, AND gate AN75 transmits a HIGH signal for 2.5 milliseconds from the closure of X contact Sx in the camera body as produced from flip-flop FF17 (FIG. 11). This 2.5 milliseconds long HIGH pulse is applied through OR gate OR35 and through line ST4 to light emitter FLO3 or FLO4 (FIG. 1b-2), thereby starting the emission of flash light. If the adjustment mode is an auto-adjustment mode, the stop emission signal produced from terminal P3 is applied through AND gate AN83, OR gate OR39 to terminal SP4 thereby stopping the light emission from light emitter FLO3 or FLO4. The stop emission signal is also applied through AND gate AN87 to light adjustment success indication circuit INF, thereby displaying that the light adjustment has been completed successfully. On the contrary, if the adjustment mode is a manual adjustment mode, a pulse produced from one-shot circuit OS11 (FIG. 11) is applied through AND gate AN85 and OR gate OR39 to line SP4, thereby stopping the light emission. For the first flashing under the sequence flash mode, output O13 of microcomputer MC3 (FIG. 15b) produces a HIGH signal thereby producing a HIGH output from OR gates OR31 and OR33. Then, when flip-flop FF17 provides a HIGH signal through AND gate AN75 and OR gate OR35 in response to the closure of X contact Sx, light emitter FLO3 or FLO4 starts the light emission. In a similar manner as described above, the light emission stops in response to the emission stop signal. As to light adjustment success indication circuit INF, a HIGH pulse produced from flip-flop FF19 for 2.5 milliseconds after passing 3.5 milliseconds from the closure of X contact Sx is transmitted, if the mode is the auto-adjustment mode, through AND gate AN81 and OR gate OR37 to AND gate AN87. During this 2.5 milliseconds, the stop emission signal is sent from termnial P3 through AND gate AN87 to circuit INF. For the second flashing under the sequence flash mode, output O12 produces a HIGH signal thereby producing a HIGH output OR gate OR33. Then, the HIGH pulse produced from flip-flop FF19 for 2.5 milliseconds after passing 3.5 milliseconds from the closure of X contact Sx is transmitted through AND gate AN79 and OR gate OR35, thereby starting the light emission. Then, in accordance with the stop emission signal provided from terminal P3 or from one-shot circuit OS11, the light emission stops. In this case, if the mode is the auto-adjustement mode, the stop emission signal provided from terminal P3 is applied through AND gate AN87 to light adjustment success indication circuit INF.

Figure 13C:
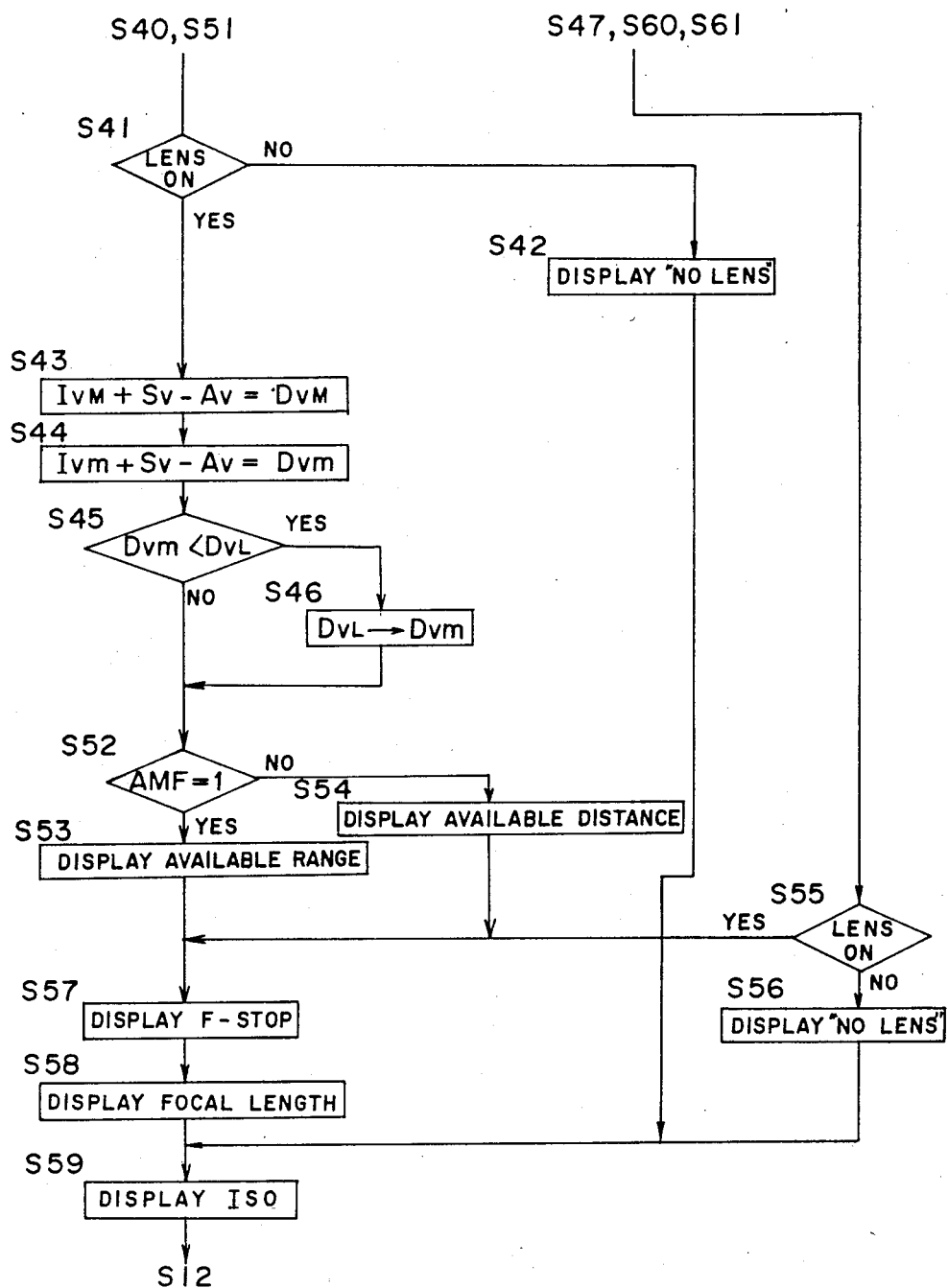

Referring to FIG. 17, a part of a flow chart of microcomputer MC3 (FIG. 15b) which is different from that shown in FIGS. 13a–13c is shown. In the procedure from step S21 et seq., the desired flash mode is determined in accordance with the signal from outputs i11 and i12. When a HIGH signal is produced from two outputs i12 and i11, it is understood that the simultaneous flash mode is selected and, therefore, the simultaneous flash mode is displayed at step S101. Then, at step S105, output O10 is HIGH and, then, at step S106 outputs O12 and O13 produce are LOW. Therefore, the program goes to step S34 to detect whether or not the flash device is arranged in bounce flashing fashion.

Back again to step S21, when a HIGH signal is produced from output i12 and a LOW signal is produced from output i11, the mode is primary flash of the sequence flash mode. Thus, at step S102, the primary flash is displayed. Then, output O13 is HIGH and outputs O10 and O12 are LOW. Thereafter, the program goes to step S55 of FIG. 13c.

At step S21, when a LOW signal is produced from outputs i12 and a HIGH signal is produced from output i11, representing the secondary of the sequence flash mode, the secondary flash is displayed at step S103. Then, output O12 is HIGH and outputs O10 and O13 are LOW and, thereafter, the program goes to step S34.

At step S21, when a LOW signal is produced from both outputs i12 and i11, a single flash is displayed. Then, the program goes to step S105.

Figure 18:
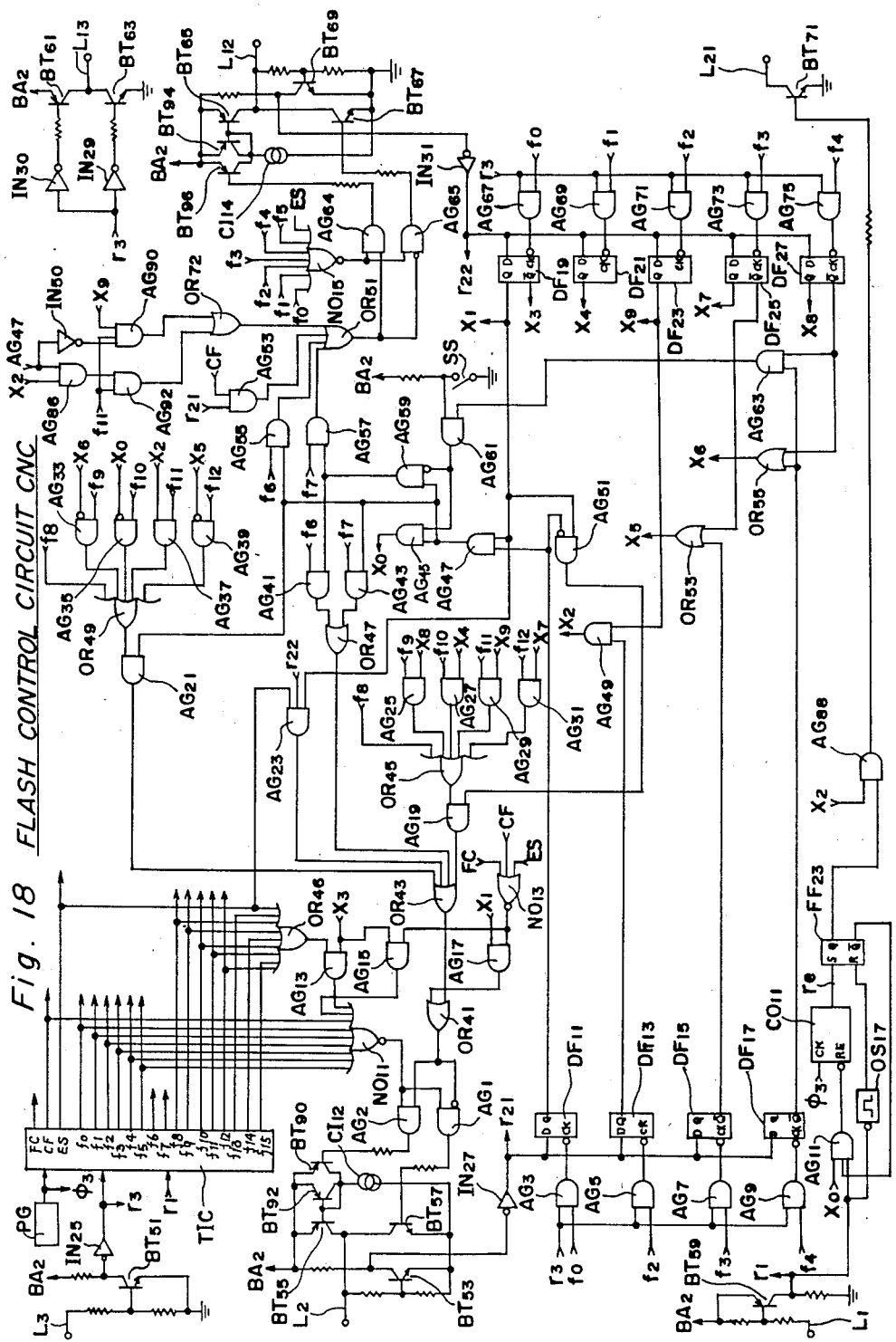
FIG. 18 is a circuit diagram showing the detail of flash control circuit CNC shown in FIG. 1b-1.

Referring to FIG. 18, a detail of flash control circuit CNC is shown. At the upper left corner of FIG. 18, mode determining circuit TIC, which has been described in detail before in connection with FIGS. 9 and 10, is shown. The operation under the FC mode is described. While mode determining circuit TIC is producing a HIGH signal from one of its outputs f0–f5, NOR gates NO11 and NO15 produce a LOW signal thereby disabling AND gates AG2, AG64, AG1 and AG65 to establish a condition for reading data on lines L2 and L12. Thus, the signals on line L2 are transmitted through transistor BT53 and inverter IN27 to line r21, whereas the signals on line L12 are transmitted through transistor BT69, inverter IN31 to line r22. Then, the signals appearing on line r22 in response to bits b0, b1, b2, b3 and b5 are stored in D flip-flops DF19, DF21, DF23, DF25 and DF27, respectively. When the sequence flash mode is selected, switch SS is held opened, and when the simultaneous flash mode is selected, switch SS is held closed. When two flash devices are connected, D flip-flops DF11 and DF19 produce a HIGH signal from their Q terminals. Thus, AND gate AG47 is HIGH. When two flashes are not connected, at least one of D flip-flops DF11 and DF19 produces a LOW output from its Q terminal. Thus, AND gate AG47 is LOW, and in turn, AND gates AG45 and AG59 are LOW. The output of AND gate AG45 is connected to a line X0. D flip-flops DF17 and DF27 are provided to store the identification signal in response to bit b5. When the two flash devices connected to the camera are designed for the flash photographing system of the present invention, both D flip-flops DF17 and DF27 receive a LOW signal. In this case, AND gate AG63 is HIGH. When at least one of the two flash devices is a type that produces only a HIGH signal on line L2, AND gate AG63 is LOW. Then, when both flash devices are of the type applicable for the system of the present invention and when the sequence flash mode is selected, AND gate AG61 is HIGH. But, when at least one of the two flash devices is not the type applicable for the system of the invention, AND gate AG61 is LOW even if switch SS is opened upon selection of the sequence flash mode. Now, when the sequence flash mode is selected with two flash devices being connected, AND gates AG47 and AG61 are HIGH. Thus, AND gate AG45 produces a HIGH signal along line X0. When the simultaneous flash mode is selected, AND gate AG61 is LOW. Thus, regardless of the output signal from AND gate AG47, AND gate AG59 is HIGH.

In the case of sequence flash mode, a LOW produced from AND gate AG59 is applied to AND gate AG41. Then, at the timing when a HIGH signal is produced from output f6 of mode determining circiuit TIC, the low applied to AND gate AN59 is trasmitted through AND gate AG41, OR gates OR47, OR43 and OR41, AND gate AG1 and transistor BT57 to line L2. Then, at the timing when a HIGH signal is produced from output f7 of mode determining circuit TIC, the HIGH output from AND gate AG47 is transmitted through AND gate AG43, OR gates OR47, 43 and OR41, AND gate AG2 and transistor BT55 to line L2. Therefore, the flash device connected directly to the camera body through the hot shoe is applied with a signal "01" representing the secondary flash of the sequence flash mode. Also at the timing when a HIGH signal is produced from output f6 of mode determining circuit TIC, a HIGH output produced from AND gate AG47 is applied through AND gate AG55, OR gate OR51, AND gate AG64 and transistor BT65 to line L2. Then, at the timing when a HIGH signal is produced from output f7 of mode determining circuit TIC, a LOW output produced from AND gate AG59 is applied through AND gate AG57, OR gate OR51, AND gate AG65 and transistor BT67 to line L12. Thus, the flash device connected to the camera body through the flash controller is applied with a signal "10" representing the primary flash of the sequence flash mode.

In the case of a simultaneous flash mode, AND gates AG47 and AG59 are HIGH. Therefore, AND gates AG41 and AG55 are HIGH at the timing when a HIGH signal is produced from output f6 of mode determining circuit TIC, and AND gates AG43 and AG57 are HIGH at the timing when a HIGH signal is produced from output f7 of mode determining circuit TIC. Thus, a signal "11" representing the simultaneous flash mode is applied to both flash devices.

In the case of a mode other than sequence and simultaneous flash modes, that is a case when only one or no flash device is connected, AND gate AG47 is LOW, and in turn, AND gate AG59 is LOW. Thus, the signal corresponding to bits b6 and b7 is "00", which is produced on both lines L2 and L12. In this case, if a flash device is connected directly to the camera body or through the flash controller, that flash device, upon receipt of the signal "00", is informed that no other flash device is connected.

Next, the description is directed to the data transmission when a HIGH signal is produced from one of outputs f8–f15 of mode determining circuit TIC. When no power on signal is applied from line L12, D flip-flop DF19 produces a HIGH signal from its $\bar{Q}$ terminal along a line X3. During this period when a HIGH signal is produced from one of outputs f8–f15 of mode determining circuit TIC, OR gate OR46 is HIGH and, therefore, AND gate AG13 is HIGH. Thus, NOR gate NO11 is LOW, thereby disabling AND gates AG1 and AG2. Accordingly, a high impedance will appear on line L2. When the power on signals are applied to flash control circuit CNC through lines L2 and L12, respectively, AND gate AG47 is HIGH, thereby enabling AND gate AG21. A HIGH signal produced from output f8 is transmissed through OR gate OR49, AND gate AG21, OR gates OR43 and OR41, AND gate AG2 and transistor BT55 to line L2. This signal corresponds to the power on signal produced in response to bit b8, as described above in connection with Table 1.

When output f9 of mode determining circuit TIC is HIGH, a signal on line X6 produced from OR gate OR55, which is receiving signals from the Q terminals of D flip-flops DF27 and DF17, is inverted and transmitted through AND gate AG33, OR gate OR49, and the other illustrated circuitry to line L2. The signal on line X6 is HIGH when at least one flash device is of the type applicable to the system of the present invention. Accordingly, when at least one flash device is of the type applicable to the system of the present invention, a LOW signal representing the identification signal is produced from line L2 in response to bit b9.

When output f10 of mode determining circuit TIC is HIGH, a signal on line X0 produced from AND gate AG45 is inverted and transmitted through AND gate AG35. Since AND gate AG47 is HIGH when the mode is sequence flash mode, a LOW signal representing the sequence flash signal is produced from line L2 in response to bit b10, as indicated in Table 1.

When output f11 of mode determining circuit TIC is HIGH, a signal on line X2 from AND gate AG49 is transmitted through AND gate AG37 to line L2. AND gate AG49 receives signals from the Q terminals of D flip-flops DF13 and DF23 which are storing ready signals obtained from flash devices previously in response to bit b2. Therefore, AND gate AG49 is HIGH when both flash devices are in the ready condition. This HIGH signal corresponds to the ready signal produced in response to bit b11, as indicated in Table 1.

When output f12 of mode determining circuit TIC is HIGH, a signal on line X5 from OR gate OR53 is transmitted through AND gate AG39 to line L2. OR gate OR53 receives signals from the Q terminals of D flip-flops DF15 and DF25 which are storing FDC signals obtained from flash devices previously in response to bit b3. Therefore, when at least one of the two flash devices produces the FDC signal in response to bit b3, OR gate OR53 is HIGH, which is inverted to a LOW signal and transmitted to line L2. This LOW signal corresponds to the FDC signal produced in response to bit b11, as shown in Table 1.

When outputs f13, f14 and f15 are HIGH, line L2 is held LOW, as indicated in Table 1, for the future use.

When D flip-flop DF19 stores the power on signal applied from line L12 to produce a HIGH output from its Q terminal on a line X1 and, at the same time, when D flip-flop DF11 stores no power on signal from line L2 to produce a LOW signal from its Q terminal on a line X4, AND gate AG51 is HIGH, thereby enabling AND gate AG19. When output f8 of mode determining circuit TIC is HIGH, the HIGH signal from output f8 is transmitted through OR gate OR45, AND gate AG19, OR gates OR43 and OR41 to line L2. This HIGH signal corresponds to the power on signal produced in response to bit b8 as shown in Table 1.

When output f9 is HIGH, a HIGH signal stored in D flip-flop DF27 previously in response to bit b5 and produced from its Q terminal on line X8 is transmitted through AND gate AG25 and various elements to line L2. This HIGH signal corresponds to the identification signal produced in response to bit b9 as shown in Table 1.

When output f10 is HIGH, a signal produced from D flip-flop DF21 from its Q terminal on line X4 is transmitted through AND gate AG27. This signal is LOW when the flash device connected to line L12 is arranged in the double-secton twin flash mode, and HIGH when it is in single flash mode. This signal corresponds to the sequence flash signal produced on line L2 in response to bit b10, as shown in Table 1.

When output f11 of mode determining circuit TIC is HIGH, the ready signal stored in D flip-flop DF23 from line L12 previously in response to bit b2 is produced from Q terminal of D flip-flop DF23 on line X9 and is transmitted through AND gate AG29. This signal corresponds to the ready signal produced on line L2 in response to bit b11, as shown in Table 1.

When output f12 of mode determining circuit TIC is HIGH, the FDC signal stored in D flip-flop DF25 from line L12 previously in response to bit b3 is produced from Q terminal of D flip-flop DF25 on line X7 and is transmitted though AND gate AG31. This signal corresponds to the FDC signal produced on line L2 in response to bit b12, as shown in Table 1.

When outputs f13, f14 and f15 are HIGH, line L2 is held LOW, as indicated in Table 1, for future use.

In the case of a CF mode, output CF of mode determining circuit TIC is HIGH, thereby producing a LOW output from NOR gate NO11. Thus, AND gates AG2 and AG1 are disabled. Accordingly, transistor BT53 changes its condition between on and off dependingly on the signals applied to line L2. Thus, the signals corresponding to those applied to line L2 are produced from inverter IN27 on line r21. Upon generation of a HIGH signal from output CF, AND gate AG53 is enabled, thereby transmitting the signals on line r21 through AND gate AG53, OR gate OR51, AND gates AG64 and AG65 and transistor BT65 and BT67 to line 12. In this manner, the data from the camera body are transmitted through line L2 and flash controller to flash device connected to connector CN5 containing line L12.

In the case of an ES mode, terminal ES is HIGH which is applied through OR gate OR46 to AND gate AG13. If no power on signal is stored in D flip-flop DF19, its output $\bar{Q}$ terminal produces a HIGH signal on line X3, thereby enabling AND gate AG13. Thus, the HIGH from OR gate OR46 is transmitted through AND gate AG13 and, accordingly, NOR gate NO11 is LOW. Thus, transistors BT55 and BT57 are turned off. If the power on signal is stored in D flip-flop DF19, D flip-flop DF19 produces a HIGH output from its Q terminal, thereby enabling AND gate AG23. Thus, the signals sent from the flash device through line L12 are transmitted through transistor BT69, inverter IN31 and line r22 to AND gate AG23 and further to line L2. Therefore, the integration control signal, which is synchronized with the light emission, is transmitted from flash device through line L12, flash controller and line L2 to the camera body.

In the case of a sequence flash mode, AND gate AG45 is HIGH which is transmitted through line X0 to AND gate AG11 (bottom of FIG. 18). Thus, AND gate AG11 is enabled. Then, when a LOW signal is provided on line L1 upon closure of X contact Sx, transistor BT59 turns on to provide a HIGH signal on line r1. At this moment, since flip-flop FF23 is in the reset condition, AND gate AG11 is HIGH upon receipt of a HIGH signal on line r1. When AND gate AG11 is HIGH, counter CO11 is released from the reset condition, thereby starting counting clock pulses $\phi 3$ from pulse generaor PG. Then, after counting 6 milliseconds, that is after 6 milliseconds from the closure of X contact Sx, a HIGH signal is produced on line re, thereby setting flip-flop FF23. Then, if line X2 is carrying a HIGH signal indicating that both flash devices are in the ready condition, AND gate AG88 is HIGH, thereby turning transistor BT71 on. Thus, a LOW signal is produced on line L21. Accordingly, the flash device III shown in FIG. 1a or 1b-2 emits light. More specifically, in the sequence flash mode, the flash devices I and II emit light sequentially in said order, providing an appropriate amount of light for the proper exposure with the two flash devices I and II. Immediately thereafter, the flash device III emits light. As understood to those skilled in the art, the third flash device is provided, for example, to eliminate undesirable shades formed, such as on back wall, by the flash devices I and II. When flip-flop FF23 is set, AND gate AG11 is LOW, thereby resetting counter CO11. Then, when X contact Sx opens to turn transistor BT59 off, line r1 carries a LOW signal. Thus, one-shot circuit OS17 produces a pulse which resets flip-flop FF23, thereby setting the circuit in the initial condition.

In the case of a multi-flash mode, the flash devices do not produce any signal during bits b8–b15, but instead, in response to bit b11, the flash controller produces on line L2 a HIGH signal when both flash devices are in the ready condition, and a LOW signal when at least one of the two flash devices is not ready. Then, when this signal is applied to the camera body, it is recognized as the ready signal, but in the flash devices, it is stored in flip-flop FF2 for use in determining whether to emit flash light or not. Furthermore, when it is detected that both flash devices are in the ready condition under the multi-flash mode, AND gate AG86 is HIGH, thereby enabling AND gate AG92. Then, upon receipt of a HIGH signal from output f11, AND gate AG92 is HIGH which is applied through OR gates OR72 and OR51 to line L12. This signal is further applied to the flash devices for informing that the flash emission is possible. On the contrary, if at least one flash device is not in the ready condition, AND gate AG86 is LOW, thereby producing a LOW signal on line L12. This signal is further applied to the flash devices for informing that the flash emission is not possible.

If the mode is other than the multi-flash mode, inverter IN50 is HIGH which is applied to AND gate AG90. In this case, when the flash device connected to the flash controller is in the ready condition, a HIGH signal is produced on line X9 from D flip-flop DF23, thereby enabling AND gate AG90. Thus, upon receipt of HIGH output f11, AND gate AG90 is HIGH which is applied through OR gates OR72 and OR51 to line L12, and further to the flash device. Thus, the flash device connected to the flash controller is ready to emit light. On the contrary, if the flash device connected to the flash controller is not in the ready condition, D flip-flop DF23 stores a LOW signal, thereby producing a LOW signal on line X9. Thus, notwithstanding the HIGH signal provided from output f11, AND gate AG90 is LOW which is applied through OR gates OR72 and OR51 to line L12 and further to the flash device. By this signal, the flash device can not emit flash light.

When outputs FC, CF and ES are LOW, that is when the mode is a waiting mode, NOR gate NO13 is HIGH. Then, when no flash device is connected to connector CN5 containing line L12, D flip-flop DF19 produces a HIGH output on line X3, thereby producing a HIGH output from AND gate AG15. Thus, NOR gate NO11 is LOW, thereby turning transistors BT55 and BT57 off. On the contrary, when a flash device is connected to connector CN5, D flip-flop DF19 produces a HIGH signal on line X1, thereby enabling AND gate AG17. Then, when the ready signal stored in D flip-flop DF23 from line L12 in response to bit b2 is HIGH, D flip-flop DF23 produces a HIGH signal on line X9, thereby producing a HIGH output from AND gate AG17 during the waiting condition. Therefore, when the flash device connected to connector CN5 produces a ready signal along line L12, the flash controller produces a HIGH signal on line L2 during the waiting condition.

Figure 19:
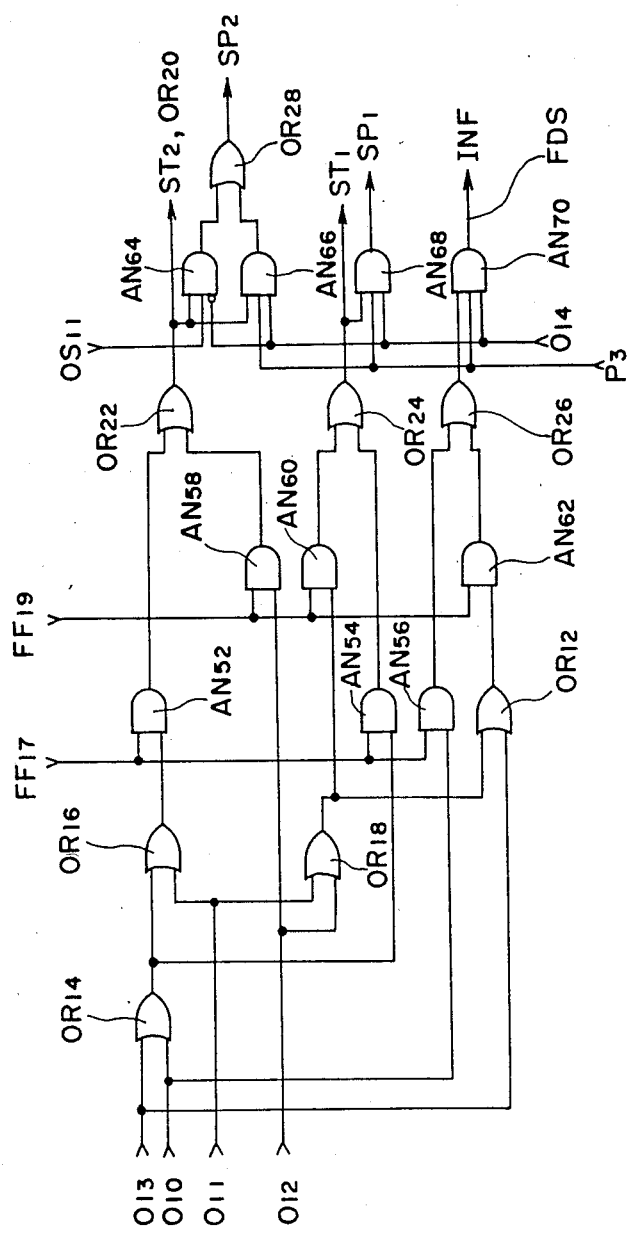
FIG. 19 is a circuit diagram showing a part of emission amount control circuit FTC1, which is different from that shown in FIG. 11.

Referring to FIG. 19, a part of an emission amount control circuit FTC1 for the double flash-head type which is different from that shown in FIG. 11 is shown. In the case of the primary flash of the sequence flash mode, output O13 is HIGH, thereby producing HIGH output from OR gates OR14, OR16 and OR12. Thus, AND gates AN52, AN54 and AN62 are enabled. Thus, the signal from flip-flop FF17, which signal is maintained HIGH for 2.5 milliseconds after the closure of X contact Sx, is transmitted through AND gates AN52 and AN54 and OR gates OR22 and OR24 to each of light emitters FL01 and FL02. Thus, both light emitters FL01 and FL02 emit light simultaneously.

If the mode is the auto-adjustment mode, the stop emission signal produced from the terminal P3 is produced from both AND gates AN66 and AN68 and provided to both light emitters FL01 and FL02, simultaneously. Thus, light emitters FL01 and FL02 stop emission simultaneously. Also, the signal from flip-flop FF19, which signal is maintained HIGH for 2.5 milliseconds after 3.5 milliseconds passed from the closure of X contact Sx, is transmitted through AND gate AN62 and OR gate OR26 to AND gate AN70. During the presence of said signal, the stop emission signal is transmitted from terminal P3 through AND gate AN70 to light adjustment success indication circuit INF, for the indication of the FDS signal.

If the mode is other than the auto-adjustment mode, the stop emission signal produced from one-shot circuit OS11 is transmitted through AND gate AN64 and OR gate OR28 to light emitter FL02, and no stop emission signal is applied to light emitter FL01. Thus, in this case, the light emitter FL01 carries out the full emission.

In the case of the secondary flash of the sequence flash mode, output O12 is HIGH, thereby producing HIGH output from OR gates OR18 and OR12. Thus, AND gates AN58, AN60 and AN62 are enabled. Accordingly, when flip-flop FF19 is set, both light emitters emit light simultaneously, and stop the light emission simultaneously upon receipt of the stop emission signal provided from terminal P3. The stop emission signal is also provided to light adjustment success indication circuit INF.

In the case of the simultaneous or single flash mode, terminal O10 is HIGH, thereby producing HIGH output from OR gates OR14 and OR16. Thus, AND gates AN52, AN54 and AN56 are enabled. Accordingly, when flip-flop FF17 is set, both light emitters emit light simultaneously, and stop the light emission simultaneously upon receipt of the stop emission signal provided from terminal P3. The stop emission signal is also provided to light adjustment success indication circuit INF.

In the case of the double-action twin flash mode, output O11 is HIGH, thereby producing HIGH outputs from OR gates OR16, OR18 and OR12. Thus, AND gates AN52, AN60 and AN62 are enabled. First, light emitter FL02 starts to emit light when flip-flop FF17 is set, and it stops emission in response to the stop emission signal from terminal P3. Thereafter, light emitter FL01 starts to emit light when flip-flop FF19 is set, and it stops emission in response to the stop emission signal. This stop emission signal is also applied to light adjustment success indication circuit INF.

According to the above modification, for the modes other than the double-action twin flash mode, both light emitters emit light simultaneously. Therefore, the available range of photographing distance must be determined and displayed in accordance with the total maximum light amount from light emitters FL01 and FL02.

Next, further modifications of the flash photographing system of the present invention will be described.

In the case of multi-flash photographing, a first flash device may be set to the auto-adjustment mode, and a second flash device may be set to the manual adjustment mode. In such a case, the FDC display can be carried out between the first flash device and the camera body, but no FDC display is effected with respect to the second flash device. In order to avoid such as inconvenience, the following modification can be employed.

1. When the signal read in response to bits b6 and b7 is either "01", "10" (representing sequence flash mode) or "11" (representing simultaneous flash mode), the mode is forcibly set to the auto-adjustment mode even if it is set to the manual adjustment mode. In other words, in the case of the multi-flash mode, the manual adjustment mode is not permitted.

2. In response to bit b4, preserved for future use, the flash device produces a signal representing either the auto- or manual adjustment mode. This signal is read by the flash controller. While in the flash controller, it is determined whether or not the mode is multi-flash mode. If the flash controller detects that one flash device is in the manual adjustment mode, a prohibit signal is sent in response to bit b15 to the flash device in the manual adjustment mode. Accordingly, the flash device in the manual adjustment mode is forcibly changed to the auto-adjustment flash mode. In other words, in the case of the multi-flash mode, it is prohibited to set two different modes (auto-adjustment mode and manual adjustment mode) at the same time, thus permitting both flash devices to be in either the auto-adjustment mode or manual adjustment mode.

3. In the case of the multi-flash mode, if the flash controller receives FDC signals from both flash devices, the FDC signals are sent out in response to bit b15.

According to another modification, when the data from the flash device to camera body are all HIGH signals indicating that the connected flash devices is not applicable to the system of the present invention, the camera body will not carry out a control operation of exposure and display for the flash photographing, but a control operation of exposure and display for the ambient light. Thus, it is possible to exclude the flash devices which are not designed for the system of the present invention.

Furthermore, when the signals from the flash device to camera body are all HIGH, the camera body, regardless of what mode it is set in, automatically sets 1/60 second for the exposure time and F-stop 5.6 for the aperture size, thereby ensuring the most widely used setting condition for the flash photographing.

Instead of the manner described in the preferred embodiment, the signal exchange to determine whether or not to carry out the light emission upon charge completion can be carried out in the following manner. When mode determining circuit TIC produces a HIGH signal from its output ES after the shutter has been released, a timing signal for producing a ready signal and a timing signal for reading are formed in each of the flash devices and flash controller. In accordance with the ready signal read in response to these timing signals, it is possible to determine whether or not to carry out the light emission.

In the preferred embodiment described above, since the operation of power-on-reset carried out upon turn on of the main power is known to those skilled in the art, the detailed description therefore is omitted for the sake of brevity.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of the appended claims.

What is claimed is:

1. A flash photography system having a camera body and an electronic flash device, comprising:
  first to third terminals included in said camera body;
  fourth to sixth terminals included in said electronic flash device and connectable to said first to third terminals, respectively;
  means in said camera body for producing a distinguishing signal to distinguish between first and second modes, wherein data from said camera body is transmitted to said electronic flash device in said first mode and data from said electronic flash device is transmitted to said camera body in said second mode, said producing means being connected to said first terminal;
  means in said camera body for generating clock pulses to control data transmission between said camera body and said electronic flash device, said generating means being connected to said first terminal;

means in said camera body for reading data from said electronic flash device in response to the clock pulses, said reading means being connected to said second terminal through which the data is serially transmitted from said electronic flash device;

means in said camera body for serially providing data to be transmitted to said electronic flash device in response to said clock pulse, said providing means being connected to said second terminal;

means in said camera body for generating an initiating signal to cause a production of artificial illuminating light from said electronic flash device, said initiating signal generating means being connected to said third terminal;

means in said electronic flash device, for selecting between the first and second modes in response to said distinguishing signal, said selecting means being connected to said fourth terminal;

means in said electronic flash device for serially providing data to be transmitted to said camera body in response to said clock pulses coming through said fourth terminal, said providing means in said electronic flash device being connected to said fifth terminal;

means in said electronic flash device for reading data from said camera body in response to said clock pulses coming through said fourth terminal, said reading means in said electronic flash device being connected to said fifth terminal; and means in said electronic flash device for causing the production of artificial illuminating light in response to said initiating signal, said initiating means being connected to said sixth terminal.

2. The flash photography system according to claim 1, wherein said reading means and said providing means, both in said camera body, are responsive to said distinguishing signal producing means, and said providing means and said reading means, both in said electronic flash device, are responsive to said mode selecting means.

3. The flash photography system according to claim 1, wherein said electronic flash device further includes means for generating the artificial illuminating light in response to said initiating means.

4. The flash photography system according to claim 3, wherein said initiating means includes means for triggering the production of the artificial illuminating light in response to said initiating signal with a predetermined delay.

5. In a flash photography system having a camera body and an electronic flash device, said camera body comprising:

first, second and third terminals;

means for producing a distinguishing signal to distinguish between first and second modes, wherein data from said camera body is transmitted to said electronic flash device in said first mode and data from said electronic flash device is transmitted to said camera body in said second mode, said producing means being connected to said first terminal;

means for generating clock pulses to control data transmission between said camera body and said electronic flash device, said generating means being connected to said first terminal;

means for reading data from said electronic flash device in response to said clock pulses, said reading means being connected to said second terminal through which the data is serially transmitted from said electronic flash device;

means for serially providing data to be transmitted to said electronic flash device in response to said clock pulses, said providing means being connected to said second terminal; and means for generating an initiating signal to initiate a production of artificial illuminating light from said electronic flash device, said initiating signal-generating means being connected to said third terminal.

6. In a flash photography system having a camera body and an electronic flash device, said electronic flash device comprising:

a first terminal for receiving from said camera body clock pulses and a distinguishing signal which distinguishes between a first mode, in which data from said camera body is transmitted to said electronic flash device, and a second mode, in which data from said electronic flash device is transmitted to said camera body;

a second terminal for data communication with said camera body;

a third terminal for receiving an initiating signal from said camera body to initiate a production of artificial illuminating light from said electronic flash device;

means connected to said first terminal for selecting between the first and second modes in response to said distinguishing signal;

means connected to said signal terminal for serially providing data to be transmitted to said camera body in response to said clock pulses coming through said first terminal;

means connected to said second terminal for reading data from said camera body in response to said clock pulses coming through said first terminal; and means connected to said third terminal for initiating the production of artificial illuminating light in response to said initiating signal.

* * * * *